US012206174B2

(12) United States Patent
Pance et al.

(10) Patent No.: US 12,206,174 B2
(45) Date of Patent: Jan. 21, 2025

(54) CONNECTED DIELECTRIC RESONATOR ANTENNA ARRAY AND METHOD OF MAKING THE SAME

(71) Applicant: Rogers Corporation, Chandler, AZ (US)

(72) Inventors: Kristi Pance, Auburndale, MA (US); Gianni Taraschi, Arlington, MA (US); Murali Sethumadhavan, Acton, MA (US); Stephen O'Connor, West Roxbury, MA (US); Karl E. Sprentall, Medford, MA (US); Shawn P. Williams, Andover, MA (US)

(73) Assignee: ROGERS CORPORATION, Chandler, AZ (US)

(*) Notice: Subject to any disclaimer, the term of this patent is extended or adjusted under 35 U.S.C. 154(b) by 0 days.

(21) Appl. No.: 17/668,516

(22) Filed: Feb. 10, 2022

(65) Prior Publication Data

US 2022/0271440 A1 Aug. 25, 2022

Related U.S. Application Data

(63) Continuation of application No. 15/957,043, filed on Apr. 19, 2018, now Pat. No. 11,283,189.

(Continued)

(51) Int. Cl.

*H01Q 19/18* (2006.01)
*H01Q 9/04* (2006.01)

(Continued)

(52) U.S. Cl.

CPC ......... *H01Q 21/065* (2013.01); *H01Q 9/0485* (2013.01); *H01Q 19/18* (2013.01); *H01Q 21/0093* (2013.01); *H01Q 21/061* (2013.01)

(58) Field of Classification Search

CPC .... H01Q 21/065; H01Q 9/0485; H01Q 19/18; H01Q 21/0093; H01Q 21/061

See application file for complete search history.

(56) References Cited

U.S. PATENT DOCUMENTS 2,624,002 A * 12/1952 Bouix .................... H01Q 13/24 343/778
3,212,454 A 10/1965 Ringenbach (Continued)

FOREIGN PATENT DOCUMENTS

CN 1512920 A 7/2004
CN 101809500 A 8/2010

(Continued)

OTHER PUBLICATIONS

S. H. Zainud-Deen, H. A. Malhat and K. H. Awadalla, "Dielectric resonator antenna phased array for fixed RFID reader in near field region," 2012 Japan-Egypt Conference on Electronics, Communications and Computers, Alexandria, Egypt, 2012, pp. 102-107, doi: 10.1109/JEC-ECC.2012.6186965.*

(Continued)

*Primary Examiner* — Hai V Tran
*Assistant Examiner* — Bamidele A Immanuel
(74) *Attorney, Agent, or Firm* — CANTOR COLBURN LLP

(57) ABSTRACT

A connected-DRA array including: a plurality of DRAs each having at least one volume of non-gaseous dielectric material; each of the plurality of DRAs having a proximal end and a distal end, and an overall height, H, from the proximal end to the distal end; wherein each of the plurality of DRAs is physically connected to at least one other of the plurality of DRAs via a relatively thin connecting structure being relatively thin as compared to an overall outside dimension of one of the plurality of DRAs, each connecting structure having a cross sectional overall height, h, as observed in the (Continued)

elevation view of the connected-DRA array, that is less than the overall height, H, of a respective connected DRA and being formed of a thin sheet of the at least one volume of non-gaseous dielectric material; wherein the thin sheet extends over a substantial portion of the connected-DRA array as observed in a plan view of the connected-DRA array.

13 Claims, 23 Drawing Sheets

Related U.S. Application Data

(60) Provisional application No. 62/569,051, filed on Oct. 6, 2017, provisional application No. 62/500,065, filed on May 2, 2017.

(51) Int. Cl.
*H01Q 21/00* (2006.01)
*H01Q 21/06* (2006.01)

(56) References Cited

U.S. PATENT DOCUMENTS

| | | | |
|---|---|---|---|
| 3,255,453 | A | 6/1966 | Horst |
| 3,321,765 | A | 5/1967 | Peters et al. |
| 3,321,821 | A | 5/1967 | Horst |
| 4,274,097 | A | 6/1981 | Krall et al. |
| 4,288,795 | A | 9/1981 | Shelton |
| 4,366,484 | A | 12/1982 | Weiss et al. |
| 4,458,249 | A | 7/1984 | Valentino et al. |
| 4,575,330 | A | 3/1986 | Hull |
| 4,743,915 | A | 5/1988 | Rammos et al. |
| 4,929,402 | A | 5/1990 | Hull |
| 4,983,910 | A | 1/1991 | Majidi-Ahy et al. |
| 5,061,943 | A | 10/1991 | Rammos |
| 5,071,359 | A | 12/1991 | Arnio et al. |
| 5,104,592 | A | 4/1992 | Hull et al. |
| 5,125,111 | A | 6/1992 | Trinh |
| 5,184,307 | A | 2/1993 | Hull et al. |
| 5,192,559 | A | 3/1993 | Hull et al. |
| 5,227,749 | A | 7/1993 | Raguenet et al. |
| 5,234,636 | A | 8/1993 | Hull et al. |
| 5,236,637 | A | 8/1993 | Hull |
| 5,273,691 | A | 12/1993 | Hull et al. |
| 5,453,754 | A | 9/1995 | Fray |
| 5,476,749 | A | 12/1995 | Steinmann et al. |
| 5,487,966 | A | 1/1996 | Steinmann et al. |
| 5,589,842 | A | 12/1996 | Wang et al. |
| 5,677,796 | A | 10/1997 | Zimmerman et al. |
| 5,807,519 | A | 9/1998 | Suzuki et al. |
| 5,825,271 | A | 10/1998 | Stitzer |
| 5,854,608 | A | 12/1998 | Leisten |
| 5,867,120 | A | 2/1999 | Ishikawa et al. |
| 5,940,036 | A | 8/1999 | Oliver et al. |
| 5,943,005 | A | 8/1999 | Tanizaki et al. |
| 5,952,972 | A | 9/1999 | Ittipiboon et al. |
| 6,008,755 | A | 12/1999 | Ishikawa et al. |
| 6,031,433 | A | 2/2000 | Tanizaki et al. |
| 6,052,087 | A | 4/2000 | Ishikawa et al. |
| 6,061,026 | A * | 5/2000 | Ochi .................... H01Q 21/064 343/786 |
| 6,061,031 | A | 5/2000 | Cosenza et al. |
| 6,075,485 | A | 6/2000 | Lilly et al. |
| 6,075,492 | A | 6/2000 | Schmidt et al. |
| 6,076,324 | A | 6/2000 | Daily et al. |
| 6,133,887 | A | 10/2000 | Tanizaki et al. |
| 6,147,647 | A | 11/2000 | Tassoudji et al. |
| 6,181,297 | B1 | 1/2001 | Leisten |
| 6,188,360 | B1 | 2/2001 | Kato et al. |
| 6,198,450 | B1 * | 3/2001 | Adachi ................ H01Q 9/0485 343/873 |
| 6,268,833 | B1 | 7/2001 | Tanizaki et al. |
| 6,292,141 | B1 | 9/2001 | Lim |
| 6,314,276 | B1 | 11/2001 | Hilgers et al. |
| 6,317,095 | B1 * | 11/2001 | Teshirogi ............... H01Q 13/10 343/770 |
| 6,323,808 | B1 * | 11/2001 | Heinrichs ............ H01Q 9/0485 343/702 |
| 6,323,824 | B1 | 11/2001 | Heinrichs et al. |
| 6,344,833 | B1 | 2/2002 | Lin et al. |
| 6,373,441 | B1 | 4/2002 | Porath et al. |
| 6,437,747 | B1 | 8/2002 | Stoiljkovic et al. |
| 6,476,774 | B1 | 11/2002 | Davidson et al. |
| 6,528,145 | B1 * | 3/2003 | Berger ................. H05K 1/0373 428/209 |
| 6,552,687 | B1 | 4/2003 | Rawnick et al. |
| 6,556,169 | B1 | 4/2003 | Fukuura et al. |
| 6,621,381 | B1 | 9/2003 | Kundu et al. |
| 6,743,744 | B1 | 6/2004 | Kim et al. |
| 6,794,324 | B1 | 9/2004 | Kim et al. |
| 6,816,118 | B2 | 11/2004 | Kingsley et al. |
| 6,816,128 | B1 | 11/2004 | Jennings |
| 6,855,478 | B2 | 2/2005 | DeVoe et al. |
| 7,161,535 | B2 | 1/2007 | Palmer et al. |
| 7,179,844 | B2 | 2/2007 | Aki |
| 7,183,975 | B2 | 2/2007 | Thomas et al. |
| 7,196,663 | B2 | 3/2007 | Bozer et al. |
| 7,253,789 | B2 | 8/2007 | Kingsley et al. |
| 7,279,030 | B2 | 10/2007 | Kurowski |
| 7,292,204 | B1 | 11/2007 | Chang et al. |
| 7,310,031 | B2 | 12/2007 | Pance et al. |
| 7,355,560 | B2 | 4/2008 | Nagai |
| 7,379,030 | B1 | 5/2008 | Lier |
| 7,382,322 | B1 | 6/2008 | Yang et al. |
| 7,405,698 | B2 | 7/2008 | De Rochemont |
| 7,443,363 | B2 | 10/2008 | Ying |
| 7,498,969 | B1 | 3/2009 | Paulsen et al. |
| 7,534,844 | B2 | 5/2009 | Lee et al. |
| 7,545,327 | B2 | 6/2009 | Iellici et al. |
| 7,550,246 | B2 | 6/2009 | Fukuzumi et al. |
| 7,570,219 | B1 | 8/2009 | Paulsen et al. |
| 7,595,765 | B1 | 9/2009 | Hirsch et al. |
| 7,636,063 | B2 | 12/2009 | Channabasappa |
| 7,649,029 | B2 | 1/2010 | Kolb et al. |
| 7,663,553 | B2 | 2/2010 | Chang et al. |
| 7,688,263 | B1 | 3/2010 | Oxley |
| 7,710,325 | B2 | 5/2010 | Cheng |
| 7,767,728 | B2 | 8/2010 | Lu et al. |
| 7,796,080 | B1 | 9/2010 | Lynch et al. |
| 7,824,839 | B2 | 11/2010 | Ober et al. |
| 7,835,600 | B1 | 11/2010 | Yap et al. |
| 7,876,283 | B2 | 1/2011 | Bouche et al. |
| 7,935,476 | B2 | 5/2011 | Teng |
| 7,961,148 | B2 | 6/2011 | Goldberger |
| 8,018,397 | B2 | 9/2011 | Jow et al. |
| 8,098,187 | B1 | 1/2012 | Lynch et al. |
| 8,098,197 | B1 | 1/2012 | Herting et al. |
| 8,119,214 | B2 | 2/2012 | Schwantes et al. |
| 8,193,973 | B2 | 6/2012 | Morton et al. |
| 8,232,043 | B2 | 7/2012 | Williamson et al. |
| 8,497,804 | B2 | 7/2013 | Haubrich et al. |
| 8,498,539 | B1 | 7/2013 | Ilchenko et al. |
| 8,736,502 | B1 | 5/2014 | Langfield et al. |
| 8,773,319 | B1 | 7/2014 | Anderson et al. |
| 8,902,115 | B1 | 12/2014 | Loui et al. |
| 8,957,819 | B2 * | 2/2015 | Lin ........................ H01Q 21/08 343/785 |
| 8,980,971 | B2 | 3/2015 | Ueda et al. |
| 9,112,273 | B2 | 8/2015 | Christie et al. |
| 9,184,697 | B2 * | 11/2015 | Sekiguchi ................ H03B 7/08 |
| 9,205,601 | B2 | 12/2015 | Desimone et al. |
| 9,225,070 | B1 | 12/2015 | Zeweri et al. |
| 9,455,488 | B2 | 9/2016 | Chirila |
| 9,583,837 | B2 | 2/2017 | Xue et al. |
| 9,608,330 | B2 | 3/2017 | Singleton et al. |
| 9,825,373 | B1 | 11/2017 | Smith |
| 9,917,044 | B2 | 3/2018 | Zhou et al. |
| 9,930,668 | B2 | 3/2018 | Barzegar et al. |
| 9,944,031 | B2 * | 4/2018 | Thompson ......... B29D 11/0073 |
| 10,355,361 | B2 | 7/2019 | Pance et al. |
| 10,355,367 | B2 | 7/2019 | Henry et al. |

(56) References Cited

U.S. PATENT DOCUMENTS 10,476,164 B2 11/2019 Pance et al.
10,522,917 B2 12/2019 Pance et al.
10,587,039 B2 3/2020 Pance et al.
10,601,137 B2 3/2020 Pance et al.
11,108,159 B2 8/2021 Pance et al.
11,401,353 B2 8/2022 Polidore et al.
11,574,849 B2 2/2023 Gmundner et al.
11,787,878 B2 10/2023 Polidore et al.
2001/0013842 A1 8/2001 Ishikawa et al.
2001/0025203 A1 9/2001 Gervasi
2001/0043158 A1* 11/2001 Adachi ................ H01Q 9/0485 343/700 MS
2002/0000947 A1 1/2002 Al-Rawi et al.
2002/0057138 A1 5/2002 Takagi et al.
2002/0067317 A1 6/2002 Sakurada
2002/0149108 A1 10/2002 Ahn et al.
2002/0180646 A1 12/2002 Kivekas et al.
2002/0196190 A1 12/2002 Lim
2003/0016176 A1 1/2003 Kingsley et al.
2003/0034922 A1 2/2003 Isaacs et al.
2003/0043075 A1 3/2003 Bit-Babik et al.
2003/0043086 A1 3/2003 Schaffner et al.
2003/0122729 A1 7/2003 Diaz et al.
2003/0151548 A1 8/2003 Kingsley et al.
2003/0181312 A1 9/2003 Mailadil et al.
2004/0029709 A1 2/2004 Oba et al.
2004/0029985 A1 2/2004 Aki et al.
2004/0036148 A1 2/2004 Block et al.
2004/0051602 A1* 3/2004 Pance .................. H01P 1/2084 333/219.1
2004/0080455 A1* 4/2004 Lee ...................... H01Q 21/065 343/700 MS
2004/0113843 A1 6/2004 Le Bolzer et al.
2004/0119646 A1* 6/2004 Ohno .................. H01Q 9/0485 343/700 MS
2004/0127248 A1 7/2004 Lin et al.
2004/0130489 A1 7/2004 Le Bolzer et al.
2004/0155817 A1 8/2004 Kingsley et al.
2004/0170809 A1 9/2004 Williams et al.
2004/0233107 A1 11/2004 Popov et al.
2004/0257176 A1* 12/2004 Pance ....................... H01P 7/10 333/219.1
2004/0263422 A1 12/2004 Lynch
2005/0017903 A1* 1/2005 Ittipiboon ................ H01Q 5/40 343/700 MS
2005/0024271 A1 2/2005 Ying et al.
2005/0057402 A1 3/2005 Ohno et al.
2005/0099348 A1 5/2005 Pendry
2005/0122273 A1 6/2005 Legay et al.
2005/0154567 A1 7/2005 Jackman et al.
2005/0162316 A1 7/2005 Thomas et al.
2005/0162733 A1 7/2005 Cho et al.
2005/0179598 A1 8/2005 Legay et al.
2005/0200531 A1* 9/2005 Huang ................. H01Q 19/026 343/893
2005/0219130 A1 10/2005 Koch et al.
2005/0225499 A1 10/2005 Kingsley et al.
2005/0242996 A1 11/2005 Palmer et al.
2005/0248421 A1 11/2005 Joodaki
2005/0264449 A1 12/2005 Strickland
2005/0264451 A1* 12/2005 Aikawa ................ H01Q 21/065 343/700 MS
2005/0264452 A1 12/2005 Fujishima et al.
2005/0285115 A1 12/2005 Nakagawa et al.
2006/0022379 A1 2/2006 Wicker et al.
2006/0022875 A1 2/2006 Pidwerbetsky et al.
2006/0119518 A1 6/2006 Ohmi et al.
2006/0145705 A1 7/2006 Raja
2006/0194690 A1 8/2006 Osuzu
2006/0220958 A1 10/2006 Saegrov
2006/0232474 A1 10/2006 Fox
2006/0293651 A1 12/2006 Cronin
2007/0067058 A1 3/2007 Miyamoto et al.
2007/0152884 A1 7/2007 Bouche et al.
2007/0164420 A1 7/2007 Chen et al.
2007/0252778 A1 11/2007 Ide et al.
2008/0036675 A1 2/2008 Fujieda
2008/0042903 A1 2/2008 Cheng
2008/0048915 A1 2/2008 Chang et al.
2008/0079182 A1 4/2008 Thompson et al.
2008/0094309 A1 4/2008 Pance et al.
2008/0122703 A1 5/2008 Ying
2008/0129616 A1 6/2008 Li et al.
2008/0129617 A1 6/2008 Li et al.
2008/0019195 A1 8/2008 Tokoro et al.
2008/0193749 A1 8/2008 Thompson et al.
2008/0202720 A1 8/2008 Wagstaff
2008/0260323 A1 10/2008 Jalali et al.
2008/0272963 A1 11/2008 Chang et al.
2008/0278378 A1 11/2008 Chang et al.
2009/0040131 A1 2/2009 Mosallaei
2009/0073332 A1 3/2009 Irie
2009/0102739 A1 4/2009 Chang et al.
2009/0128262 A1 5/2009 Lee et al.
2009/0128434 A1 5/2009 Chang et al.
2009/0140944 A1 6/2009 Chang et al.
2009/0153403 A1 6/2009 Chang et al.
2009/0179810 A1 7/2009 Kato et al.
2009/0184875 A1 7/2009 Chang et al.
2009/0206957 A1 8/2009 Hiroshima et al.
2009/0262022 A1 10/2009 Ying
2009/0270244 A1 10/2009 Chen et al.
2009/0305652 A1 12/2009 Boffa et al.
2010/0002312 A1 1/2010 Duparre et al.
2010/0051340 A1 3/2010 Yang et al.
2010/0103052 A1 4/2010 Ying
2010/0156754 A1 6/2010 Kondou
2010/0220024 A1 9/2010 Snow et al.
2010/0231452 A1 9/2010 Babakhani et al.
2011/0012807 A1 1/2011 Sorvala
2011/0050367 A1 3/2011 Yen et al.
2011/0121258 A1 5/2011 Hanein et al.
2011/0122036 A1 5/2011 Leung et al.
2011/0133991 A1 6/2011 Lee et al.
2011/0204531 A1 8/2011 Hara et al.
2011/0248890 A1 10/2011 Lee et al.
2012/0003449 A1 1/2012 Yializis et al.
2012/0045619 A1 2/2012 Ando et al.
2012/0092219 A1 4/2012 Kim
2012/0212386 A1 8/2012 Massie et al.
2012/0242553 A1 9/2012 Leung et al.
2012/0245016 A1 9/2012 Curry et al.
2012/0256796 A1 10/2012 Leiba
2012/0274523 A1 11/2012 Ayatollahi
2012/0276311 A1 11/2012 Chirila
2012/0280380 A1 11/2012 Kamgaing
2012/0287008 A1 11/2012 Kim
2012/0306713 A1 12/2012 Raj et al.
2012/0329635 A1 12/2012 Hill
2013/0076570 A1 3/2013 Lee et al.
2013/0088396 A1 4/2013 Han
2013/0113674 A1 5/2013 Ryu
2013/0120193 A1 5/2013 Hoppe et al.
2013/0127669 A1 5/2013 Han et al.
2013/0234898 A1 9/2013 Leung et al.
2013/0278610 A1* 10/2013 Stephanou ................ H01P 7/06 333/231
2014/0043189 A1 2/2014 Lee et al.
2014/0043202 A1 2/2014 Wong et al.
2014/0091103 A1 4/2014 Neitzel
2014/0327591 A1 11/2014 Kokkinos
2014/0327597 A1* 11/2014 Rashidian ............ H01Q 9/0485 343/905
2015/0035714 A1 2/2015 Zhou
2015/0070230 A1 3/2015 Bradley et al.
2015/0077198 A1* 3/2015 Yatabe .................. H01P 1/2084 333/208
2015/0138036 A1 4/2015 Harper
2015/0183167 A1 7/2015 Molinari et al.
2015/0207233 A1 7/2015 Kim et al.
2015/0207234 A1 7/2015 Ganchrow et al.
2015/0236428 A1 8/2015 Caratelli et al.
2015/0244082 A1 8/2015 Caratelli et al.

(56) References Cited

U.S. PATENT DOCUMENTS

| | | | |
|---|---|---|---|
| 2015/0266244 A1 | 9/2015 | Page | |
| 2015/0303546 A1 | 10/2015 | Rashidian et al. | |
| 2015/0314526 A1 | 11/2015 | Cohen | |
| 2015/0346334 A1 | 12/2015 | Nagaishi et al. | |
| 2015/0380824 A1* | 12/2015 | Tayfeh Aligodarz | H01Q 15/0066 430/319 |
| 2016/0036132 A1 | 2/2016 | Rumpf et al. | |
| 2016/0107290 A1 | 4/2016 | Bajaj et al. | |
| 2016/0111769 A1 | 4/2016 | Pance et al. | |
| 2016/0218437 A1 | 7/2016 | Guntupalli et al. | |
| 2016/0219976 A1 | 8/2016 | Guyan | |
| 2016/0263823 A1 | 9/2016 | Espiau et al. | |
| 2016/0294066 A1 | 10/2016 | Djerafi et al. | |
| 2016/0294068 A1 | 10/2016 | Djerafi et al. | |
| 2016/0313306 A1 | 10/2016 | Ingber et al. | |
| 2016/0314431 A1 | 10/2016 | Quezada | |
| 2016/0322708 A1* | 11/2016 | Tayfeh Aligodarz | H01Q 21/0087 |
| 2016/0351996 A1 | 12/2016 | Ou | |
| 2016/0372955 A1 | 12/2016 | Fackelmeier et al. | |
| 2017/0018851 A1 | 1/2017 | Henry et al. | |
| 2017/0040700 A1* | 2/2017 | Leung | H01Q 9/0485 |
| 2017/0062944 A1 | 3/2017 | Zimmerman et al. | |
| 2017/0110804 A1 | 4/2017 | Henry et al. | |
| 2017/0125901 A1 | 5/2017 | Sharawi et al. | |
| 2017/0125908 A1 | 5/2017 | Pance et al. | |
| 2017/0125909 A1* | 5/2017 | Pance | H01Q 9/0485 |
| 2017/0125910 A1* | 5/2017 | Pance | H01Q 9/0485 |
| 2017/0179569 A1 | 6/2017 | Kim et al. | |
| 2017/0188874 A1 | 7/2017 | Suhami | |
| 2017/0201026 A1 | 7/2017 | Werner et al. | |
| 2017/0225395 A1 | 8/2017 | Boydston et al. | |
| 2017/0256847 A1 | 9/2017 | Vollmer et al. | |
| 2017/0271772 A1 | 9/2017 | Miraftab et al. | |
| 2017/0272149 A1 | 9/2017 | Michaels | |
| 2017/0324171 A1 | 11/2017 | Shehan | |
| 2017/0360534 A1 | 12/2017 | Sun et al. | |
| 2018/0007746 A1 | 1/2018 | Smith | |
| 2018/0054234 A1 | 2/2018 | Stuckman et al. | |
| 2018/0069594 A1 | 3/2018 | Henry et al. | |
| 2018/0090815 A1 | 3/2018 | Shirinfar et al. | |
| 2018/0115072 A1 | 4/2018 | Pance et al. | |
| 2018/0183150 A1 | 6/2018 | Sienkiewicz et al. | |
| 2018/0241129 A1 | 8/2018 | Pance et al. | |
| 2018/0282550 A1 | 10/2018 | Burgess et al. | |
| 2018/0290377 A1 | 10/2018 | Talken et al. | |
| 2018/0309202 A1 | 10/2018 | Pance et al. | |
| 2018/0323514 A1 | 11/2018 | Pance et al. | |
| 2019/0020105 A1 | 1/2019 | Pance et al. | |
| 2019/0115668 A1 | 4/2019 | Coward et al. | |
| 2019/0128624 A1 | 5/2019 | Cohen et al. | |
| 2019/0214732 A1 | 7/2019 | Leung et al. | |
| 2019/0221926 A1 | 7/2019 | Pance et al. | |
| 2019/0221939 A1 | 7/2019 | George et al. | |
| 2019/0221940 A1 | 7/2019 | Pance et al. | |
| 2019/0288360 A1 | 9/2019 | Hendry | |
| 2019/0319357 A1 | 10/2019 | Pance et al. | |
| 2019/0319358 A1 | 10/2019 | Pance et al. | |
| 2019/0379123 A1 | 12/2019 | Leung et al. | |
| 2019/0393607 A1 | 12/2019 | Pance et al. | |
| 2020/0083602 A1 | 3/2020 | Sethumadhavan et al. | |
| 2020/0083609 A1 | 3/2020 | Pance et al. | |
| 2020/0083610 A1 | 3/2020 | Pance et al. | |
| 2020/0099136 A1 | 3/2020 | Pance et al. | |
| 2020/0122387 A1 | 4/2020 | Polidore et al. | |
| 2020/0176876 A1 | 6/2020 | Pance et al. | |
| 2020/0194881 A1 | 6/2020 | Pance et al. | |
| 2020/0227827 A1 | 7/2020 | Vollmer et al. | |
| 2021/0328356 A1 | 10/2021 | Polidore et al. | |
| 2022/0064466 A1 | 3/2022 | Pujari et al. | |
| 2022/0181052 A1 | 6/2022 | Williams et al. | |
| 2022/0185936 A1 | 6/2022 | Abell et al. | |
| 2024/0002554 A1 | 1/2024 | Polidore et al. | |

FOREIGN PATENT DOCUMENTS

| | | | |
|---|---|---|---|
| CN | 102130376 | | 7/2011 |
| CN | 102130377 | A | 7/2011 |
| CN | 104037505 | A | 9/2014 |
| CN | 105390809 | A | 3/2016 |
| CN | 105490005 | A | 4/2016 |
| CN | 106299672 | A | 1/2017 |
| CN | 107111225 | A | 8/2017 |
| CN | 107249762 | A | 10/2017 |
| CN | 107415235 | A | 12/2017 |
| CN | 109232831 | A | 1/2019 |
| CN | 110380230 | A | 10/2019 |
| CN | 216288983 | U | 4/2022 |
| DE | 10057686 | A1 | 6/2002 |
| EP | 0468413 | A2 | 1/1992 |
| EP | 0587247 | A1 | 3/1994 |
| EP | 0801436 | A2 | 10/1997 |
| EP | 1783516 | A1 | 5/2007 |
| EP | 2905632 | A1 | 8/2015 |
| GB | 2050231 | A | 1/1981 |
| GB | 2575946 | A | 1/2020 |
| JP | H05224412 | A | 9/1993 |
| JP | H0665334 | A | 3/1994 |
| JP | H07154114 | A | 6/1995 |
| JP | 08191211 | A | 7/1996 |
| JP | H106346 | A | 1/1998 |
| JP | 2000209022 | A | 7/2000 |
| JP | 2003344629 | A | 12/2003 |
| JP | 2004112131 | A | 4/2004 |
| JP | 2013211841 | A | 10/2010 |
| JP | 2015138240 | A | 7/2015 |
| JP | 2020520398 | A | 7/2020 |
| KR | 20180105589 | A | 9/2018 |
| RU | 2660385 | | 7/2018 |
| TW | 223683 | B | 5/1994 |
| TW | 201627689 | A | 8/2016 |
| WO | 9513565 | A1 | 5/1995 |
| WO | 0076028 | A1 | 12/2000 |
| WO | 03100484 | A2 | 12/2003 |
| WO | 2005002833 | A1 | 1/2005 |
| WO | 2012129968 | A1 | 10/2012 |
| WO | 2014100462 | A1 | 6/2014 |
| WO | 2014126837 | A2 | 8/2014 |
| WO | 2015102938 | A1 | 7/2015 |
| WO | 2016153711 | A1 | 9/2016 |
| WO | 2017040883 | A1 | 3/2017 |
| WO | 2017075177 | A1 | 5/2017 |
| WO | 2017075184 | A1 | 5/2017 |
| WO | 2017090401 | A1 | 6/2017 |
| WO | 2018010443 | A1 | 1/2018 |
| WO | 2017075186 | A1 | 5/2018 |
| WO | 2018226657 | A1 | 12/2018 |

OTHER PUBLICATIONS

A. B. Kakade and B. Ghosh, "Mode Excitation in the Coaxial Probe Coupled Three-Layer Hemispherical Dielectric Resonator Antenna," in IEEE Transactions on Antennas and Propagation, vol. 59, No. 12, pp. 4463-4469, Dec. 2011, doi: 10.1109/TAP.2011.2165480.*

R. K. Chaudhary, K. V. Srivastava and A. Biswas, "A Concentric three-layer half-split cylindrical dielectric resonator antenna for wideband applications," 2013 International Symposium on Electromagnetic Theory, Hiroshima, Japan, 2013, pp. 664-667.*

Y. Zhang and A. A. Kishk, "Analysis of Dielectric Resonator Antenna Arrays with Supporting Perforated Rods," The Second European Conference on Antennas and Propagation, EuCAP 2007, Edinburgh, 2007, pp. 1-5, doi: 10.1049/ic.2007.1421.*

Akbari, et al., "Comparison between Circularly-Polarized Hybrid DR/Conical Horn and Hybrid DR /spherical Lens Antennas in Millimeter Wave" 2016 IEEE 5th Asia-Pacific Conference on Antennas and Propagation (pp. 261-262).

Abdulmajid, et al., "Higher Order Mode Layered Cylindrical Dielectric Resonator Antenna", Progress in Electromagnetics Research C., vol. 90, 2019 (13 pgs).

Abdulmajid, et al., "Higher-Order-Mode Circularly Polozrized Two-

(56) References Cited

OTHER PUBLICATIONS

Layer Rectangular Dielectric Resonator Antenna" IEEE Antennas and Wireless Progagation Letters, vol. 17, No. 6, Jun. 2018 (4 pgs).
Bhattacharya, et al., "Broadbanding and multi-frequency in dielectric resonator antennas: a comprehensive review", International Journal of Microwave and Wireless Technologies, 2022 (pp. 1-17).
Nannini, et al., "A Dual-Frequency Dielectric Resonator Antenna" Microwave and Optical Technology Letters, vol. 38, No. 1, Jul. 5, 2003 (2 pgs).
Walsh, et al., "An Investigation of Stacked and Embedded Cylindrical Dielectric Resonator Antennas" IEEE Antennas and Wireless Propagation Letters, vol. 5, 2006 (4 pgs).
Zainud-Deen SH et al: High Directive Dielectric resonator antenna over curved ground plane using metamaterials, National Radio Science Conference IEEE, Apr. 26, 2011 pp. 1-9.
Boriskin et al. "Integrated Lens Antennas" In: "Aperture Antennas for Millimeter and Sub-Millimeter Wave Applications", Sep. 8, 2017, International Publishing, pp. 3-36.
Elboushi A. et al., "High Gain Hybrid DRA/Horn antenna for MMW Applications", Concordia University; 2014 IEEE; 2 pages.
Hesselbarth et al., "Millimeter-wave front-end integration concept using beam-switched lens antenna", 2016 10th European Conference on Antennas and Propagation, European Assoc. of Antennas and Propagation, Apr. 10, 2016; pp. 1-5.
Lei, Juan et al., "Experimental demonstration of conformal phased array antenna via transformation optics," Scientific Reports, vol. 8, No. 1, Feb. 28, 2018, 14 pages.
Tang, W. et al., "Discrete Coordinate Transformation for Designing All-Dielectric Flat Antennas", IEEE Transactions on Antennas and Propagation, vol. 58, No. 12, Dec. 2010 pp. 3795-3804.
Thornton et al., "Introduction" In: "Modern Lens Antennas for Communications Engineering", Jan. 1, 2013 John Wiley & Sons, Inc. pp. 1-48.
"New 3D Printed Electromagnetic Lense from OmniPreSense"; URL: http://www.microwavejournal.com/articles/31133-new-3d-printed-electromagnetic-lens-from-omnipresense; Date of Access: Oct. 16, 2018; 8 pages.
"Photoacid Generator Selection Guide for the electronics industry and energy curable coatings" (BASF 2010).
Atabak Rashidian et al; "Photoresist-Based Polymer Resonator Antennas: Lithography Fabrication, Strip-Fed Excitation, and Multimode Operation", IEEE Antennas and Propagation Magazine, IEEE Service Center; vol. 53, No. 4, Aug. 1, 2011; 16-27 pages.
Buerkle, A. et al; "Fabrication of a DRA Array Using Ceramic Stereolithography"; IEEE Antennas and Wireless Popagation Letters; IEEE; vol. 5,, No. 1, Jan. 2007; pp. 479-481.
Guo, Yomg-Xin, et al.,; "Wide-Band Stacked Double Annular-Ring Dielectric Resonator Antenna at the End-Fire Mode Operation"; IEEE Transacions on Antennas and Propagation; vol. 53; No. 10; Oct. 2005; 3394-3397 pages.
Kakade, A.B., et al; "Analysis of the Rectangular Waveguide Slot Coupled Multilayer hemispherical Dielectric Resonator Antenna"; IET Microwaves, Antennas & Propagation, the Institution of Engineering and Technology; vol. 6; No. 3; Jul. 11, 2011; 338-347 pages.
Kakade, Anandrao, et al.; Mode Excitation in the Coaxial Probe Coupled Three-Layer Hemispherical Dielectric Resonator Antenna; IEEE Transactions on Antennas and Propagation; vol. 59; No. 12; Dec. 2011; 7 pages.
Keysight Technologies; "Split Post Dielectric Resonators for Dielectric Measurements of Substrates"; Keysight Technologies, Dec. 2, 2017; 5989-5384EN, pp. 1-11.
Kishk, A. Ahmed, et al.,; "Analysis of Dielectric-Resonator with Emphasis on Hemispherical Structures"; IEEE Antennas & Propagation Magazine; vol. 36; No. 2; Apr. 1994; 20-31 pages.
Krupka et al.; "Split post dielectric resonator technique for precise measurements of laminar dielectric specimens—Measurement uncertainties"; IEEE Xplore Conference Paper Feb. 2000, pp. 305-308.
Krupka J., Gregory A.P., Rochard O.C., Clarke R.N., Riddle B., Baker-Jarvis J., Uncertainty of Complex Permittivity Measurement by Split-Post Dielectric Resonator Techniques, Journal of the European Ceramic Society, No. 10, pp. 2673-2676, 2001.
Krupka, J., Geyer, R.G., Baker-Jarvis, J., Ceremuga, J., Measurements of the complex permittivity of microwave circuit board substrates using split dielectric resonator and reentrant cavity techniques, Seventh International Conference on Dielectric Materials, Measurements and Applications, (Conf. Publ. No. 430), pp. 21-24, Sep. 1996.
Liang, M. et al.; "A 3-D Luneburg lens antenna fabricated by polymer jetting rapid prototyping," IEEE Transactions on Antennas and Propagation, 62(4), Apr. 2014, 1799-1807.
Petosa, Aldo, et al.; "Dielectric Resonator Antennas: A Historical Review and the Current State of the Art"; IEEE Antennas and Propagation Magazine; vol. 52, No. 5, Oct. 2010; 91-116 pages.
Raghvendra Kumar Chaudhary et al; Variation of Permittivity in Radial Direction in Concentric Half-Split Cylindrical Dielectric Resonator Antenna for Wideband Application: Permittivity Variation in R-Dir. in CDRA; International Journal of RF and Microwave Computer-Aided Engineering; vol. 25; No. 4; May 1, 2015; pp. 321-329.
Ruan, Yu-Feng, et al; "Antenna Effects Consideration for Space-Time Coding UWB-Impulse Radio System in IEEE 802.15 Multipath Channel"; Wireless Communications, Networking and Mobile Computing; 2006; 1-4 pages.
Wong, Kin-Lu, et al.,; "Analysis of a Hemispherical Dielectric Resonator Antenna with an Airgap"; IEEE Microwave and Guided Wave Letters; vol. 3; No. 9; Oct. 3, 1993; 355-357 pages.
Zainud-Deen, S H et al; "Dielectric Resonator Antenna Phased Array for Fixed RFID Reader in Near Field Region"; IEEE; Mar. 6, 2012; pp. 102-107.
Zhang Shiyu et al.; "3D-Printed Graded Index Lenses for RF Applications"; ISAP 2016 International Symposium on Antennas and Propagation, Okinawa, Japan.; pp. 1-27.
Office Action issued in Japanese Patent Application No. 2021-518751; Application Filing Date Oct. 18, 2019; Date of Mailing Jul. 1, 2024 (8 pages).
Guo, Yong-Xin, et al. "Wide-Band Stacked Double Annular-Ring Dielectric Resonator Antenna at the End-Fire Mode Operation," IEEE Transactions on Antennas and Propogation, vol. 53, No. 10, Oct. 2005, 4 pages.
Kakade, A.B., et al. "Analysis of the rectangular waveguide slot coupled multilayer hemispherical dielectric resonator antenna" Inst. of Engineering and Tech. Microwaves, Antennas & Propogation. 2012, vol. 6, Iss. 3, pp. 338-347.
Nasimuddin et al., "Antennas with dielectric resonators and surface mounted short horns for high gain and large bandwith", IET Microw. Antennas Propag., vol. 1, No. 3, 2007; pp. 723-728.
Office Action issued in Chinese Patent Application No. 201980068541.9; Date of Mailing Nov. 3, 2022 (24 pages).
Office Action issued in Chinese Patent Application No. 202080039856.3; Date of Mailing Aug. 25, 2023 (14 pages).
Office Action issued in Chinese Patent Application No. 202080039856.3; Date of Mailing Feb. 1, 2024 (14 pages).
Office Action issued in Japanese Patent Application No. 2021-518751; Date of Mailing Jul. 18, 2023 (21 pages).
Office Action issued in Japanese Patent Application No. 2021-570968; Date of Mailing Feb. 5, 2024 (6 pages).
Office Action issued in Korean Patent Application No. 10-2018-7013709; Date of Mailing Feb. 1, 2023 (11 pages).
Search Reported issued in European Patent Application No. 23200317.8; Date of Mailing Jan. 17, 2024 (13 pages).

* cited by examiner

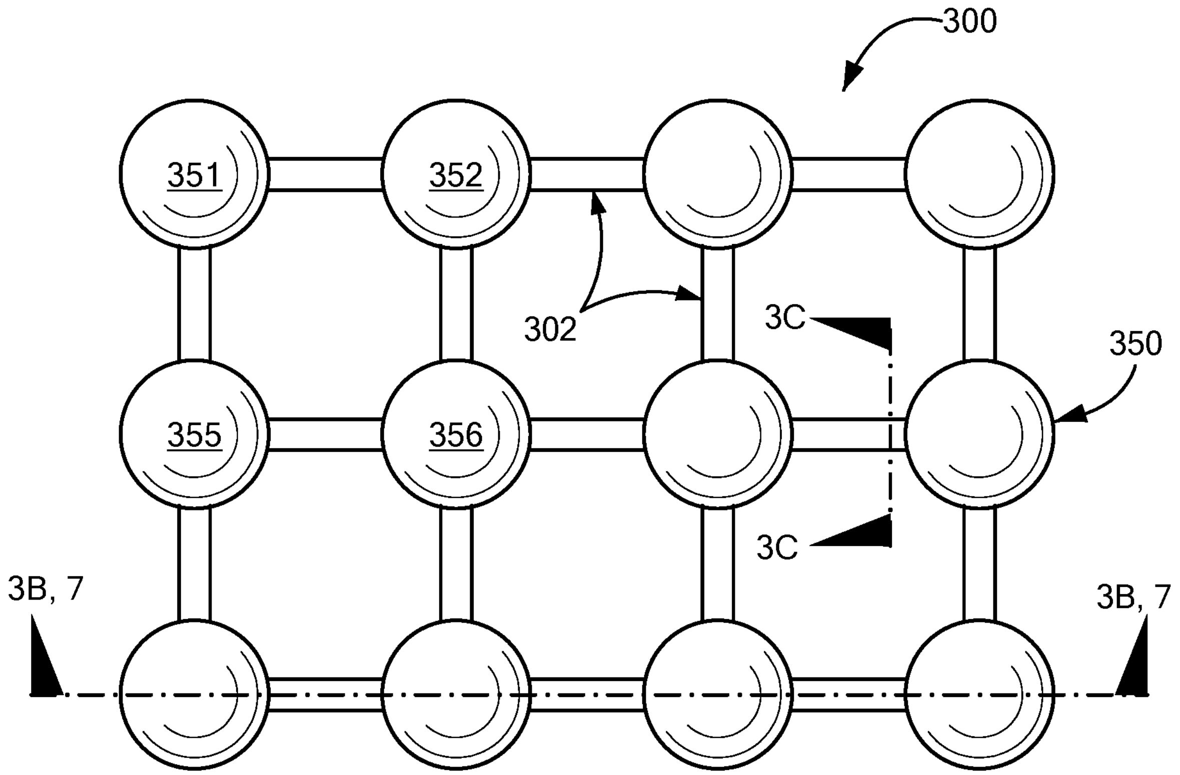
*FIG. 3A*
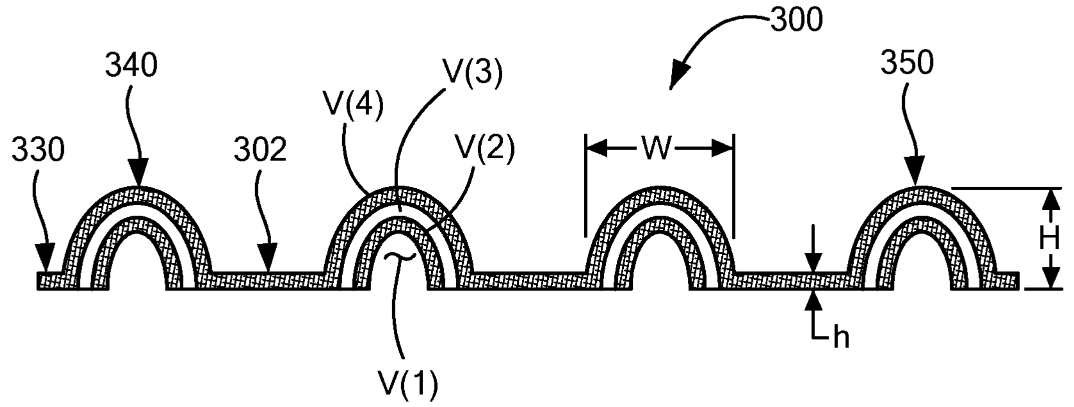
*FIG. 3B*
*FIG. 3C*
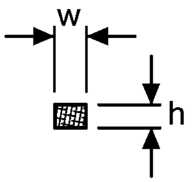

CONNECTED DIELECTRIC RESONATOR ANTENNA ARRAY AND METHOD OF MAKING THE SAME

CROSS REFERENCE TO RELATED APPLICATIONS

This application is a continuation application of U.S. application Ser. No. 15/957,043, filed Apr. 19, 2018, which claims the benefit of U.S. Provisional Application Ser. No. 62/500,065, filed May 2, 2017, and which also claims the benefit of U.S. Provisional Application Ser. No. 62/569,051, filed Oct. 6, 2017, which are incorporated herein by reference in their entireties.

BACKGROUND OF THE INVENTION

The present disclosure relates generally to a dielectric resonator antenna array (DRA array), particularly to an array having a multiple layer dielectric resonator antenna (DRA) structure, and more particularly to a broadband multiple layer DRA array having at least one single monolithic portion that forms a connected-DRA array structure that is well suited for microwave and millimeter wave applications.

Existing resonators and arrays employ patch antennas, and while such antennas may be suitable for their intended purpose, they also have drawbacks, such as limited bandwidth, limited efficiency, and therefore limited gain. Techniques that have been employed to improve the bandwidth have typically led to expensive and complicated multilayer and multi-patch designs, and it remains challenging to achieve bandwidths greater than 25%. Furthermore, multilayer designs add to unit cell intrinsic losses, and therefore reduce the antenna gain. Additionally, patch and multi-patch antenna arrays employing a complicated combination of metal and dielectric substrates make them difficult to produce using newer manufacturing techniques available today, such as three-dimensional (3D) printing (also known as additive manufacturing). Additionally, the relative positioning of small DRAs in a DRA array to provide a DRA array that is suitable for microwave and millimeter wave applications can involve costly fabrication techniques or processes, as a poorly arranged array of individual DRAs can have a significant effect on the overall performance of the DRA array.

Accordingly, and while existing DRAs may be suitable for their intended purpose, the art of DRAs would be advanced with a DRA array structure that can overcome the above noted drawbacks.

BRIEF DESCRIPTION OF THE INVENTION

An embodiment includes a connected dielectric resonator antenna array (connected-DRA array) operational at an operating frequency and associated operating wavelength, the connected-DRA array comprising: a plurality of dielectric resonator antennas (DRAs), each of the plurality of DRAs comprising at least one volume of non-gaseous dielectric material; wherein each of the plurality of DRAs has a proximal end at a base of the respective DRA, a distal end at an apex of the respective DRA, and an overall height, H, from the proximal end to the distal end as observed in an elevation view of the connected-DRA array; wherein each respective base of the plurality of DRAs is disposed on an electrically conductive ground structure, and corresponding ones of the distal end of the respective DRA are disposed at a distance away from the ground structure; wherein each of the plurality of DRAs is physically connected to at least one other of the plurality of DRAs via a relatively thin connecting structure, each connecting structure being relatively thin as compared to an overall outside dimension of one of the plurality of DRAs, each connecting structure having a cross sectional overall height, h, as observed in the elevation view of the connected-DRA array, that is less than the overall height, H, of a respective connected DRA and being formed of a thin sheet of the at least one of the at least one volume of non-gaseous dielectric material, each connecting structure and the associated volume of the at least one volume of non-gaseous dielectric material forming a single monolithic portion of the connected-DRA array; wherein the thin sheet extends over a substantial portion of the connected-DRA array as observed in a plan view of the connected-DRA array; wherein the overall height h is viewed in a same direction as the overall height H.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures:

FIG. 3A depicts a plan view of a four-by-three array of connected DRAs, in accordance with an embodiment;

FIG. 3B depicts a cross section elevation view through cut line 3B-3B of FIG. 3A where the outermost solid volumes of the connected DRAs are integrally formed with the connecting structures, in accordance with an embodiment;

FIG. 3C depicts a cross section elevation view through cut line 3C-3C of FIG. 3A, in accordance with an embodiment;

DETAILED DESCRIPTION OF THE INVENTION

Figure 1A:
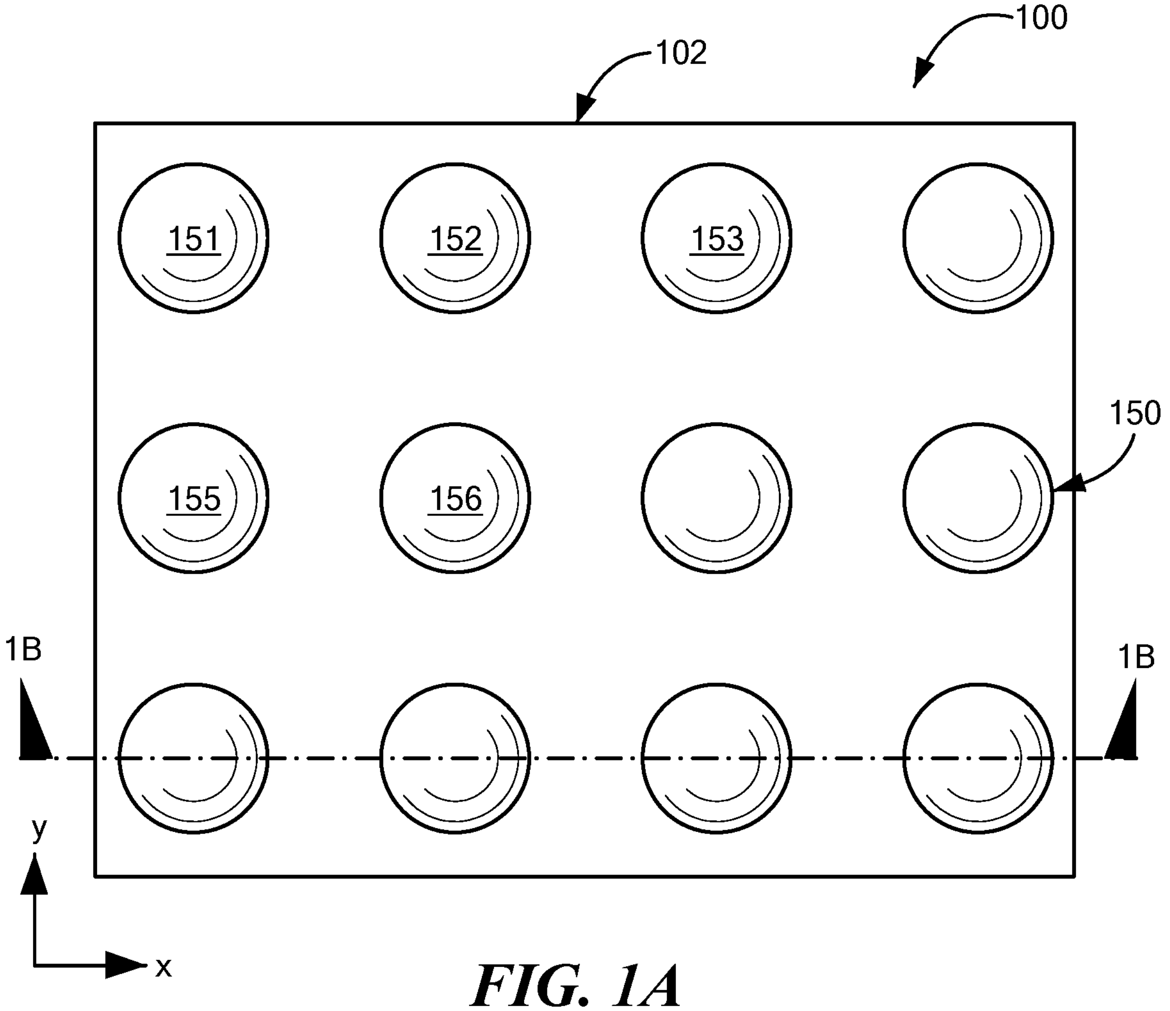
FIG. 1A depicts a plan view of a four-by-three array of connected DRAs in accordance with an embodiment.

Although the following detailed description contains many specifics for the purposes of illustration, anyone of ordinary skill in the art will appreciate that many variations and alterations to the following details are within the scope of the claims. Accordingly, the following example embodiments are set forth without any loss of generality to, and without imposing limitations upon, the claimed invention.

Embodiments disclosed herein include different arrangements useful for building a broadband DRA array that utilizes a plurality of layered and connected DRAs that form a connected-DRA array, where the different arrangements employ a common structure of dielectric layers having different thicknesses, different dielectric constants (Dks), or both different thicknesses and different dielectric constants, for each of the plurality of DRAs within a given DRA array. The resulting connected-DRA array includes at least one single monolithic portion that interconnects individual DRAs, with each DRA of the connected-DRA array formed having a plurality of volumes of dielectric materials arranged in a layered fashion, and with at least one of those volumes of dielectric materials being integrally formed with a relatively thin connecting structure that interconnects closest adjacent pairs of the plurality of DRAs, or diagonally closest pairs of the plurality of DRAs. As used herein, a distinction is made between the phrase "closest adjacent pairs of the plurality of DRAs", and the phrase "diagonally closest pairs of the plurality of DRAs". For example, on an x-y grid (from a plan view perspective), closest adjacent pairs of DRAs are those neighboring pairs of DRAs that are closer to each other than other neighboring pairs of DRAs, such as the diagonally disposed neighboring pairs, and diagonally closest pairs of the plurality of DRAs are those neighboring pairs of DRAs that are diagonally disposed closest neighboring pairs.

The particular shape of a multilayer DRA depends on the chosen dielectric constants for each layer. Each multilayer shell may have a cross sectional shape as viewed in an elevation view that is cylindrical, ellipsoid, ovaloid, dome-shaped or hemispherical, for example, or may be any other shape suitable for a purpose disclosed herein, and may have a cross sectional shape as viewed in a plan view that is circular, ellipsoidal or ovaloid, for example, or may be any other shape suitable for a purpose disclosed herein. Broad bandwidths (greater than 50% for example) can be achieved by changing the dielectric constants over the different layered shells, from a first relative minimum at the core, to a relative maximum between the core and the outer layer, back to a second relative minimum at the outer layer. A balanced gain can be achieved by employing a shifted shell configuration, or by employing an asymmetric structure to the layered shells. Each DRA is fed via a signal feed that may be a coaxial cable with a vertical wire extension, to achieve extremely broad bandwidths, or through a conductive loop of different lengths and shapes according to the symmetry of the DRA, or via a microstrip, a waveguide or a surface integrated waveguide. In an embodiment, the signal feed may include a semiconductor chip feed. The structure of the DRAs disclosed herein may be manufactured using methods such as compression or injection molding, 3D material deposition processes such as 3D printing, stamping, imprinting, or any other manufacturing process suitable for a purpose disclosed herein.

The several embodiments of DRAs and connected-DRA arrays disclosed herein are suitable for use in microwave and millimeter wave applications where broadband and high gain are desired, for replacing patch antenna arrays in microwave and millimeter wave applications, for use in 10-20 GHz radar applications, for use in 60 GHz communications applications, or for use in backhaul applications and 77 GHz radiators and arrays (e.g., such as automotive radar applications). Different embodiments will be described with reference to the several figures provided herein. However, it will be appreciated from the disclosure herein that features found in one embodiment but not another may be employed in the other embodiment, such as a fence for example, which is discussed in detail below.

In general, described herein is a family of DRAs for a connected-DRA array, where each family member comprises a plurality of DRAs that may be disposed on an electrically conductive ground structure, and where each DRA comprises at least one volume of non-gaseous dielectric material. Each of the plurality of DRAs is physically connected to at least one other of the plurality of DRAs via a relatively thin connecting structure. Each connecting structure is relatively thin as compared to an overall outside dimension of one of the plurality of DRAs, has a cross sectional overall height that is less than an overall height of a respective connected DRA, and is formed from at least one of the at least one volume of non-gaseous dielectric material. Each connecting structure and the associated volume of the at least one volume of non-gaseous dielectric material forms a single monolithic portion of the connected-DRA array.

Further described herein is a family of DRAs for a connected-DRA array, where each family member comprises a plurality of volumes of dielectric materials, which may be disposed on an electrically conductive ground structure. Each volume V(i), where i=1 to N, i and N being integers, with N designating the total number of volumes, of the plurality of volumes is arranged as a layered shell that is disposed over and at least partially embeds the previous volume, where V(1) is the innermost layer/volume and V(N) is the outermost layer/volume. In an embodiment, the layered shell that embeds the underlying volume, such as one or more of layered shells from at least V(i+1) to at least V(N−1) for example, embeds the underlying volume completely 100%. However, in another embodiment, one or more of the layered shells from at least V(i+1) to at least V(N−1) that embeds the underlying volume may purposefully embed only at least partially the underlying volume. In those embodiments that are described herein where the layered shell that embeds the underlying volume does so completely 100%, it will be appreciated that such embedding also encompasses microscopic voids that may be present in the overlying dielectric layer due to manufacturing or processes variations, intentional or otherwise, or even due to the inclusion of one or more purposeful voids or holes. As such, the term completely 100% is best understood to mean substantially completely 100%. In an embodiment, volume V(N) at least partially embeds all volumes V(1) to V(N−1).

While embodiments described herein depict N as an odd number, it is contemplated that the scope of the invention is not so limited, that is, it is contemplated that N could be an even number. As described and depicted herein, N is equal to or greater than 3, or alternatively, N is equal to or greater than 4 where all volumes V(2) to V(N−1) are volumes of solid or non-gaseous dielectric materials each having a defined shell thickness. In an embodiment, the first volume V(1) may be air, vacuum or any gas suitable for a purpose disclosed herein. In an embodiment, the outer volume V(N) may be a dielectric material, gaseous, non-gaseous or vacuum, having a dielectric constant about equal to free space. While reference is made herein to volumes of solid dielectric materials, it will be appreciated that the term non-gaseous may be substituted for the term solid, where both terms solid and non-gaseous are considered to be within a scope of the invention disclosed herein. While reference is made herein to a volume of dielectric material being air, it will be appreciated that the air may be replaced by a vacuum, free space, or any gas suitable for a purpose disclosed herein, all of which is considered to be within a scope of the invention disclosed herein.

The relative dielectric constants ($\varepsilon_i$) of directly adjacent (i.e., in intimate contact) ones of the plurality of volumes of dielectric materials differ from one layer to the next, and within a series of volumes range from a first relative minimum value at i=1, to a relative maximum value at i=2 to i=(N−1), back to a second relative minimum value at i=N. In an embodiment, the first relative minimum is equal to the second relative minimum. In another embodiment, the first relative minimum is different from the second relative minimum. In another embodiment, the first relative minimum is less than the second relative minimum. For example, in a non-limiting embodiment having five layers, N=5, the dielectric constants of the plurality of volumes of dielectric materials, i=1 to 5, may be as follows: $\varepsilon_1=2$, $\varepsilon_2=9$, $\varepsilon_3=13$, $\varepsilon_4=9$ and $\varepsilon_5=2$. It will be appreciated, however, that an embodiment of the invention is not limited to these exact values of dielectric constants, and encompasses any dielectric constant suitable for a purpose disclosed herein.

Excitation of the DRA is provided by a signal feed, such as a copper wire, a coaxial cable, a microstrip, a waveguide, a surface integrated waveguide, or a conductive ink, for example, that is electromagnetically coupled to one or more of the plurality of volumes of dielectric materials. As will be appreciated by one skilled in the art, the phrase electromagnetically coupled is a term of art that refers to an intentional transfer of electromagnetic energy from one location to another without necessarily involving physical contact between the two locations, and in reference to an embodiment disclosed herein more particularly refers to an interaction between a signal source having an electromagnetic resonant frequency that coincides with an electromagnetic resonant mode of a particular volume of the one or more of the plurality of volumes of dielectric materials. For example, a signal feed that is electromagnetically coupled to volume V(1), for example, means that the signal feed is particularly configured to have an electromagnetic resonant frequency that coincides with an electromagnetic resonant mode of volume V(1), and is not particularly configured to have an electromagnetic resonant frequency that coincides with an electromagnetic resonant mode of any other volume V(2) to V(N). In those signal feeds that are directly embedded in the DRA, the signal feed passes through the ground structure, in non-electrical contact with the ground structure, via an opening in the ground structure into one of the plurality of volumes of dielectric materials. As used herein, reference to dielectric materials includes air, which has a relative permittivity ($\varepsilon_r$) of approximately one at standard atmospheric pressure (1 atmosphere) and temperature (20 degree Celsius). As such, one or more of the plurality of volumes of dielectric materials disclosed herein may be air, such as volume V(1) or volume V(N), by way of example in a non-limiting way. As used herein, the term “relative permittivity” may be abbreviated to just “permittivity” or may be used interchangeably with the term “dielectric constant”. Regardless of the term used, one skilled in the art would readily appreciate the scope of the invention disclosed herein from a reading of the entire inventive disclosure provided herein.

Embodiments of the connected-DRA arrays disclosed herein are configured to be operational at an operating frequency (f) and associated wavelength (λ). In some embodiments the center-to-center spacing (via the overall geometry of a given DRA) between closest adjacent pairs of the plurality of DRAs within a given connected-DRA array may be equal to or less than λ, where λ is the operating wavelength of the connected-DRA array in free space. In some embodiments the center-to-center spacing between closest adjacent pairs of the plurality of DRAs within a given connected-DRA array may be equal to or less than λ and equal to or greater than λ/2. In some embodiments the center-to-center spacing between closest adjacent pairs of the plurality of DRAs within a given connected-DRA array may be equal to or less than λ/2. For example, at λ for a frequency equal to 10 GHz, the spacing from the center of one DRA to the center of a closet adjacent DRA is equal to or less than about 30 mm, or is between about 15 mm to about 30 mm, or is equal to or less than about 15 mm.

In some embodiments, the relatively thin connecting structures have a cross sectional overall height "h", as observed in an elevation view, that is less than an overall height "H" of a respective connected DRA (see FIGS. 3A, 3B, 3C for example). In some embodiments, the relatively thin connecting structures have a cross sectional overall height that is equal to or less than 50% of the overall height of a respective connected DRA. In some embodiments, the relatively thin connecting structures have a cross sectional overall height that is equal to or less than 20% of the overall height of a respective connected DRA. In some embodiments, the relatively thin connecting structures have a cross sectional overall height that is less than λ. In some embodiments, the relatively thin connecting structures have a cross sectional overall height that is equal to or less than λ/2. In some embodiments, the relatively thin connecting structures have a cross sectional overall height that is equal to or less than λ/4.

In some embodiments, the relatively thin connecting structures further have a cross sectional overall width "w", as observed in an elevation view, that is less than an overall width "W" of a respective connected DRA (see FIGS. 3A, 3B, 3C for example). In some embodiments, the relatively thin connecting structures have a cross sectional overall width that is equal to or less than 50% of the overall width of a respective connected DRA. In some embodiments, the relatively thin connecting structures have a cross sectional overall width that is equal to or less than 20% of the overall width of a respective connected DRA. In some embodiment, the relatively thin connecting structures have a cross sectional overall width that is equal to or less than λ/2. In some embodiments, the relatively thin connecting structures further have a cross sectional overall width that is equal to or less than λ/4.

In view of the foregoing, it will be appreciated that any connected-DRA disclosed herein and described in more detail herein below may have relatively thin connecting structures that in general have an overall cross section height "h" and that is less than an overall cross section height "H" of a respective connected DRA, and an overall cross section width "w" that is less than an overall cross section width "W" of a respective connected DRA, or may have any other height "h" and width "w" consistent with the foregoing description, particularly with respect to the height "h" and width "w" relative to the operating wavelength λ.

Variations to the layered volumes of the plurality of volumes of dielectric materials, such as 2D shape of footprint as observed in a plan view or a cross section of a plan view, 3D shape of volume as observed in an elevation view or a cross section of an elevation view, symmetry or asymmetry of one volume relative to another volume of a given plurality of volumes, and, presence or absence of material surrounding the outermost volume of the layered shells, may be employed to further adjust the gain or bandwidth to achieve a desired result. The several embodiments that are part of the family of DRAs for use in a connected-DRA array consistent with the above generalized description will now be described with reference to the several figures provided herein.

Figure 1B:
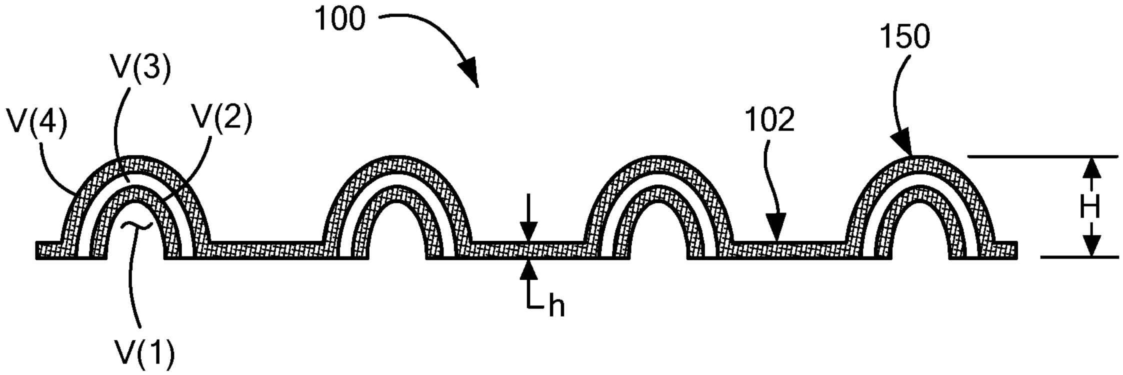
FIG. 1B depicts a cross section elevation view through cut line 1B-1B of FIG. 1A where the outermost solid volumes of the connected DRAs are integrally formed with the connecting structures, in accordance with an embodiment.

FIG. 1A depicts a plan view of an embodiment of a four-by-three connected-DRA array 100 having a plurality of DRAs 150 equally spaced apart relative to each other in both x and y directions on an x-y grid with a planar arrangement of relatively thin connecting structures 102 interconnecting closest adjacent pairs of the plurality of DRAs (151, 152 and 151, 155, for example), and interconnecting diagonally closest pairs of the plurality of DRAs (151, 156 and 156, 153, for example). In an embodiment, the plurality of DRAs 150, or any other DRAs disclosed herein, may be spaced apart relative to each other on a planar surface, or may be spaced apart relative to each other on a non-planar surface. FIG. 1B depicts a cross section view through cut line 1B-1B in FIG. 1A. As can be seen in the illustrated embodiment, each DRA 150 of the connected-DRA array 100 may be composed of four volumes of dielectric materials V(1), V(2), V(3) and V(4). In an embodiment, volume V(1) may be air while volumes V(2)-V(4) may be formed from a curable medium, such as a moldable polymer for example. As can also be seen in FIG. 1B, the relatively thin connecting structures 102 are not only made from the same material as volume V(4), but are also integrally formed with the outermost volume V(4) to form a single monolithic portion of the connected-DRA array 100. While embodiments of the plurality of DRAs (DRAs 150 or other DRAs disclosed herein below, for example) are depicted having a cross-sectional shape as observed in a plan view that is circular, it will be appreciated that the inventive scope is not so limited and encompasses any cross-sectional shape suitable for a purpose disclosed herein, such as ellipsoidal or ovaloid for example. While embodiments of the plurality of DRAs disclosed herein may be described and illustrated being spaced apart relative to each other on an x-y grid, it will be appreciated that the scope of the invention is not so limited, and encompasses other spacing arrangements, which are discussed further below with reference to FIGS. 23A, 23B, 23C, 234D, 23E and 23F.

While embodiments disclosed herein depict a certain number of DRAs in an array, such as a four-by-three array having twelve DRA elements for example, it will be appreciated that such description and illustration is exemplary only and that the scope of the invention is not so limited and extends to any number of DRA elements arranged in any variety of array configurations that may be suitable for a purpose disclosed herein.

From the foregoing, it will be appreciated that a generic structure for a family of connected-DRA arrays operational at an operating frequency and associated wavelength includes the following: a plurality of DRAs 150 having a plurality of volumes of dielectric materials having N volumes, N being an integer equal to or greater than 3 (N=4 in FIG. 1), disposed to form successive and sequential layered volumes V(i), i being an integer from 1 to N, wherein volume V(1) forms an innermost volume, wherein a successive volume V(i+1) forms a layered shell disposed over and at least partially embedding volume V(i), wherein volume V(N) at least partially embeds all volumes V(1) to V(N−1); and, wherein each of the plurality of DRAs 150 is physically connected to at least one other of the plurality of DRAs 150 via a relatively thin connecting structure 102, each connecting structure 102 being relatively thin as compared to an overall outside dimension of one of the plurality of DRAs, each connecting structure having a height "h" that is less than a height "H" of a respective connected DRA 150 and being formed from at least one of the plurality of volumes of dielectric materials, each connecting structure 102 and the associated volume of the at least one of the plurality of volumes of dielectric materials forming a single monolithic portion of the connected-DRA array 100.

Figure 2A:
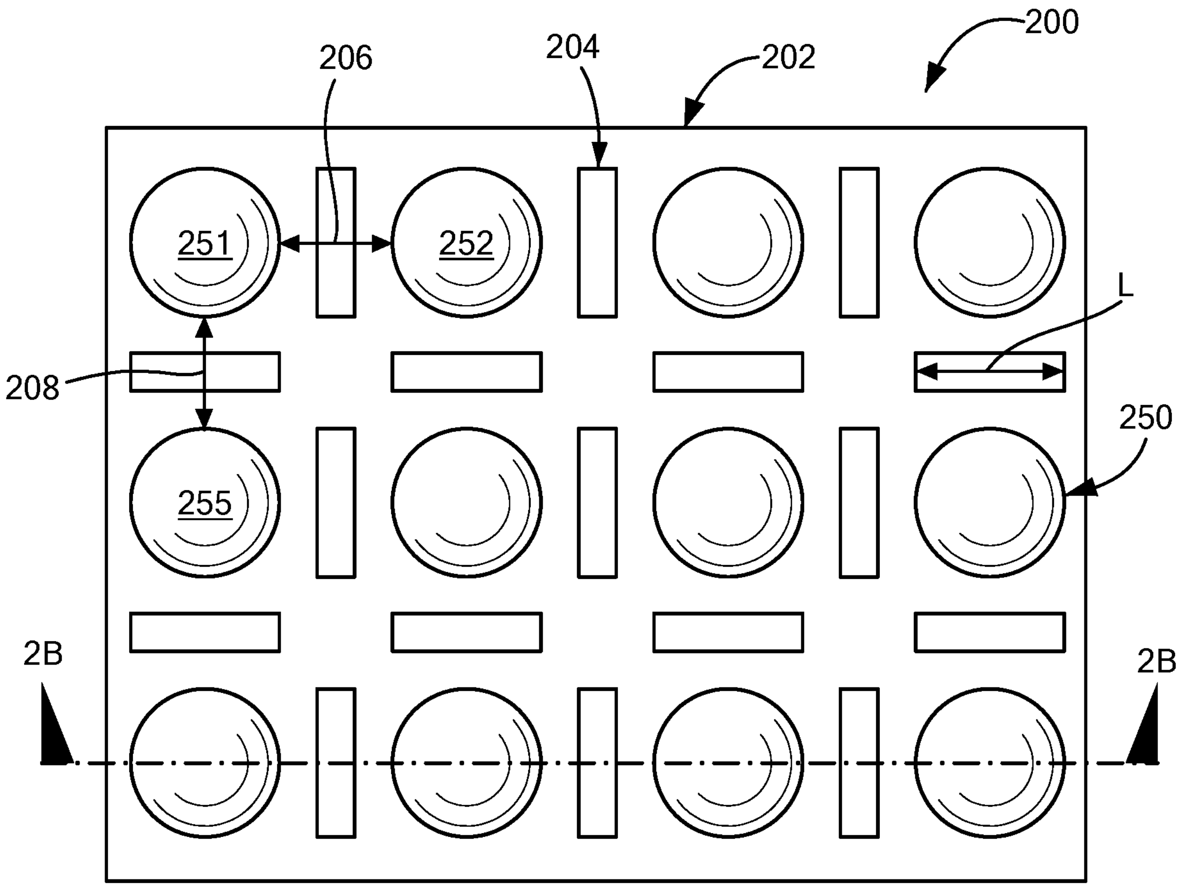
FIG. 2A depicts a plan view of a four-by-three array of connected DRAs, in accordance with an embodiment.
Figure 2B:
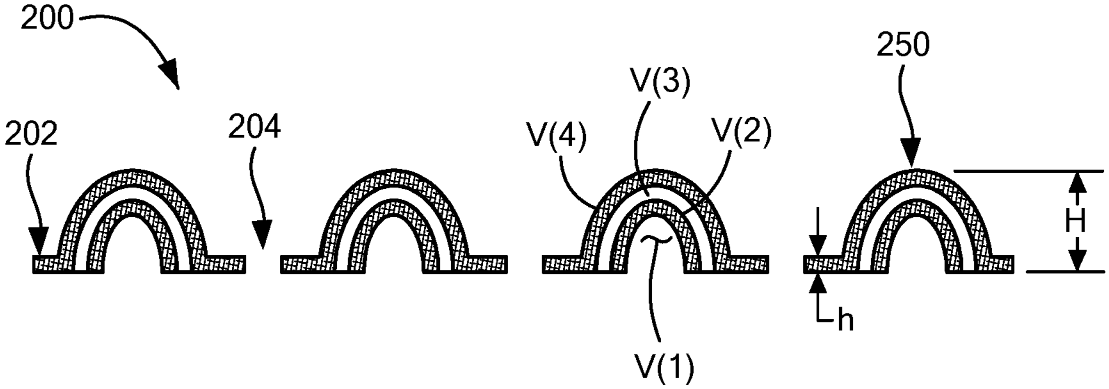
FIG. 2B depicts a cross section elevation view through cut line 2B-2B of FIG. 2A where the outermost solid volumes of the connected DRAs are integrally formed with the connecting structures, in accordance with an embodiment.

Reference is now made to FIGS. 2A and 2B, which depict a connected-DRA array 200 having a plurality of DRAs 250 similar to connected-DRA array 100 and DRAs 150 of FIGS. 1A and 1B. While certain features of connected-DRA array 200 may be the same, and in an embodiment are the same, as those of connected-DRA array 100 (e.g., the volume layering of the DRAs 250, and the height "h" of the relatively thin connecting structures 202, as compared to those features of connected-DRA array 100), a difference between connected-DRA array 200 and connected-DRA array 100 can be seen in the relatively thin connecting structures 202 of connected-DRA array 200, which includes through openings 204 in each region between closest adjacent pairs of the plurality of DRAs (251, 252 and 251, 255, for example). In an embodiment, each through opening 204 has a length "L", as observed in a plan view, sufficient to prevent straight line cross-talk 206, 208 between the closest adjacent pairs 251, 252 and 251, 255, for example, of the plurality of DRAs 250 via the respective connecting structure 202.

As can be seen from the embodiments of FIGS. 1A and 2A, the relatively thin connecting structures 102, 202 may be formed as thin sheets of a dielectric material, which because of their thickness (the overall cross sectional height "h" as disclosed herein) may have a dielectric constant value of upwards of Dk=10.

Reference is now made to FIGS. 3A, 3B and 3C, which depict a connected-DRA array 300 having a plurality of DRAs 350 similar to connected-DRA array 200 and DRAs 250 of FIGS. 2A and 2B. While certain structural features of connected-DRA array 300 may be the same, and in an embodiment are the same, as those of connected-DRA array 200 (e.g., the volume layering of the DRAs 350, and the height "h" of the relatively thin connecting structures 302, as compared to those features of connected-DRA array 200), a further difference between connected-DRA array 300 and connected-DRA array 200 can be seen in the cross section of the connecting structures 302 of connected-DRA array 300, which includes tube-like structures 302 that connect between closest adjacent pairs of the plurality of DRAs 350 (351, 352 and 351, 355, for example), as opposed to the planar structure 202. In an embodiment, each of the relatively thin connecting structures 302 has a cross sectional overall height "h" that in general is less than a cross sectional overall height "H" of a respective connected DRA 350 (see FIGS. 3A, 3B, 3C), and may have a cross sectional overall height "h" that is equal to or less than λ/4 of the operating wavelength λ of the connected-DRA array 300, and has a cross sectional overall width "w" that in general is less than a cross sectional overall width "W" of a respective connected DRA 350 (see FIGS. 3A, 3B, 3C), and may have a cross sectional overall width "w" that is also equal to or less than λ/4 of the operating wavelength of the connected-DRA array 300. By employing relatively thin connecting structures 302 having an overall height "h" and an overall width "w" that are both equal to or less than λ/4 of the operating wavelength X of the connected-DRA array 300, it has been found through mathematical modeling that a reduction in cross-talk between DRAs 350 can be achieved that is less than S21<−12 dBi (e.g., <−15 dBi, <−20 dBi, or better). As can be seen from FIG. 3A, an embodiment includes a connected-DRA array 300 where the individual DRAs 350 are interconnected via closest adjacent pairs of the plurality of DRAs 350 (such as: 351 and 352; 351 and 355; 355 and 356; and, 352 and 356, for example), but not by diagonally closest pairs of the plurality of DRAs 350 (such as: 351 and 356; and, 352 and 355, for example).

Figure 4:
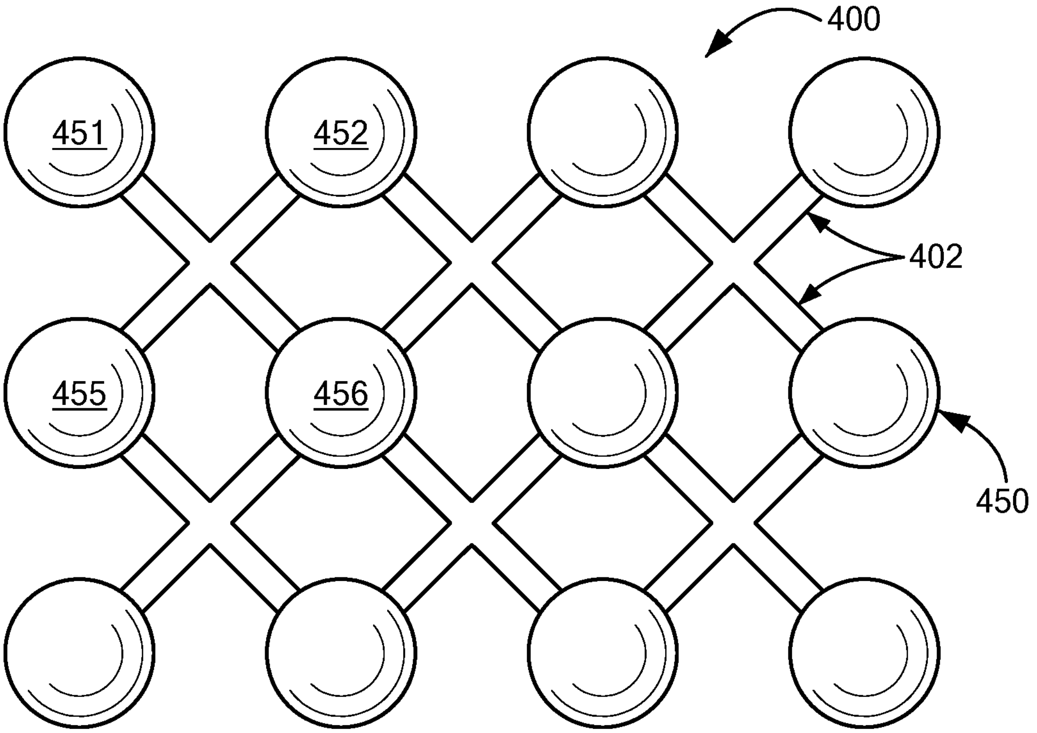
FIG. 4 depicts a plan view of a four-by-three array of connected DRAs, in accordance with an embodiment.

Reference is now made to FIG. 4, which depicts a connected-DRA array 400 having a plurality of DRAs 450 similar to connected-DRA array 300 and DRAs 350 of FIG. 3A. While certain structural features of connected-DRA array 400 may be the same, and in an embodiment are the same, as those of connected-DRA array 300 (e.g., the volume layering of the DRAs 450, and the height "h" and width "w" of the relatively thin connecting structures 402, as compared to those features of connected-DRA array 300), a further difference between connected-DRA array 400 and connected-DRA array 300 can be seen in the interconnection of the plurality of DRAs 450, which in FIG. 4 are interconnected only by a plurality of diagonally arranged relatively thin connecting structures 402. As such, an embodiment includes a connected-DRA array 400 where the individual DRAs 450 are interconnected via diagonally closest pairs of the plurality of DRAs 450 (such as: 451 and 456; and, 452 and 455, for example), but not by closest adjacent pairs of the plurality of DRAs 450 (such as: 451 and 452; 451 and 455; 455 and 456; and, 452 and 456, for example).

Figure 5:
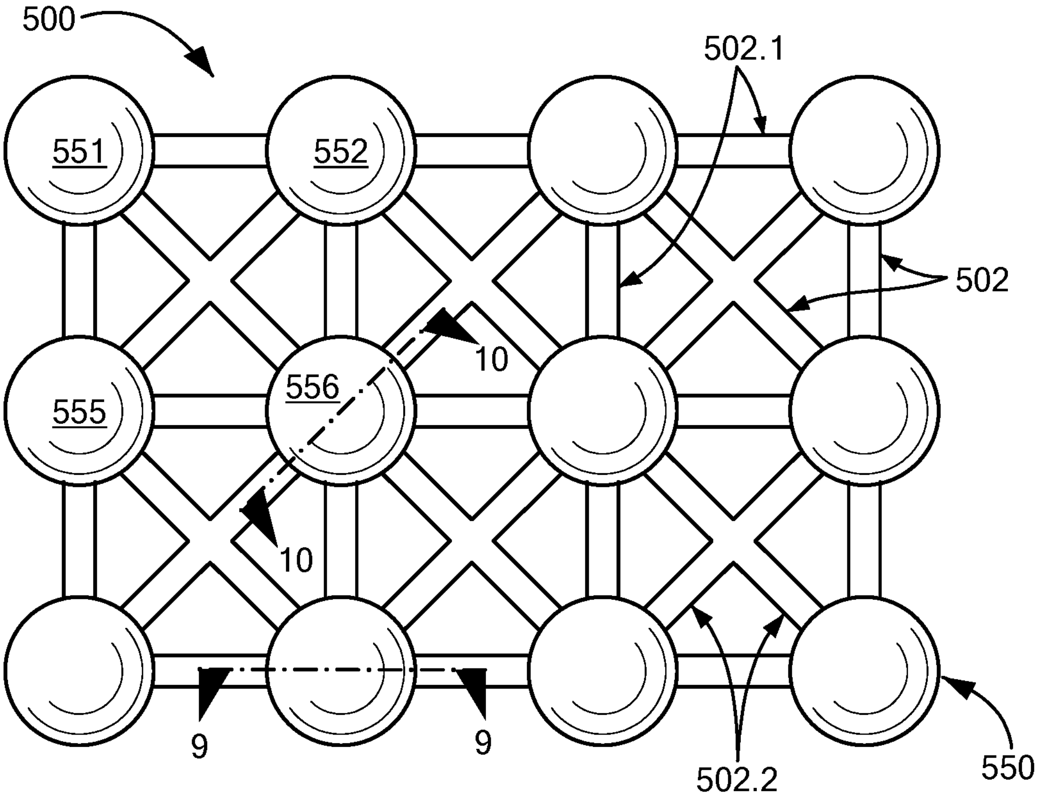
FIG. 5 depicts a plan view of a four-by-three array of connected DRAs, in accordance with an embodiment.

Reference is now made to FIG. 5, which depicts a connected-DRA array 500 having a plurality of DRAs 550 similar to connected-DRA array 300 with DRAs 350 of FIG. 3A, and connected-DRA array 400 with DRAs 450 of FIG. 4. While certain structural features of connected-DRA array 400 may be the same, and in an embodiment are the same, as those of connected-DRA arrays 300 and 400 (e.g., the volume layering of the DRAs 550, and the height "h" and width "w" of the relatively thin connecting structures 502, as compared to those features of connected-DRA arrays 300 and 400), a further difference between connected-DRA array 500 and connected-DRA arrays 300 and 400 can be seen in the interconnection of the plurality of DRAs 550, which in FIG. 5 are interconnected between closest adjacent pairs of the plurality of DRAs 550 (such as: 551 and 552; 551 and 555; 552 and 556; and, 555 and 556) via a plurality of non-diagonally arranged relatively thin connecting structures 502.1, and between diagonally closest pairs of the plurality of DRAs 550 (such as: 551 and 556; and, 552 and 555) via a plurality of diagonally arranged relatively thin connecting structures 502.2. As such, an embodiment includes a connected-DRA array 500 where the individual DRAs 550 are interconnected via closest adjacent pairs of the plurality of DRAs 550 (such as: 551 and 552; 551 and 555; 555 and 556; and, 552 and 556, for example), and via diagonally closest pairs of the plurality of DRAs 550 (such as: 551 and 556; and, 552 and 555, for example).

From the foregoing, and as can be seen from FIGS. 1B, 2B and 3B, an embodiment includes an arrangement where the outermost solid volume (V(4) for example) of the plurality of volumes of dielectric materials (V(1)-V(4) for example) and the relatively thin connecting structures (102, 202 or 302, for example) form a single monolithic structure that is a portion of the connected-DRA array (100, 200 or 300 for example). While connected-DRA arrays 400 and 500 do not specifically illustrate the plurality of volumes of dielectric materials V(1)-V(4) depicted in FIGS. 1B, 2B and 3B, it will be appreciated from at least the foregoing description that such structure is explicitly disclosed herein and consequently is included in an embodiment of the invention. As such, and stated alternatively, the relatively thin connecting structures (102, 202, 302, 402 and 502, for example) are not only made from the same material as volume V(4), but are also integrally formed with the outermost volume V(4) to form the single monolithic portion of the connected-DRA array (100, 200, 300, 400 and 500, for example).

Figure 6:
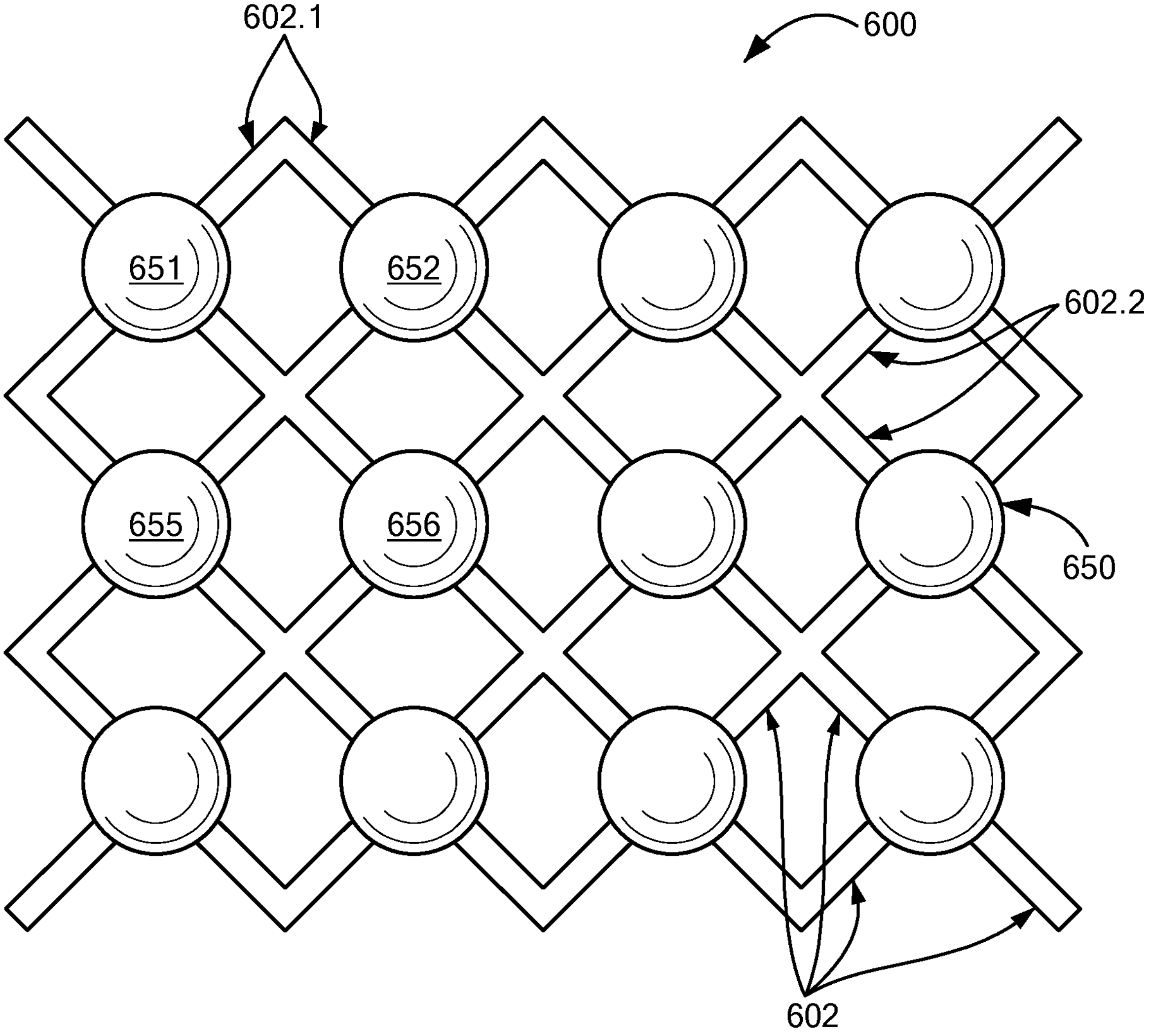
FIG. 6 depicts a plan view of a four-by-three array of connected DRAs, in accordance with an embodiment.

Reference is now made to FIG. 6 in comparison with FIG. 5. FIG. 6 depicts a connected-DRA array 600 having a plurality of DRAs 650 similar to connected-DRA array 500 with DRAs 550 of FIG. 5. While certain structural features of connected-DRA array 600 may be the same, and in an embodiment are the same, as those of connected-DRA array 500 (e.g., the volume layering of the DRAs 650, and the height "h" and width "w" of the relatively thin connecting structures 602, as compared to those features of connected-DRA array 500), a further difference between connected-DRA array 600 and connected-DRA array 500 can be seen in the interconnection of the plurality of DRAs 650, which in FIG. 6 are interconnected between closest adjacent pairs of the plurality of DRAs 650 (such as: 651 and 652; 651 and 655; 652 and 656; and, 655 and 656) via a first plurality of diagonally arranged relatively thin connecting structures 602.1, and between diagonally closest pairs of the plurality of DRAs 650 (such as: 651 and 656; and, 652 and 655) via a second plurality of diagonally arranged relatively thin connecting structures 602.2. The embodiments of FIGS. 5 and 6 are similar in that both embodiments include a connected-DRA array 500, 600 where the individual DRAs 550, 650 are interconnected via closest adjacent pairs of the plurality of DRAs 550, and via diagonally closest pairs of the plurality of DRAs 550. A difference between the embodiments of FIGS. 5 and 6 is the manner in which the closest adjacent pairs of the plurality of DRAs are interconnected. In the embodiment of FIG. 5, the closest adjacent pairs of the plurality of DRAs 550 (see 551 and 552, for example) are interconnected via rectilinearly arranged relatively thin connecting structures 502.1, while in the embodiment of FIG. 6, the closest adjacent pairs of the plurality of DRAs 650 (see 651 and 652, for example) are interconnected via diagonally arranged relatively thin connecting structures 602.1. A significance of this difference will be discussed further herein below.

Reference is now made to FIGS. 7, 8, 9 and 10.

Figure 7:
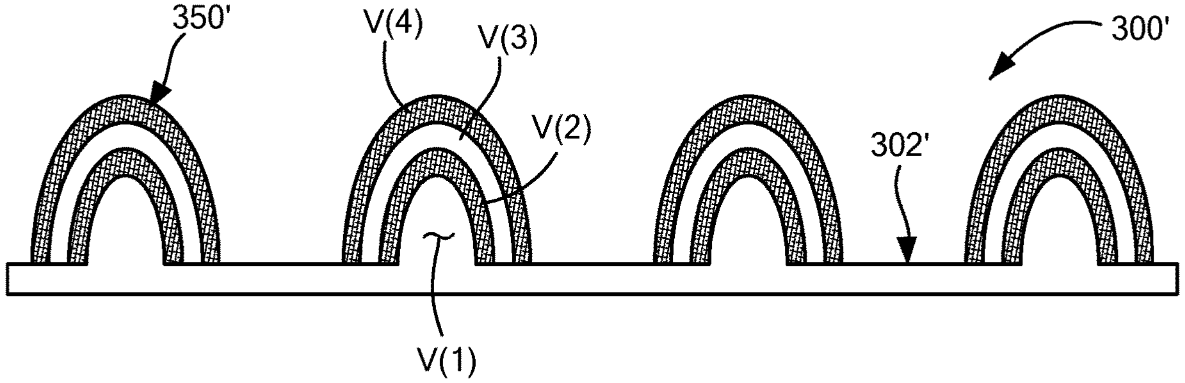
FIG. 7 depicts a cross section view similar to that of FIG. 3B, but where the innermost solid volumes of the connected DRAs are integrally formed with the connecting structures, in accordance with an embodiment.

FIG. 7 depicts a cross section view similar to that of FIG. 3B, but where the innermost solid volumes V(1), as opposed to the outermost solid volumes V(4), of the plurality of volumes of dielectric materials V(1)-V(4) are integrally formed with the relatively thin connecting structures 302' that interconnect the plurality of DRAs 350' to form a single monolithic portion of the connected-DRA array 300'.

Figure 8:
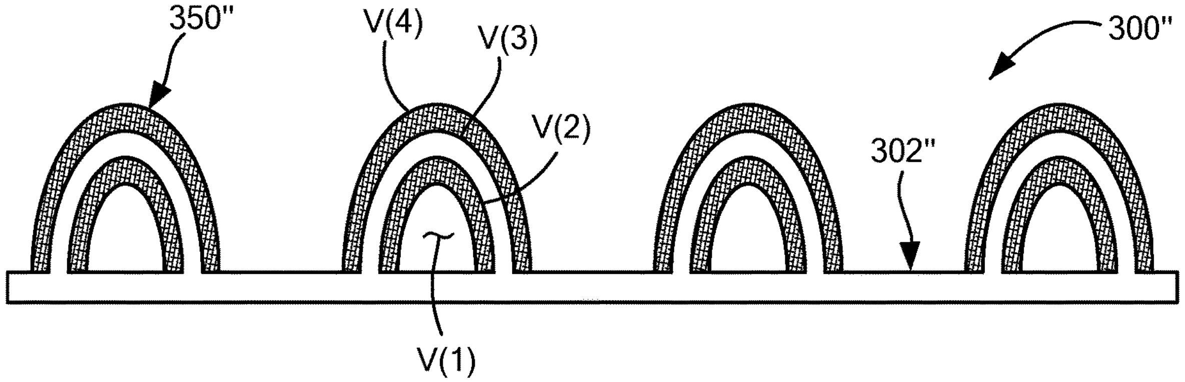
FIG. 8 depicts a cross section view also similar to that of FIG. 3B, but where solid volumes, other than the innermost solid volumes and other than the outermost solid volumes, of the connected DRAs are are integrally formed with the connecting structures, in accordance with an embodiment.

FIG. 8 depicts a cross section view also similar to that of FIG. 3B, but where solid volumes, other than the innermost solid volumes V(1) and other than the outermost solid volumes V(4), of the plurality of volumes of dielectric materials V(1)-V(4) are integrally formed with the relatively thin connecting structures 302" that interconnect the plurality of DRAs 350" to form a single monolithic portion of the connected-DRA array 300". In the embodiment depict in FIG. 8, the third volumes V(3) are integrally formed with the relatively thin connecting structures 302".

Figure 9:
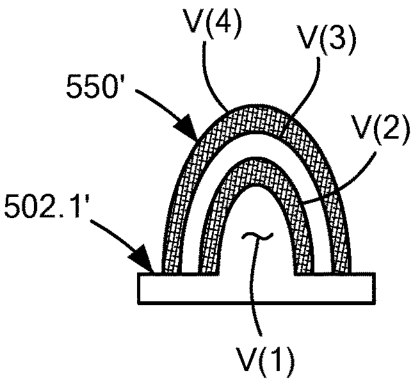
FIG. 9 depicts an example cross section elevation view through cut line 9-9 of FIG. 5 where the innermost solid volumes of the connected DRAs are integrally formed with a first set of connecting structures, in accordance with an embodiment.
Figure 10:
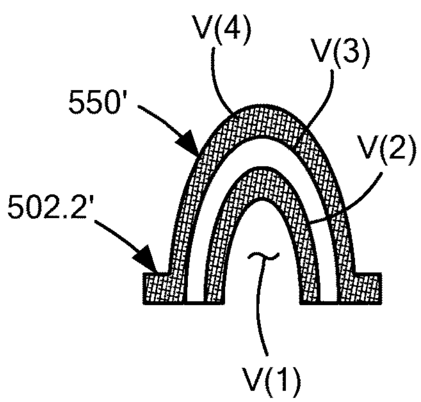
FIG. 10 depicts an example cross section elevation view through cut line 10-10 of FIG. 5 where the outermost solid volumes of the connected DRAs are integrally formed with a second set of connecting structures, in accordance with an embodiment.

FIG. 9 and FIG. 10 depict alternative cross section views through section lines 9-9 and 10-10 of FIG. 5. In this alternative embodiment, the plurality of DRAs 550' that are spaced apart on an x-y grid have a first set of relatively thin connecting structures 502.1' that interconnect closest adjacent pairs of the plurality of DRAs (see 551 and 552, for example), and do not interconnect diagonally closest pairs of the plurality of DRAs, and have a second set of relatively thin connecting structures 502.2' that interconnect diagonally closest pairs of the plurality of DRAs (see 552 and 555, for example), and do not interconnect closest adjacent pairs of the plurality of DRAs. As can be seen from FIGS. 9 and 10, the first set of relatively thin connecting structures 502.1' interconnect each volume V(A), in this embodiment first volume V(1), of the plurality of volumes of dielectric materials V(1)-V(4), and the second set of relatively thin connecting structures 502.2' interconnect each volume V(B), in this embodiment fourth volume V(4), of the plurality of volumes of dielectric materials V(1)-V(4). In a general, A and B are integers from 1 to N, where A is not equal to B.

While the foregoing embodiments illustrate relatively thin connecting structures configured as straight lines, it will be appreciated that an embodiment includes an arrangement for a connected-DRA array where each relatively thin connecting structure connects closest pairs (adjacently or diagonally disposed), closest adjacent pairs, or diagonally closest pairs of the plurality of DRAs, via a connecting path that is other than a single straight line path between respective DRAs. One example of such a path can be seen with reference to the relatively thin connecting structures 602.1 depicted in FIG. 6. However, it will be appreciated that such connecting paths may include any number of shapes, such as zig-zag, curved, serpentine, or any other shape suitable for a purpose disclosed herein.

Figure 11:
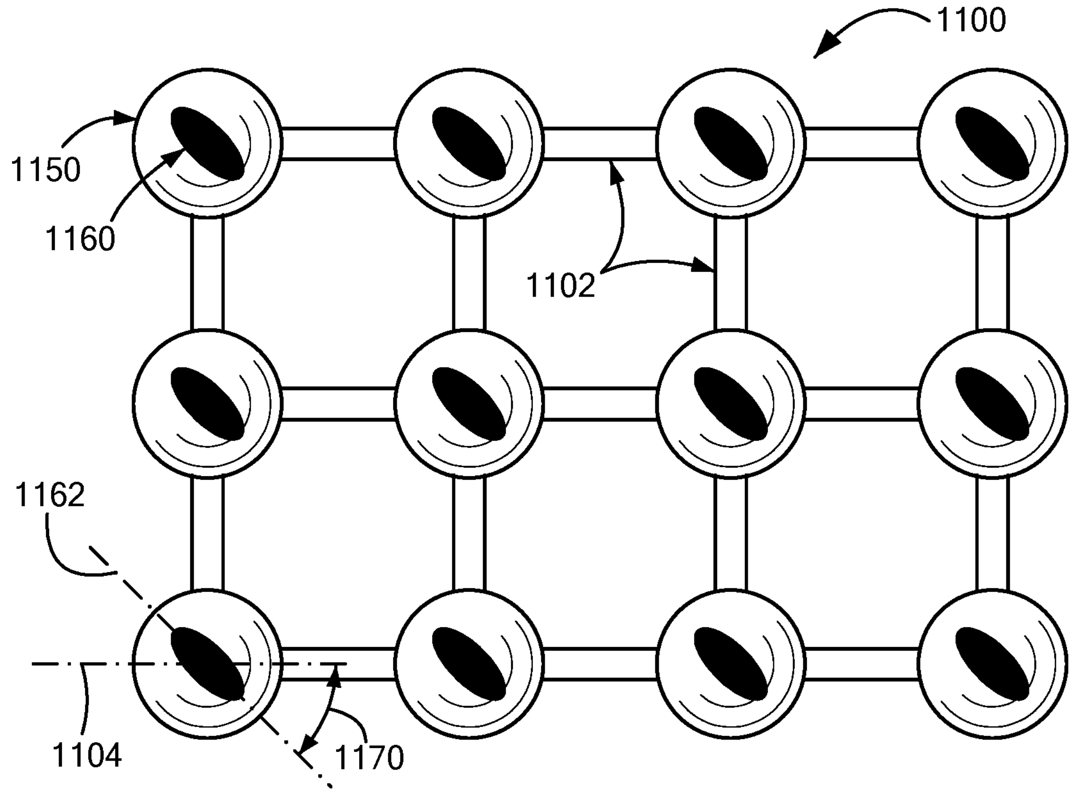
FIG. 11 depicts a plan view of a four-by-three array of connected DRAs similar to that of FIG. 3A, where each DRA is configured to radiate an E-field having an E-field direction line, and each connecting structure has a longitudinal direction line that is not in line with and not parallel to the E-field direction line, in accordance with an embodiment.
Figure 12:
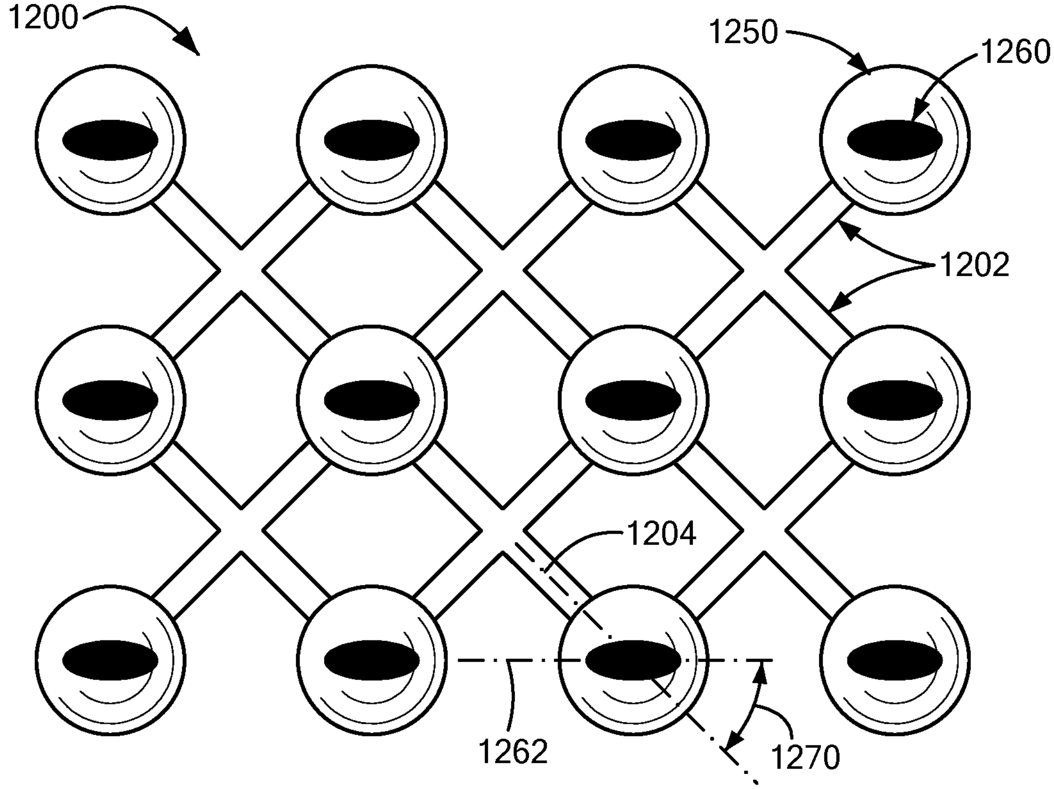
FIG. 12 depicts a plan view of a four-by-three array of connected DRAs similar to that of FIG. 4, where each DRA is configured to radiate an E-field having an E-field direction line, and each connecting structure has a longitudinal direction line that is not in line with and not parallel to the E-field direction line, in accordance with an embodiment.

Reference is now made to FIGS. 11 and 12, which depict connected-DRA arrays 1100 and 1200 similar to connected-DRA arrays 300 and 400 depicted in FIGS. 3 and 4, respectively. For discussion purposes, the structure of the connected-DRA arrays 1100 and 1200 are identical to connected-DRA arrays 300 and 400, respectively, but with the following arrangements of E-fields. In FIG. 11, each of the plurality of DRAs 1150 is configured to radiate an E-field 1160 having an E-field direction line 1162, and each relatively thin connecting structure 1102 has a longitudinal direction line 1104 that is not in line with and not parallel to the E-field direction line 1162. In the embodiment of FIG. 11, the E-field direction line 1162 is oriented about 45-degrees, angle 1170, with respect to the longitudinal direction line 1104. Similarly, in FIG. 12, each of the plurality of DRAs 1250 is configured to radiate an E-field 1260 having an E-field direction line 1262, and each relatively thin connecting structure 1202 has a longitudinal direction line 1204 that is not in line with and not parallel to the E-field direction line 1262. In the embodiment of FIG. 12, the E-field direction line 1262 is oriented about 45-degrees, angle 1270, with respect to the longitudinal direction line 1204. An advantage of orienting the E-field radiation direction lines out of alignment with, that is not in line with and not parallel to, the longitudinal direction lines of the associated relatively thin connecting structures, is that a further reduction in cross-talk between closest neighboring DRAs can be achieved, which serves to maximize the far field gain.

With reference back to the cross section view of FIG. 3B, an embodiment includes an arrangement in which each of the plurality of DRAs 350 has a proximal end 330 at a base of the respective DRA 350, and has a distal end 340 at an apex of the respective DRA 350, and each of the relatively thin connecting structures 302 are disposed proximate the proximal end 330 of each respective DRA 350. However, the scope of the invention is not so limited, which is illustrated in FIGS. 13 and 14, to which reference is now made.

Figure 13:
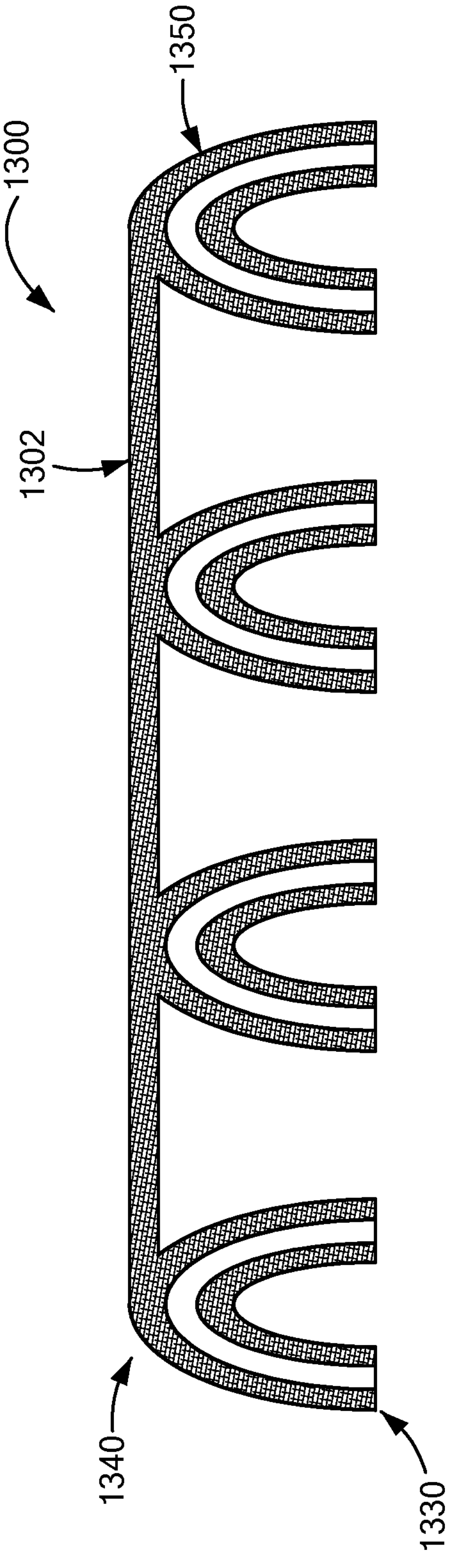
FIG. 13 depicts a cross section elevation view of a connected-DRA array similar to that of FIG. 3B, but where each of the connecting structures are disposed proximate the distal end of each respective DRA, in accordance with an embodiment.

FIG. 13 depicts a cross section elevation view of a connected-DRA array 1300 similar to the connected-DRA array 300 of FIG. 3B, but where each of the relatively thin connecting structures 1302 are disposed proximate the distal end 1340, a distance from the proximal end 1330, of each respective DRA 1350.

Figure 14:
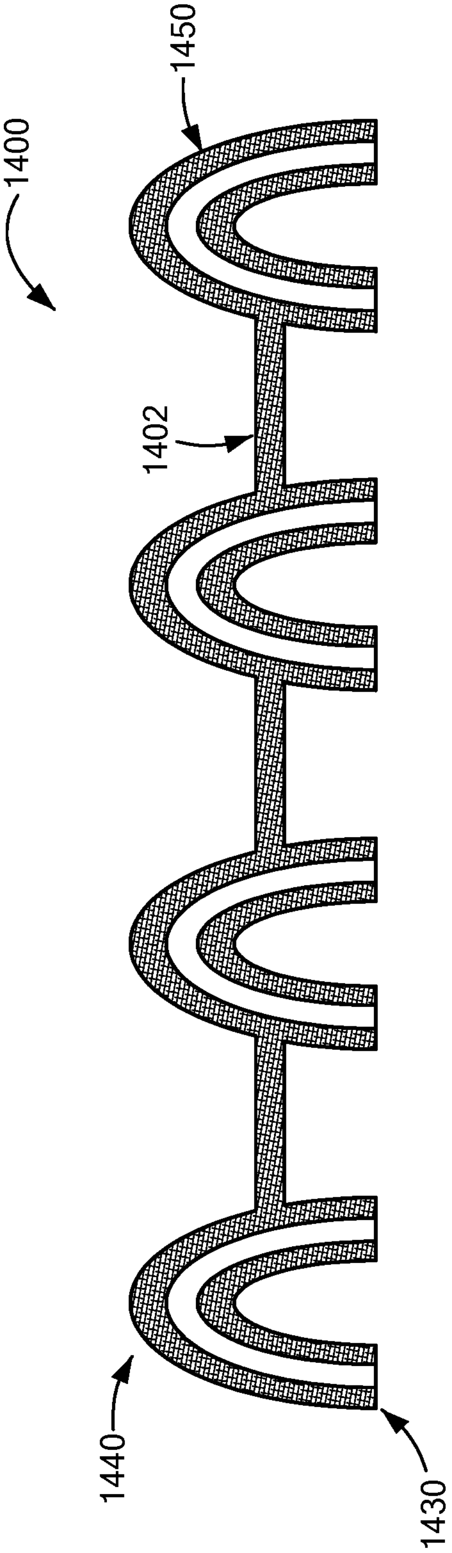
FIG. 14 depicts a cross section elevation view of a connected-DRA array similar to that of FIG. 3B, but where each of the connecting structures are disposed between the proximal end and the distal end of each respective DRA, in accordance with an embodiment.

FIG. 14 depicts a cross section elevation view of a connected-DRA array 1400 also similar to the connected-DRA array 300 of FIG. 3B, but where each of the relatively thin connecting structures 1402 are disposed between the proximal end 1430 and the distal end 1440 of each respective DRA 1450.

Figure 15:
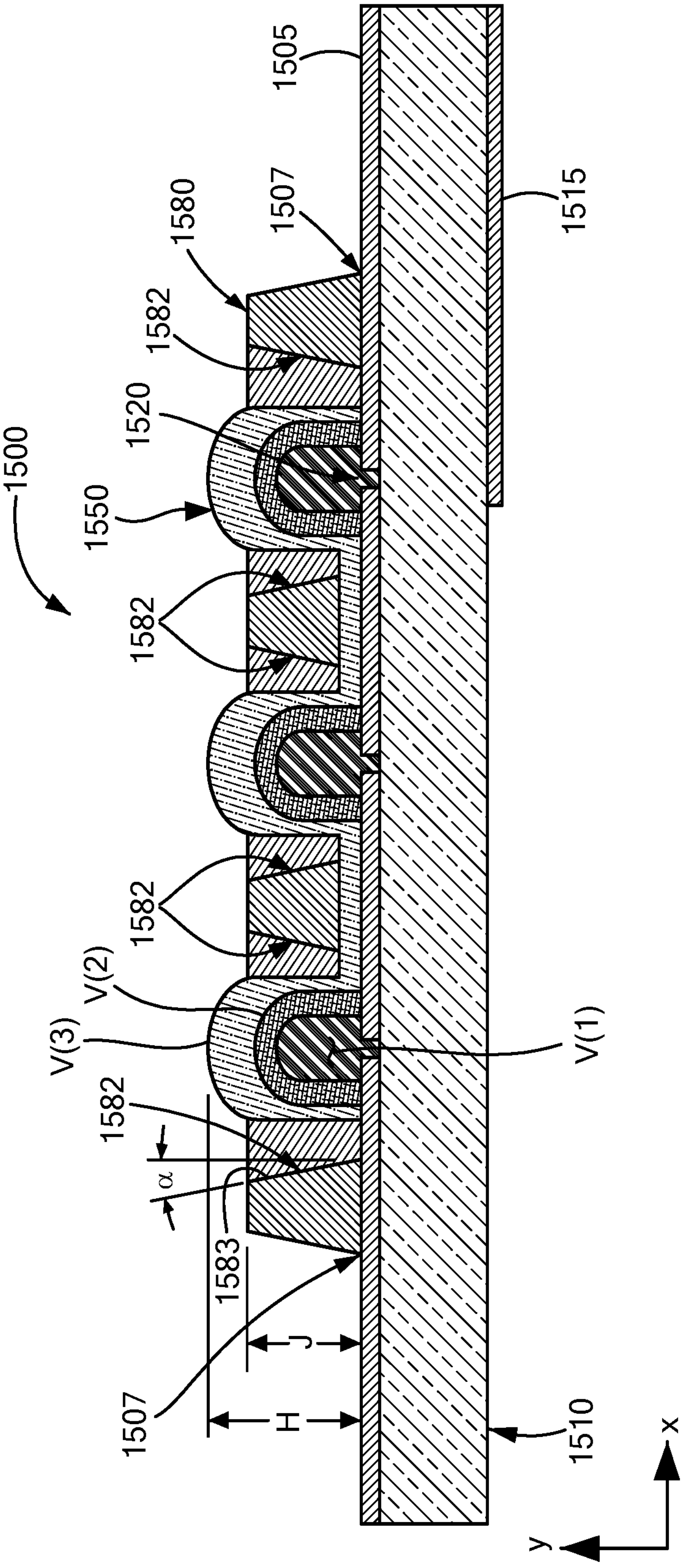
FIG. 15 depicts a cross section elevation view of a three-by array of DRAs with a unitary fence structure having a plurality of integrally formed electrically conductive electromagnetic reflectors disposed in one-to-one relationship with respective ones of the plurality of DRAs, in accordance with an embodiment.

Reference is now made to FIG. 15, which depicts a connected-DRA array 1500 similar to any of the foregoing connected-DRA arrays 100, 200, 300, 400, 500, 600, 1100 or 1200, for example, disposed on an electrically conductive ground structure 1505 which in turn may be disposed on a substrate 1510, such as a printed circuit board or a semiconductor die material, for example. A signal feed 1515 may be provided on an underside of the substrate (or embedded within the substrate) for feeding an electromagnetic signal to each of the DRAs 1550 via slotted apertures 1520. While only one signal feed 1515 is depicted in FIG. 15, it will be appreciated that separate traces on the underside of the substrate 1510 (or within the substrate) may be provided for feeding each DRA 1550 individually. In the embodiment depicted in FIG. 15, the signal feed 1515 is disposed and configured being electromagnetically coupled via slotted apertures 1520 to each volume V(1) of the plurality of volumes of dielectric materials, depicted in FIG. 15 as volumes V(1)-V(3), however, the signal feed may be disposed and configured to be electromagnetically coupled to any one, or more than one, of the respective plurality of volumes of dielectric materials in accordance with an embodiment. While FIG. 15 depicts only three volumes V(1)-V(3) of the plurality of volumes of dielectric materials V(1)-V(N), it will be appreciated from all that is disclosed herein that N may be equal to or greater than three. As previously discussed, each innermost volume V(1) may be air.

In an embodiment, and with reference to FIGS. 1B, 2B, 3B, 7, 8, 13, 14 and 15, at least the innermost volume V(1) of each of the plurality of DRAs, or all of the volumes of each of the plurality of DRAs, has a cross sectional shape, as observed in an elevation view, that is a truncated ellipsoidal shape that is truncated proximate a wide portion of the ellipsoidal shape at a base of the respective DRA, or has a dome-shaped or a hemispherical-shaped distal top, or has both a truncated ellipsoidal shape and a dome-shaped or hemispherical-shaped distal top.

Figure 16A:
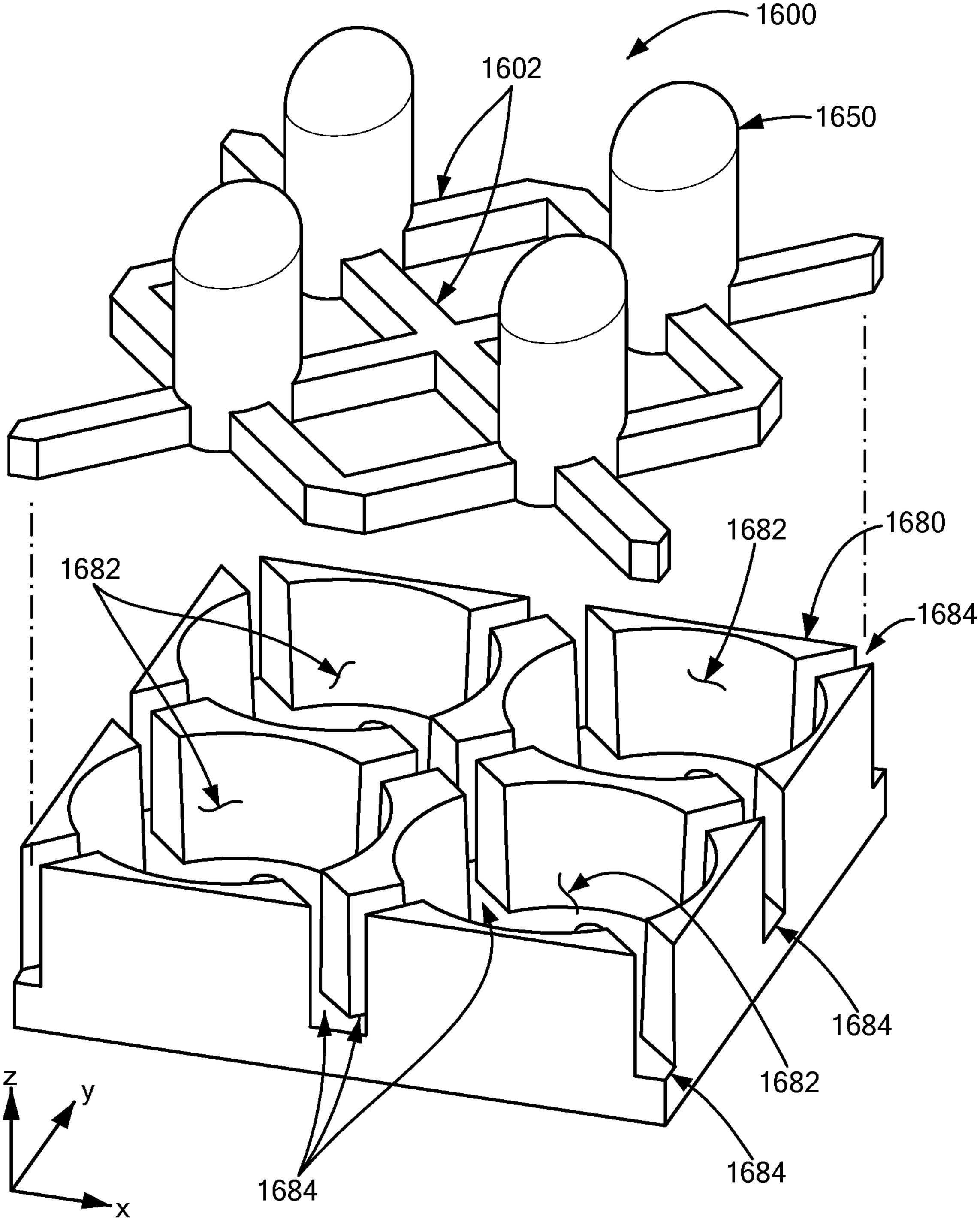
FIG. 16A depicts a rotated isometric view of a disassembled assembly of a two-by-two connected-DRA array and a unitary fence structure, in accordance with an embodiment.
Figure 17:
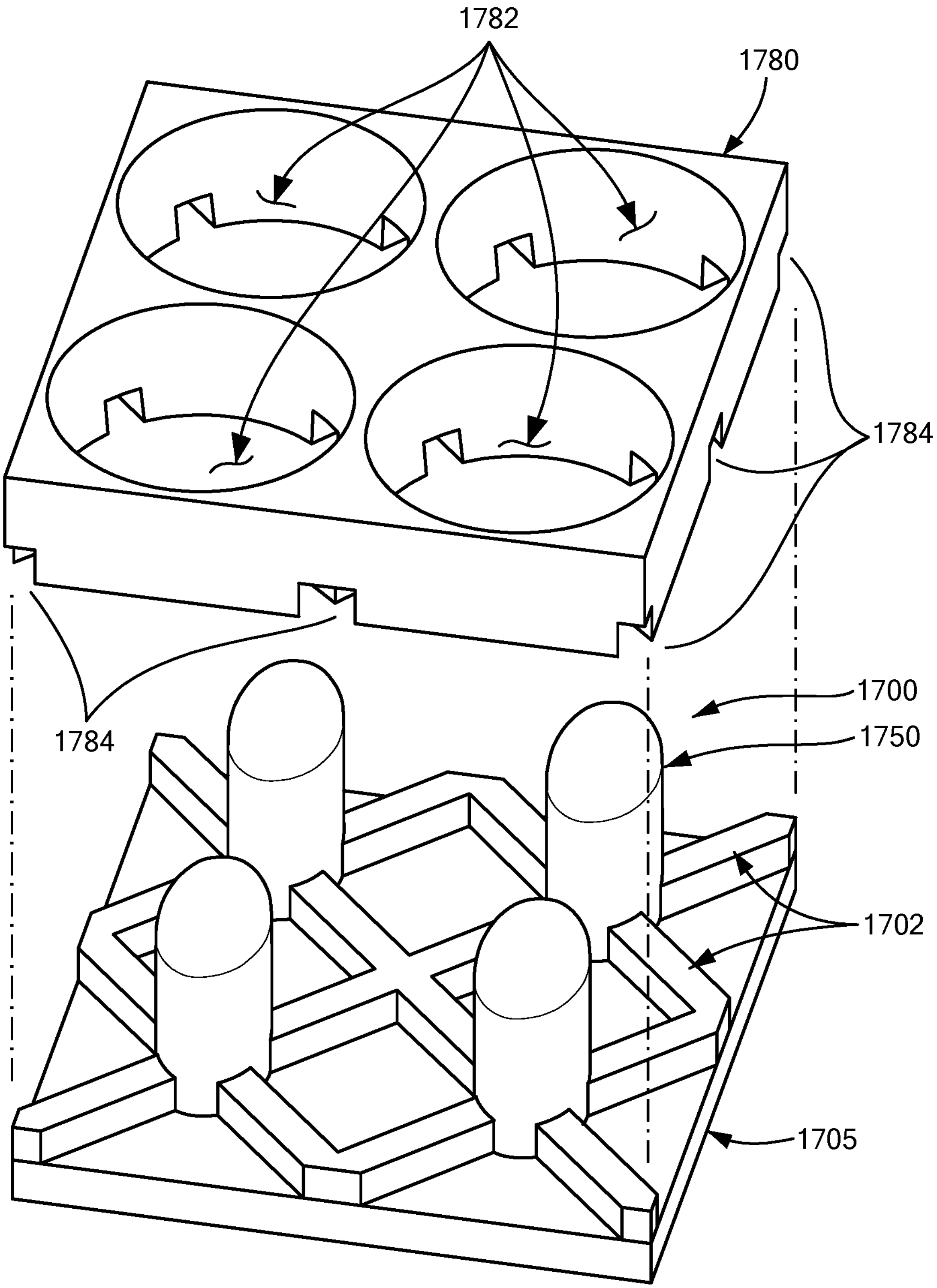
FIG. 17 depicts a rotated isometric view of a disassembled assembly of a two-by-two connected-DRA array and a unitary fence structure alternative to that of FIG. 16A, in accordance with an embodiment.

With reference still to FIG. 15, an embodiment includes a unitary fence structure 1580 comprising a plurality of integrally formed electrically conductive electromagnetic reflectors 1582 (best seen with reference to 1682 and 1782 in FIGS. 16A and 17, respectively), each of the plurality of reflectors 1582 being disposed in one-to-one relationship with respective ones of the plurality of DRAs 1550 and being disposed substantially surrounding each respective one of the plurality of DRAs 1550 (best seen with reference to FIGS. 16A and 17). In an embodiment, the overall height "J" of the unitary fence structure 1580 is equal to or less than the overall height "H" of the DRAs 1550. In an embodiment "J" is equal to less than 80% of "H" and equal to or greater than 50% of "H". By utilizing a height of a unitary fence structure as herein disclosed, it has been found through mathematical modeling that effective decoupling of neighboring DRAs 1550 is achievable without substantially reducing the far field radiation bandwidth of the connected-DRA array 1500. In an embodiment having a unitary fence structure 1580, the unitary fence structure 1580 is electrically connected to the ground structure 1505, such as at grounded locations 1507 for example. As used herein, the description of a unitary fence structure having integrally formed electrically conductive electromagnetic reflectors means a single (i.e., unitary) part formed from one or more constituents that are indivisible from each other (i.e., integral) without permanently damaging or destroying one or more of the constituents. In an embodiment, the unitary fence structure is a monolithic structure, which means a single structure made from a single constituent that is indivisible and without macroscopic seams or joints. In an embodiment, sidewalls 1583 of the reflectors 1582 have an angle "α" relative to a z-axis that is equal to or greater than 0-degrees and equal to or less than 45-degrees. In an embodiment, the angle "α" is equal to or greater than 5-degrees and equal to or less than 20-degrees.

Figure 16B:
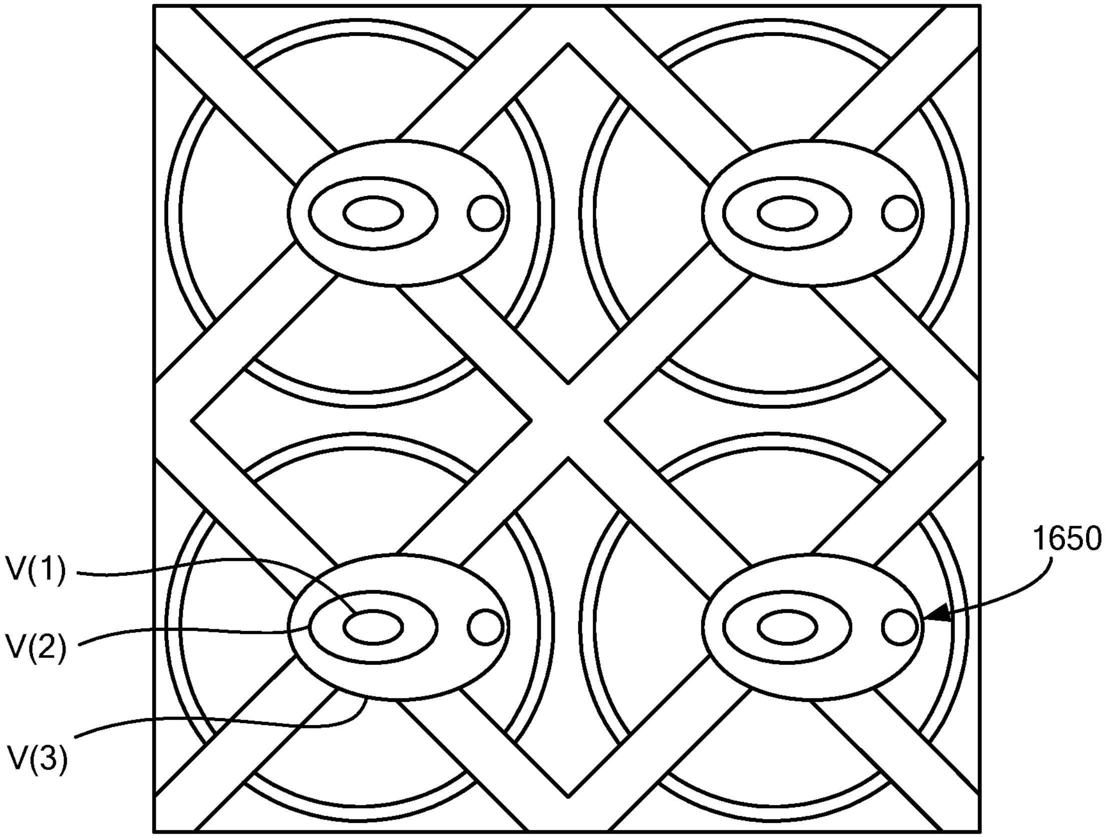
FIG. 16B depicts a plan view of the embodiment of FIG. 16A, in accordance with an embodiment.

Reference is now made to FIGS. 16A, 16B and 17, which depict alternative ways of layering the connected-DRA arrays 1600, 1700 with respect to the respective unitary fence structure 1680, 1780. As can be seen in each of FIGS. 16A and 17, each of the plurality of reflectors 1682, 1782 are disposed in one-to-one relationship with respective ones of the plurality of DRAs 1650, 1750 and are disposed substantially surrounding each respective one of the plurality of DRAs 1650, 1750. As depicted in the embodiments of FIGS. 16A and 17, side walls 1683, 1783 of the respective reflectors 1682, 1782 are vertical relative to a z-axis. However, such verticality is for illustration purposes only, as the side walls of any of the reflectors disclosed herein may have any angle consistent with an embodiment disclosed herein. That said, it is contemplated that ease of fabrication may be realized by employing a vertical side wall construction for a given reflector and for a purpose disclosed herein.

In FIG. 16A, the unitary fence structure 1680 has a plurality of slots 1684 (not all of the slots are enumerated), where each one of the plurality of slots 1684 is disposed in one-to-one relationship with respective ones of the connecting structures 1602 (not all of the connecting structures are enumerated). As depicted, the connected-DRA array 1600 is disposed overlayering the unitary fence structure 1680 with each associated connecting structure 1602 being disposed within a respective one of the plurality of slots 1684, and with the connected-DRA array 1600 being disposed directly on the unitary fence structure 1680. As can be seen in the rotated isometric view of FIG. 16A, the plurality of slots 1684 are closed at the bottom and open at the top, which permits the connected-DRA array 1600 to be top-down assembled or fabricated onto the unitary fence structure 1680.

FIG. 16B depicts a top-down plan view of the embodiment of FIG. 16A, when fully assembled or fabricated. In an embodiment and as depicted, each volume V(1)-V(3) of the plurality of volumes of dielectric materials of each of the plurality of DRAs 1650 are centrally and sideways shifted (along a horizontal axis as viewed in FIG. 16B) in a same sideways direction (toward the left from a center point a DRA as viewed in FIG. 16B) relative to each other volume of the respective plurality of volumes of dielectric materials. While other embodiments disclosed herein may illustrate each volume V(1)-V(N) of the plurality of volumes of dielectric materials of each of the respective plurality of DRAs being non-shifted and centrally arranged with respect to each other (see at least FIG. 1B, for example), one skilled in the art would appreciate from all that is disclosed herein that the inventive scope is not so limited, and encompasses both non-shifted and sideways shifted volumes V(1)-V(N) that may be utilized to achieve the desired far field radiation pattern and/or gain.

In FIG. 17, the unitary fence structure 1780 has a plurality of inverted recess 1784 (not all of the recesses are enumerated), where each one of the plurality of inverted recesses 1784 is disposed in one-to-one relationship with respective ones of the connecting structures 1702 (not all of the connecting structures are enumerated). As depicted, the unitary fence structure 1780 is disposed overlayering the connected-DRA array 1700 with each associated connecting structure 1702 being disposed within a respective one of the plurality of inverted recesses 1784, and with the unitary fence structure 1780 being disposed directly on the connected-DRA array 1700. In an embodiment, the connected-DRA array 1700 may be disposed on a ground structure 1705. As can be seen in the rotated isometric view of FIG. 17, the plurality of inverted recesses 1784 are open at the bottom and closed at the top, which permits the unitary fence structure 1780 to be top-down assembled or fabricated onto the connected-DRA array 1700.

Figure 18:
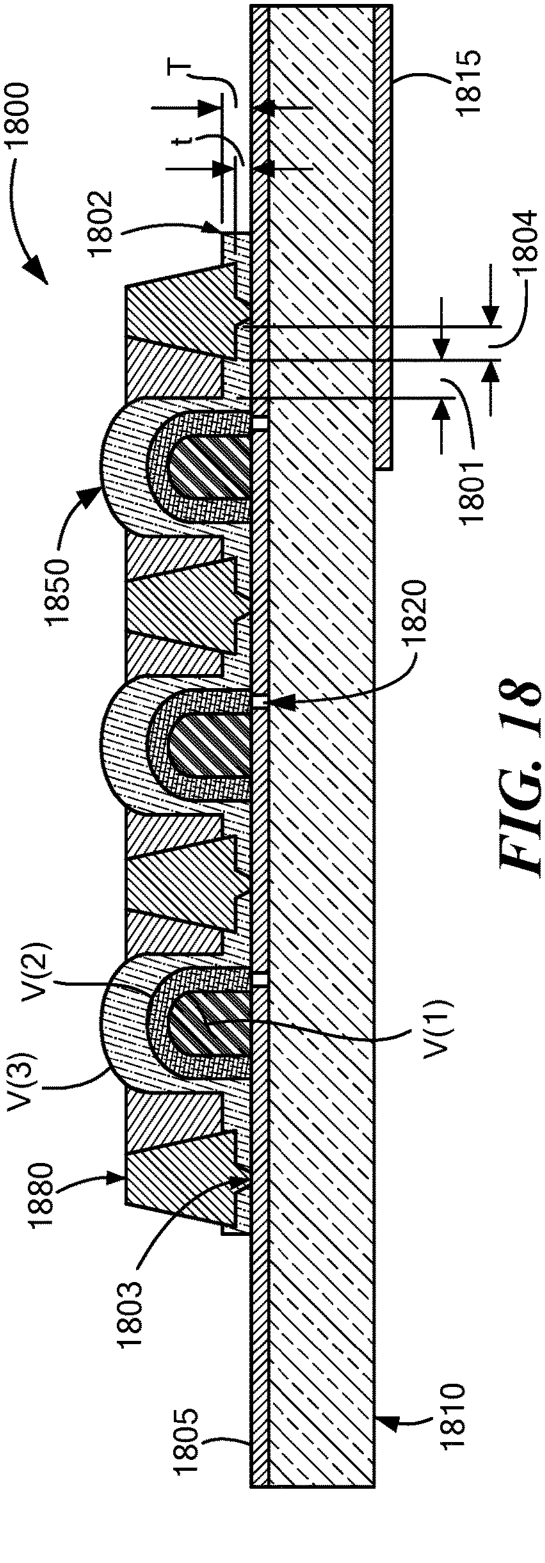
FIG. 18 depicts a cross section elevation view of a three-by array of DRAs similar to that of FIG. 15, but with the unitary fence structure grounded, in accordance with an embodiment.

Reference is now made to FIG. 18, which depicts a cross section elevation view of a three-by-three array of DRAs 1850 that forms a connected-DRA array 1800 disposed on an electrically conductive ground structure 1805 which in turn may be disposed on a substrate 1810 with a signal feed 1815 disposed on an underside of the substrate 1810 (or within the substrate) similar to the embodiment depicted in FIG. 15, but with the following differences. In an embodiment, the electrically conductive ground structure 1805 has slotted apertures 1820 disposed and configured to electromagnetically couple the signal feeds 1815 (only one signal feed depicted) to each volume V(2). In an embodiment, the unitary fence structure 1880 is electrically connected to the electrically conductive ground structure 1805 through at least one of the relatively thin connecting structures 1802 via apertures 1803 that pass completely through one or more of the relatively thin connecting structures 1802. In an embodiment, at least one of the relatively thin connecting structures 1802 has a first region 1801 having a first thickness "T" and a second region 1804 having a second thickness "t" that is less than the first thickness "T", where the unitary fence structure 1880 is disposed in direct contact with both the first region 1801 and the second region 1804 of the respective relatively thin connecting structure 1802. In an embodiment, reducing the thickness of a region of the connecting structures from "T" to "t" may be accomplished during fabrication, with the result being a further reduction in the cross-talk between adjacent neighboring DRAs.

Figure 19:
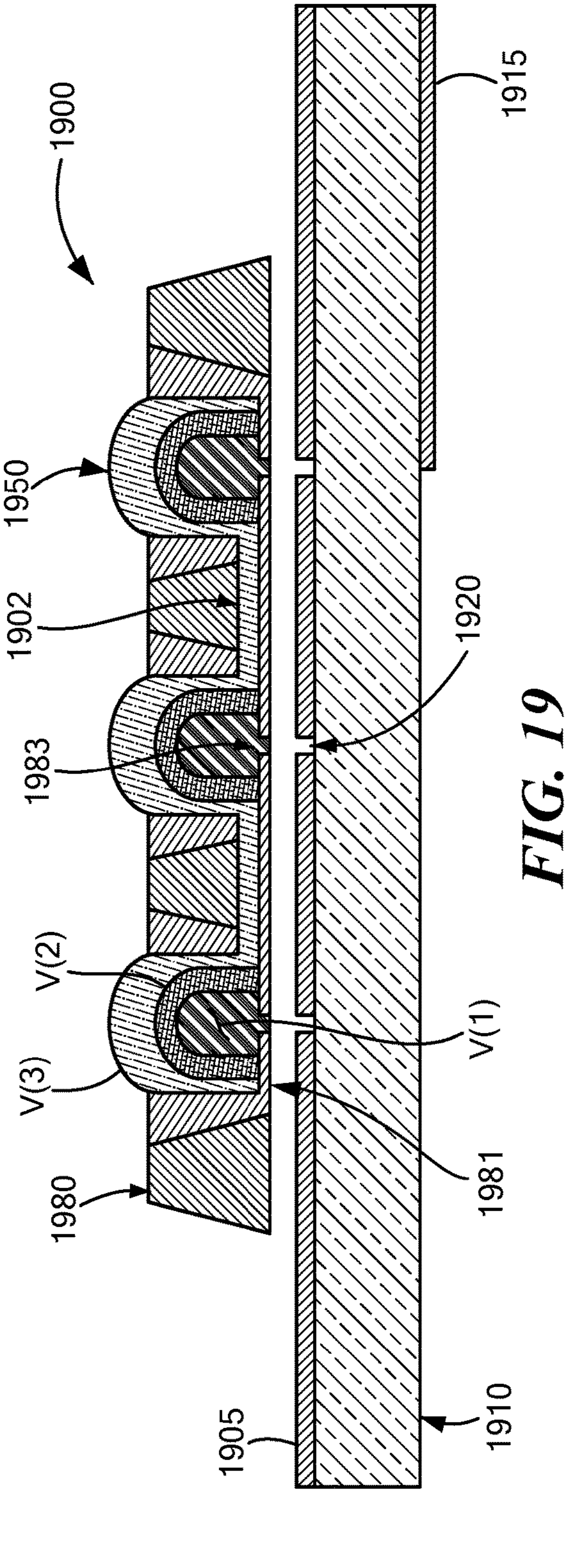
FIG. 19 depicts a disassembled assembly cross section elevation view of a three-by array of DRAs similar to that depicted in FIG. 15, in accordance with an embodiment.

Reference is now made to FIG. 19, which depicts a disassembled assembly cross section elevation view of a three-by-three array of DRAs 1950 similar to that depicted in FIG. 15, but where the combination of the connected-DRA array 1900 and the unitary fence structure 1980 is separately fabricated from the combination of the electrically conductive ground structure 1905, the substrate 1910, and the signal feeds 1915. In an embodiment, the unitary fence structure 1980 includes an electrically conductive ground layer 1981 on an underside of the connected-DRA array 1900, which when assembled to the combination of the electrically conductive ground structure 1905, the substrate 1910, and the signal feeds 1915, is electrically connected to the electrically conductive ground structure 1905. Slotted apertures 1983 in the electrically conductive ground layer 1981 align with slotted apertures 1920 in the electrically conductive ground structure 1905 for the purpose of electromagnetically exciting each of the plurality of DRAs 1950 in a manner previously described herein. While the embodiment of FIG. 19 depicts an arrangement where volume V(1) of each of the plurality of DRAs 1950 is electromagnetically excited, it will be appreciated from all that is disclosed herein that any volume V(1)-V(N) may be electromagnetically excited in a manner disclosed herein or known in the art. Here, the relatively thin connecting structures 1902 are integrally formed with the outermost volume V(3), which forms a single monolithic portion of the connected-DRA array 1900.

With respect to any of the unitary fence structures disclosed herein, such unitary fence structures may be fabricated as a monolithic structure from a solid thickness of metal (e.g., copper, aluminum, etc.) with material selectively removed therefrom to form the reflector, slots and recesses that are disclosed herein, or may be fabricated via a layering technique such as 3D printing of a metal for example.

Figure 20:
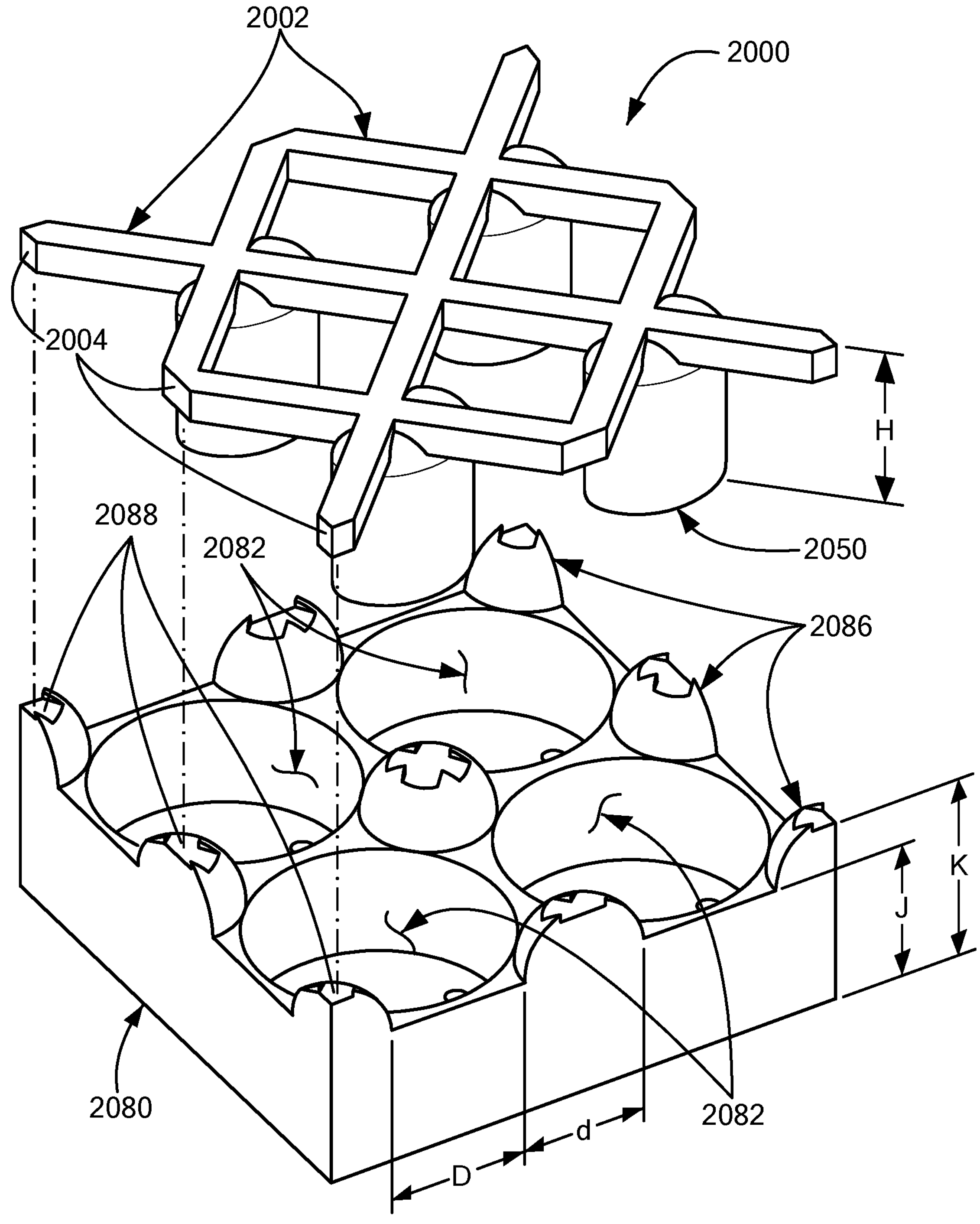
FIG. 20 depicts a rotated isometric view of a disassembled assembly of a two-by-two connected-DRA array and a unitary fence structure alternative to that of FIGS. 16A and 17, in accordance with an embodiment.

Reference is now made to FIG. 20, which depicts a disassembled assembly view of a connected-DRA array 2000 and an associated unitary fence structure 2080. The connected-DRA array 2000 is similar to the connected-DRA array 1300 of FIG. 13 where the connecting structures 2002 are disposed proximate the distal end of each respective DRA 2050. The unitary fence structure 2080 is similar to the unitary fence structure 1680 of FIG. 16, but absent the slots 1684 in view of the placement of the connecting structures 2002 at the distal ends of the DRAs 2050, and where the unitary fence structure 2080 now includes a plurality of protrusions 2086 integrally formed with and strategically disposed around the unitary fence structure 1680 so as to receive end portions 2004 of the connecting structures 2002 when the connected-DRA array 2000 is assembled with or joined to the unitary fence structure 2080. Alternatively, the protrusions 2086 may be absent. To aid in stabilizing the assembly in its final form, the distal ends of the protrusions 2086 may include sculpted land regions 2088 that serve to accurately register each DRA 2050 with its respective electrically conductive electromagnetic reflector 2082, which serves to further maximize the far field gain or bandwidth of the connected-DRA array 2000. Another advantage of the integrally formed protrusions 2086 is that they block near field electromagnetic field coupling between neighboring DRAs 2050 without substantially reducing the far field bandwidth. The performance of the connected-DRA array 2000 also benefits from the presence of the protrusions 2086 when the DRAs 2050 are electromagnetically excited diagonally (skewed), as illustrated in FIG. 11. Here, the presence of the protrusions 2086 on a given diagonal in the array serves to offset the near field coupling influence that the connecting structures 2002 may have on the given diagonal, resulting in improved far field gain or bandwidth.

In an embodiment, the overall height "K" of the unitary fence structure 2080 plus the protrusions 2086 is about equal to the overall height "H" of the DRAs 2050, and the spacing "D" between neighboring protrusions 2086 is equal to or greater than an overall width "d" of a given protrusion 2086. By utilizing a sizing and spacing arrangement of protrusions 2086 as herein disclosed, it has been found through mathematical modeling that effective decoupling of neighboring DRAs 2050 is achievable without substantially reducing the far field radiation bandwidth of the connected-DRA array 2000.

As already noted, the connected-DRA arrays disclosed herein may be manufactured using methods such as compression or injection molding, 3D material deposition processes such as 3D printing, stamping, imprinting, or any other manufacturing process suitable for a purpose disclosed herein. By way of example, a method of fabricating one or more of the connected-DRA arrays disclosed herein will now be described with reference to FIGS. 21A-22D.

In general, a method of fabricating a connected-DRA array as disclosed herein includes forming via at least one curable medium at least two volumes of the plurality of volumes of dielectric materials, or all of the volumes of the plurality of volumes of dielectric materials, and the associated relatively thin connecting structures, each connecting structured and the associated volume of the at least two volumes of the plurality of volumes of dielectric materials forming a single monolithic portion of the connected-DRA array, where the at least one curable medium is subsequently at least partially cured. In an embodiment, the step of at least partially curing involves at least partially curing volume by volume each one of the plurality of volumes of dielectric materials of the connected-DRA array prior to forming a subsequent one of the plurality of volumes of dielectric materials. In another embodiment, the step of at least partially curing involves at least partially curing as a whole all of the plurality of volumes of dielectric materials of the connected-DRA array subsequent to forming all of the plurality of volumes of dielectric materials.

Figure 21A:
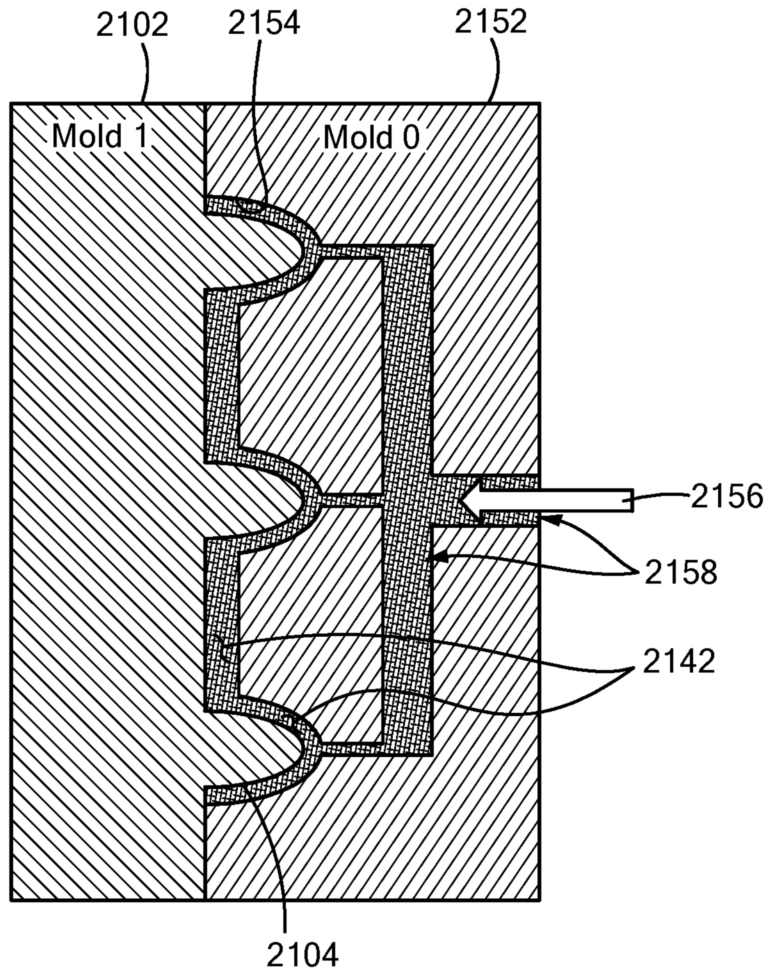
FIGS. 21A, 21B and 21C depict sequential stages of a molding process, in accordance with an embodiment.
Figure 21C:
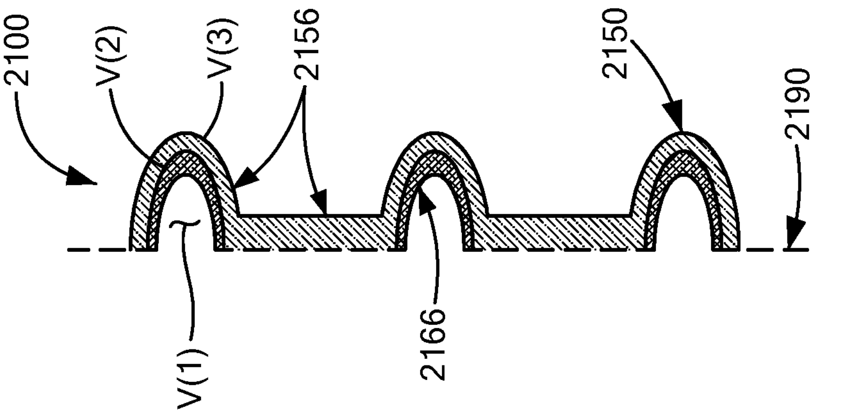
Figure 21B:
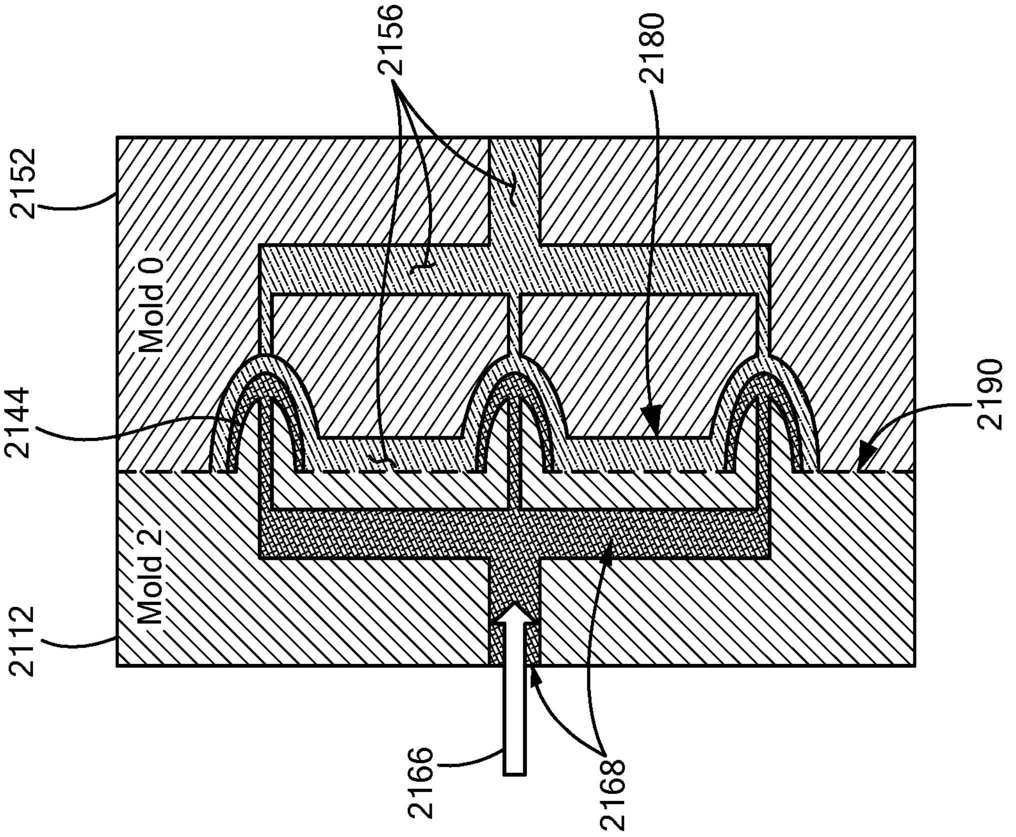

Reference is now made to FIGS. 21A-21C, which depict a forming process that involves a mold and a molding process.

FIG. 21A depicts a first positive mold portion 2102 and a complementary negative mold portion 2152, which when closed upon each other form a first mold cavity 2142 therebetween. The first positive mold portion 2102 includes a plurality of projections 2104, and the complementary negative mold portion 2152 includes a plurality of complementary recesses 2154, which in concert with the first mold cavity 2142 serve to form an outermost volume V(N) of the plurality of volumes of dielectric materials of an associated connected-DRA array when a first curable medium 2156 is injected through the runner system 2158 of the negative mold portion 2152 and subsequently at least partially cured. Here, the first mold cavity 2142 also serves to form the relatively thin connecting structures 2180 (depicted and enumerated in FIG. 21B) integrally with the outermost volume V(N) (compare with the connecting structures 1902 in FIG. 19 and the associated foregoing description, for example) to provide a single monolithic portion of the associated connected-DRA array.

FIG. 21B depicts the removal and replacement of the first positive mold portion 2102 with a second positive mold portion 2112, which cooperates with the original complementary negative mold portion 2152 in combination with the at least partially cured first curable medium 2156 to form a second mold cavity 2144 when the mold portions 2112, 2152, with the at least partially cured first curable medium 2156 remaining inside the negative mold portion 2152, are closed upon each other. The second mold cavity 2144 serves to form a second volume of the plurality of volumes of dielectric materials that is layered adjacent to and internal of the outermost volume V(N) when a second curable medium 2166 is injected through the runner system 2168 of the second positive mold portion 2112 and subsequently at least partially cured.

The process of removing and replacing a $k^{th}$ positive mold portion with a $(k+1)^{th}$ positive mold portion may be repeated as necessary to produce the desired number of volumes of the plurality of volumes of dielectric materials to form a layered connected-DRA array as disclosed herein. In an effort to avoid unnecessary redundancy, the illustration of such additional process steps are omitted, but would be readily understood by one skilled in the art and are therefore considered to be inherently disclosed herein.

Upon completion of molding the desired number of volumes of the plurality of volumes of dielectric materials that form the desired layered connected-DRA array, the final positive mold portion is separated with respect to the negative mold portion to provide the resulting connected-DRA array 2100 having a single monolithic portion as a part thereof, which is depicted in FIG. 21C with volume V(1) being air, volume V(2) being the second curable medium 2166, and volume V(3) being the first curable medium 2156 and the single monolithic portion.

From the foregoing description associated with FIGS. 21A-21C, it will be appreciated that an embodiment of the invention includes a method of fabricating a connected-DRA array 2100 (best seen with reference to FIG. 21C) as disclosed herein that involves a mold and a molding process, which includes: providing a $k^{th}$ positive mold portion, k being a successive integer from 1 to M beginning at 1, where M is greater than 1 and equal to or less than (N−1), and a complementary negative mold portion which when closed upon each other form a $k^{th}$ mold cavity therebetween; filling the $k^{th}$ mold cavity with a $k^{th}$ curable medium of the at least one curable medium, which is subsequently at least partially cured, to form an outermost volume of the connected-DRA array comprising one volume of the plurality of volumes of dielectric materials and the associated relatively thin connecting structures that form the single monolithic portion of the connected-DRA array; removing and replacing the $k^{th}$ positive mold portion with a $(k+1)^{th}$ positive mold portion, to form a $(k+1)^{th}$ mold cavity with respect to the negative mold portion, the $(k+1)^{th}$ mold cavity being only partially filled with curable medium leaving a vacant portion of the $(k+1)^{th}$ mold cavity; filling the vacant portion of the $(k+1)^{th}$ mold cavity with a $(k+1)^{th}$ curable medium of the at least one curable medium, which is subsequently at least partially cured, to form a $(k+1)^{th}$ volume of the connected-DRA array comprising a $(k+1)^{th}$ volume of the plurality of volumes of dielectric materials, the $(k+1)^{th}$ volume of dielectric material being at least partially embedded within the $k^{th}$ volume of dielectric material; optionally, and until a defined number of volumes of the plurality of volumes of dielectric materials have been successively formed, incrementing the value of k by 1, and then repeating the steps of: removing and replacing the $k^{th}$ positive mold portion with a $(k+1)^{th}$ positive mold portion; and, filling the vacant portion of the $(k+1)^{th}$ mold cavity with a $(k+1)^{th}$ curable medium of the at least one curable medium; and separating the $(k+1)^{th}$ positive mold portion with respect to the negative mold portion to provide the connected-DRA array.

In an embodiment, an electrically conductive metal form may be inserted into the mold on the positive mold portion side prior to replacing the next-to-final positive mold portion with the final positive mold portion to provide the connected-DRA array 2100 having the plurality of DRAs 2150 disposed on the electrically conductive metal form 2190 (depicted by a dashed line, and best seen with reference to FIGS. 21B and 21C), which may serve to provide at least a portion of a ground structure or a fence structure.

In general, the method of fabricating the connected-DRA array 2100 also includes: subsequent to removing a pre-final $k^{th}$ positive mold portion and prior to replacing the pre-final $k^{th}$ positive mold portion with a final $(k+1)^{th}$ positive mold portion, inserting an electrically conductive metal form into the mold to provide at least a portion of a ground structure or a fence structure upon which the connected-DRA array is disposed, and then filling the vacant portion of the final $(k+1)^{th}$ mold cavity with a final $(k+1)^{th}$ curable medium of the at least one curable medium.

Reference is now made to FIGS. 22A-22D, which depict another forming process that involves a mold and a molding process.

Figure 22A:
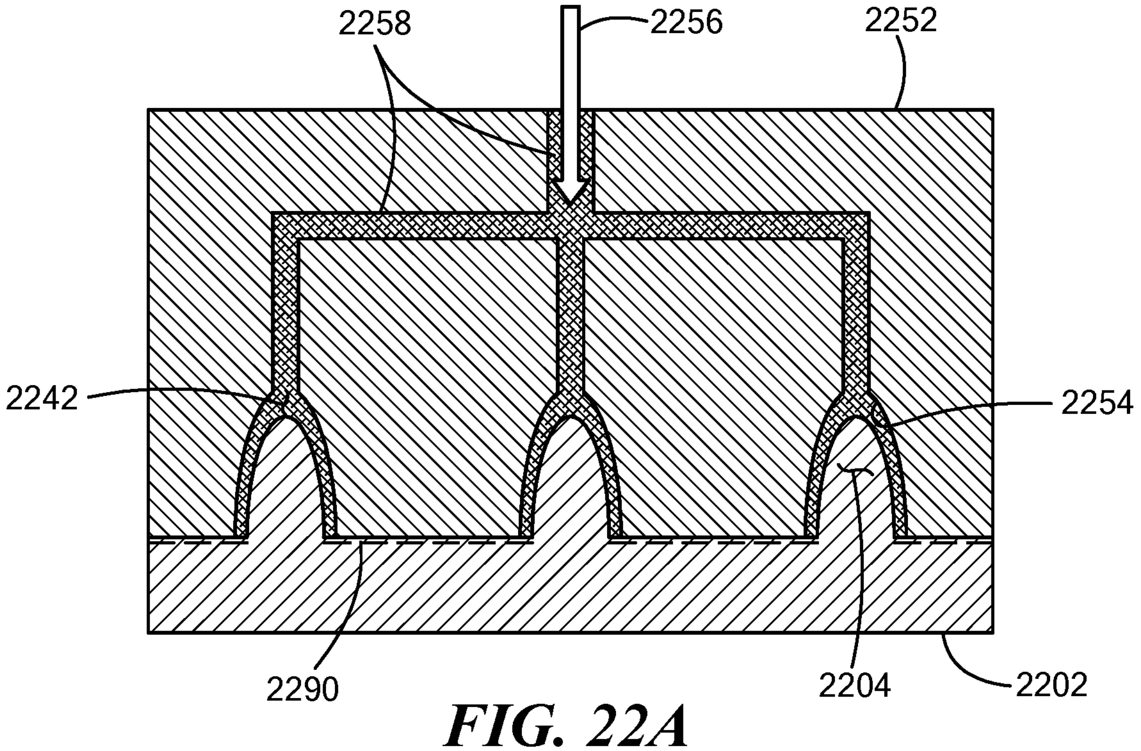
FIGS. 22A, 22B, 22C and 22D depict sequential stages of a molding process alternate to that of FIGS. 21A, 21B and 21C, in accordance with an embodiment.

FIG. 22A depicts a first negative mold portion 2252 and a complementary positive mold portion 2202, which when closed upon each other form a first mold cavity 2242 therebetween. The first negative mold portion 2252 includes a plurality of recesses 2254, and the complementary positive mold portion 2202 includes a plurality of complementary projections 2204, which in concert with the first mold cavity 2242 serve to form an innermost volume V(1) of the plurality of volumes of dielectric materials of an associated connected-DRA array when a first curable medium 2256 is injected through the runner system 2258 of the first negative mold portion 2252 and subsequently at least partially cured.

Figure 22B:
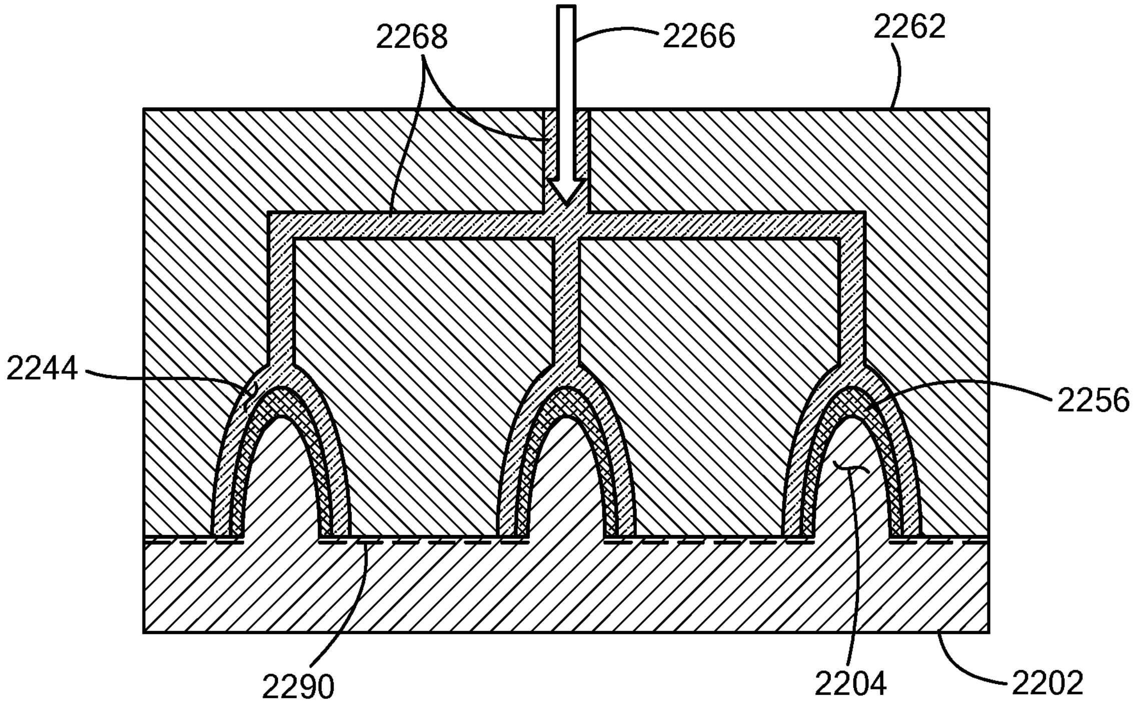

FIG. 22B depicts the removal and replacement of the first negative mold portion 2252 with a second negative mold portion 2262, which cooperates with the original complementary positive mold portion 2202 in combination with the at least partially cured first curable medium 2256 to form a second mold cavity 2244 when the mold portions 2202, 2262, with the at least partially cured first curable medium 2256 remaining on the projections 2204 of the positive mold portion 2202, are closed upon each other. The second mold cavity 2244 serves to form a second volume of the plurality of volumes of dielectric materials that is layered adjacent to and external of the underlying volume, which here is the first volume V(1), when a second curable medium 2266 is injected through the runner system 2268 of the second negative mold portion 2262 and subsequently at least partially cured.

The process of removing and replacing a $k^{th}$ negative mold portion with a $(k+1)^{th}$ negative mold portion may be repeated as necessary to produce the desired number of volumes of the plurality of volumes of dielectric materials to form a layered connected-DRA array as disclosed herein. In an effort to avoid unnecessary redundancy, the illustration of such additional process steps are omitted, but would be readily understood by one skilled in the art and are therefore considered to be inherently disclosed herein.

Figure 22C:
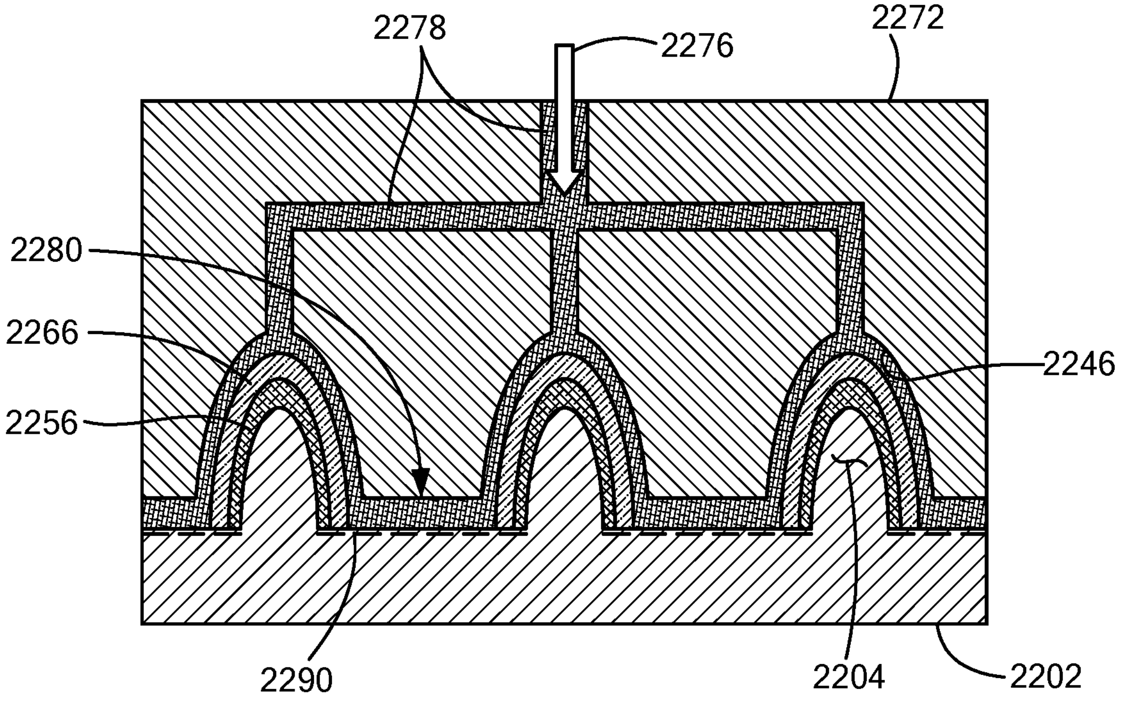

FIG. 22C depicts the removal and replacement of a next-to-last negative mold portion, here depicted by reference numeral 2262, with a final negative mold portion 2272, which cooperates with the original complementary positive mold portion 2202 in combination with the at least partially cured first and second curable media 2256, 2266 to form a third and final mold cavity 2246 when the mold portions 2202, 2272, with the at least partially cured first and second curable media 2256, 2266 remaining on the projections 2204 of the positive mold portion 2202, are closed upon each other. The third mold cavity 2246 serves to form a third and final volume of the plurality of volumes of dielectric materials that is layered adjacent to and external of the underlying volume, which here is the second volume V(2), when a third curable medium 2276 is injected through the runner system 2278 of the third negative mold portion 2272 and subsequently at least partially cured. Here, the third and final mold cavity 2246 also serves to form the relatively thin connecting structures 2280 integrally with the final outermost volume V(N) of the plurality of volumes of dielectric materials to form a single monolithic portion of the connected-DRA array.

Figure 22D:
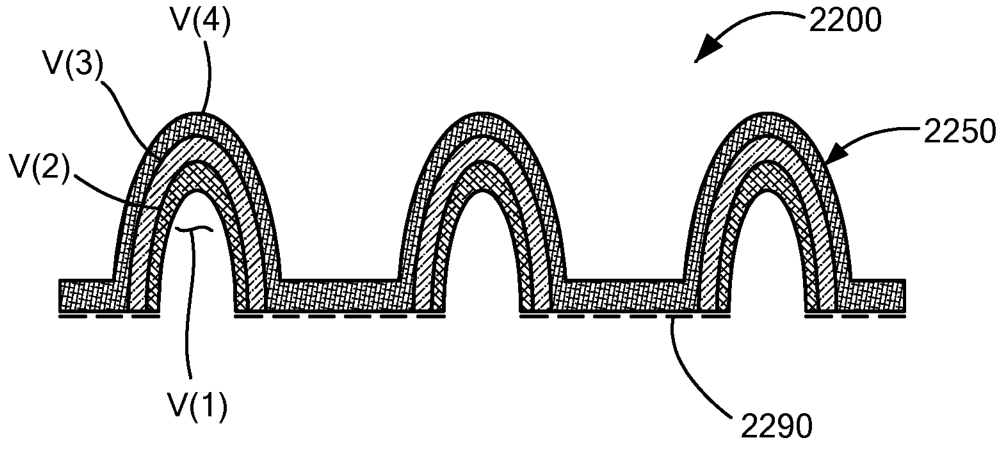

Upon completion of molding the desired number of volumes of the plurality of volumes of dielectric materials that form the desired layered connected-DRA array, the final negative mold portion is separated with respect to the positive mold portion to provide the resulting connected-DRA array, which is depicted in FIG. 22D with volume V(1) being air, volume V(2) being the first curable medium 2256, volume V(3) being the second curable medium 2266, and volume V(3) being the third curable medium 2276.

From the foregoing description associated with FIGS. 22A-22D, it will be appreciated that an embodiment of the invention includes a method of fabricating a connected-DRA array 2200 (best seen with reference to FIG. 22D) as disclosed herein that involves a mold and a molding process, which includes: providing a $k^{th}$ negative mold portion, k being a successive integer from 1 to M beginning at 1, where M is greater than 1 and equal to or less than (N−1), and a complementary positive mold portion which when closed upon each other form a $k^{th}$ mold cavity therebetween; filling the $k^{th}$ mold cavity with a $k^{th}$ curable medium of the at least one curable medium, which is subsequently at least partially cured, to form an innermost volume of the plurality of volumes of dielectric materials of the connected-DRA array; removing and replacing the $k^{th}$ negative mold portion with a $(k+1)^{th}$ negative mold portion, to form a $(k+1)^{th}$ mold cavity with respect to the positive mold portion, the $(k+1)^{th}$ mold cavity being only partially filled with curable medium leaving a vacant portion of the $(k+1)^{th}$ mold cavity; filling the vacant portion of the $(k+1)^{th}$ mold cavity with a $(k+1)^{th}$ curable medium of the at least one curable medium, which is subsequently at least partially cured, to form a $(k+1)^{th}$ volume of the connected-DRA array comprising a $(k+1)^{th}$ volume of the plurality of volumes of dielectric materials, the $k^{th}$ volume of dielectric material being at least partially embedded within the $(k+1)^{th}$ volume of dielectric material; optionally, and until a defined number of volumes of the plurality of volumes of dielectric materials have been successively formed, incrementing the value of k by 1, and then repeating the steps of: removing and replacing the $k^{th}$ negative mold portion with a $(k+1)^{th}$ negative mold portion; and, filling the vacant portion of the $(k+1)^{th}$ mold cavity with a $(k+1)^{th}$ curable medium of the at least one curable medium; and separating the $(k+1)^{th}$ negative mold portion with respect to the positive mold portion to provide the connected-DRA array, wherein an outermost volume of the plurality of volumes of dielectric materials comprises one volume of the plurality of volumes of dielectric materials and the associated relatively thin connecting structures that forms a single monolithic portion of the connected-DRA array.

In an embodiment, an electrically conductive metal form may be inserted into the mold on the positive mold portion side prior to molding the first curable medium of the at least one curable medium to provide a connected-DRA array 2200 having the plurality of DRAs 2250 disposed on the electrically conductive metal form 2290 (depicted by a dashed line, and best seen with reference to FIGS. 22A-22D), which may serve to provide at least a portion of a ground structure or a fence structure.

In general, the method of fabricating the connected-DRA array 2200 also includes: prior to molding a first curable medium of the at least one curable medium, inserting an electrically conductive metal form into the mold to provide at least a portion of a ground structure or a fence structure upon which the connected-DRA array will be disposed.

As previously noted, the method of fabricating any of the connected-DRA arrays disclosed herein may include injection molding, three-dimensional (3D) printing, stamping, or imprinting. Where the method involves 3D printing or imprinting, an embodiment of the method further includes 3D printing or imprinting the at least two volumes of the plurality of volumes of dielectric materials, or all of the volumes of the plurality of volumes of dielectric materials, and the associated relatively thin connecting structures of the connected-DRA array onto an electrically conductive metal that forms at least a portion of a ground structure or a fence structure. Where the method involves stamping, an embodiment of the method further includes bonding the connected-DRA array to an electrically conductive metal that forms at least a portion of a ground structure or a fence structure.

The method of fabricating any of the connected-DRA arrays disclosed herein may include an arrangement where an inwardly formed curable medium of the plurality of volumes of dielectric materials has a first dielectric constant, a directly adjacently and outwardly formed curable medium of the plurality of volumes of dielectric materials has a second dielectric constant, the first dielectric constant and the second dielectric constant are different, and in an embodiment the first dielectric constant is greater than the second dielectric constant. In an embodiment, the inwardly formed curable medium is a first curable medium comprises a polymer having the first dielectric constant, and the directly adjacently and outwardly formed curable medium is a second curable medium comprises a polymer having the second dielectric constant, where the second polymer is different from the first polymer. In another embodiment, the second polymer is the same as the first polymer, where at least one filler material is dispersed within at least one of the first curable medium and the second curable medium to affect the difference between the first dielectric constant and the second dielectric constant.

In an embodiment, the method of forming via at least one curable medium at least two volumes of the plurality of volumes of dielectric materials includes: forming a first volume of the plurality of volumes of dielectric materials from a first material having a first flow temperature T(1); and subsequently forming a second volume of the plurality of volumes of dielectric materials from a second material having a second flow temperature T(2) that is less than the first flow temperature T(1), the second volume being disposed adjacent the first volume.

For example, in an embodiment, and with reference back to FIG. 3B depicting connecting structures 302 integral with outermost volume V(4), the first material V(4) having the first flow temperature T(1) has a first dielectric constant Dk(1), and the second material V(3) having the second flow temperature T(2) has a second dielectric constant Dk(2) that is greater than the first dielectric constant Dk(1), where in this embodiment the first material V(4) at least partially embeds the second material V(3) and the first dielectric constant Dk(1) of the first material V(4) may be equal to or greater than three.

As a further example, in another embodiment, and with reference back to FIG. 7 depicting connecting structures 302' integral with innermost volume V(1), the first material V(1) having the first flow temperature T(1) has a first dielectric constant Dk(1), and the second material V(2) having the second flow temperature T(2) has a second dielectric constant Dk(2) that is less than the first dielectric constant Dk(1), where in this embodiment the second material V(2) at least partially embeds the first material V(1) and the second dielectric constant Dk(2) of the second material V(2) may be equal to or greater than three.

By utilizing the materials and arrangements as described herein in connection with FIG. 3B and FIG. 7 having the above described material characteristics where T(2)<T(1), a molding process can be implemented to form a connected-DRA array 300, 300' where the second material to be molded will not melt or cause a distorting reflow of the first material that is molded, where the embedded material will have a higher Dk value relative to the embedding material, and where the embedding material may utilize a relatively low cost dielectric material (which may be a dielectric material having a dielectric constant equal to or greater than three for example) while having a desirable melt or flow temperature suitable for a purpose disclosed herein.

Figure 23A:
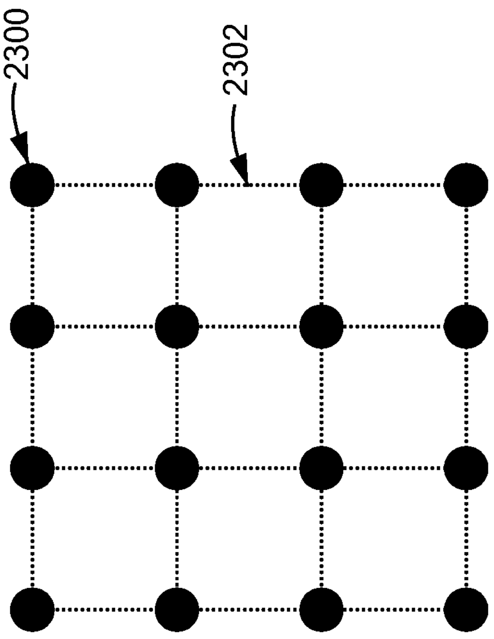
FIGS. 23A, 23B, 23C, 23D, 23E and 23F depict periodic and non-periodic arrangements of DRAs for a connected-DRA array, in accordance with an embodiment.
Figure 23B:
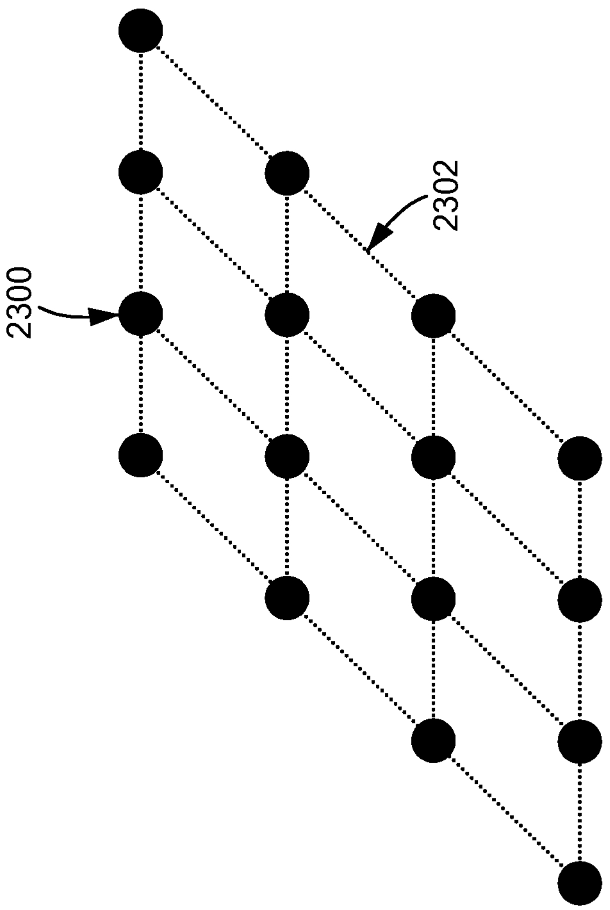
Figure 23C:
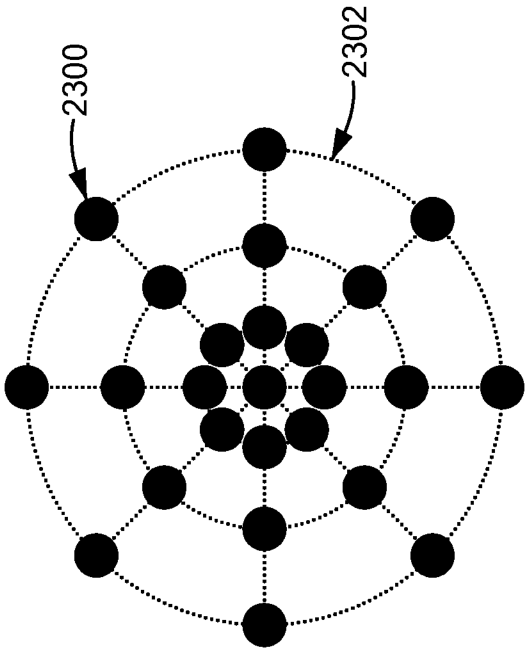
Figure 23D:
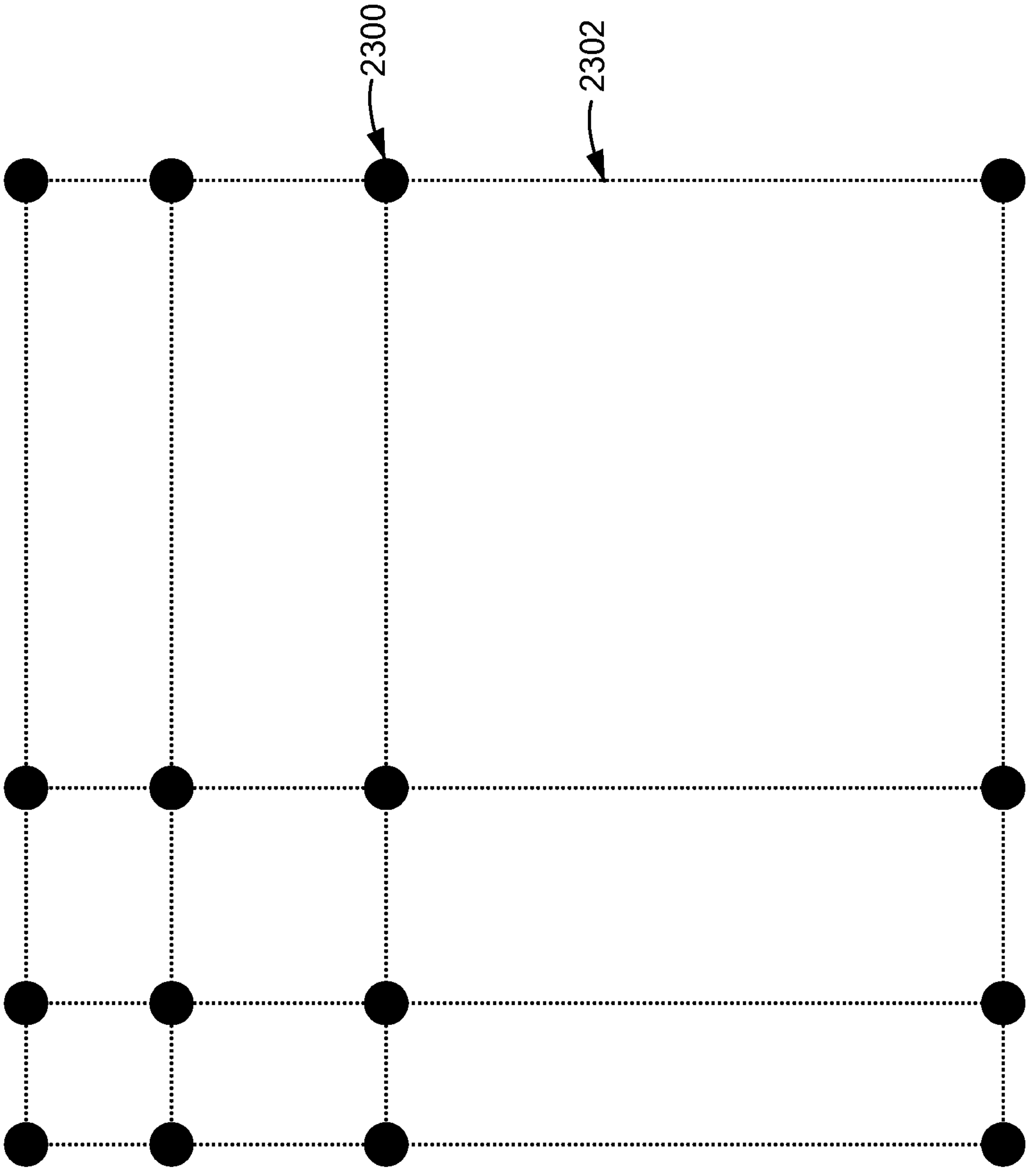
Figure 23E:
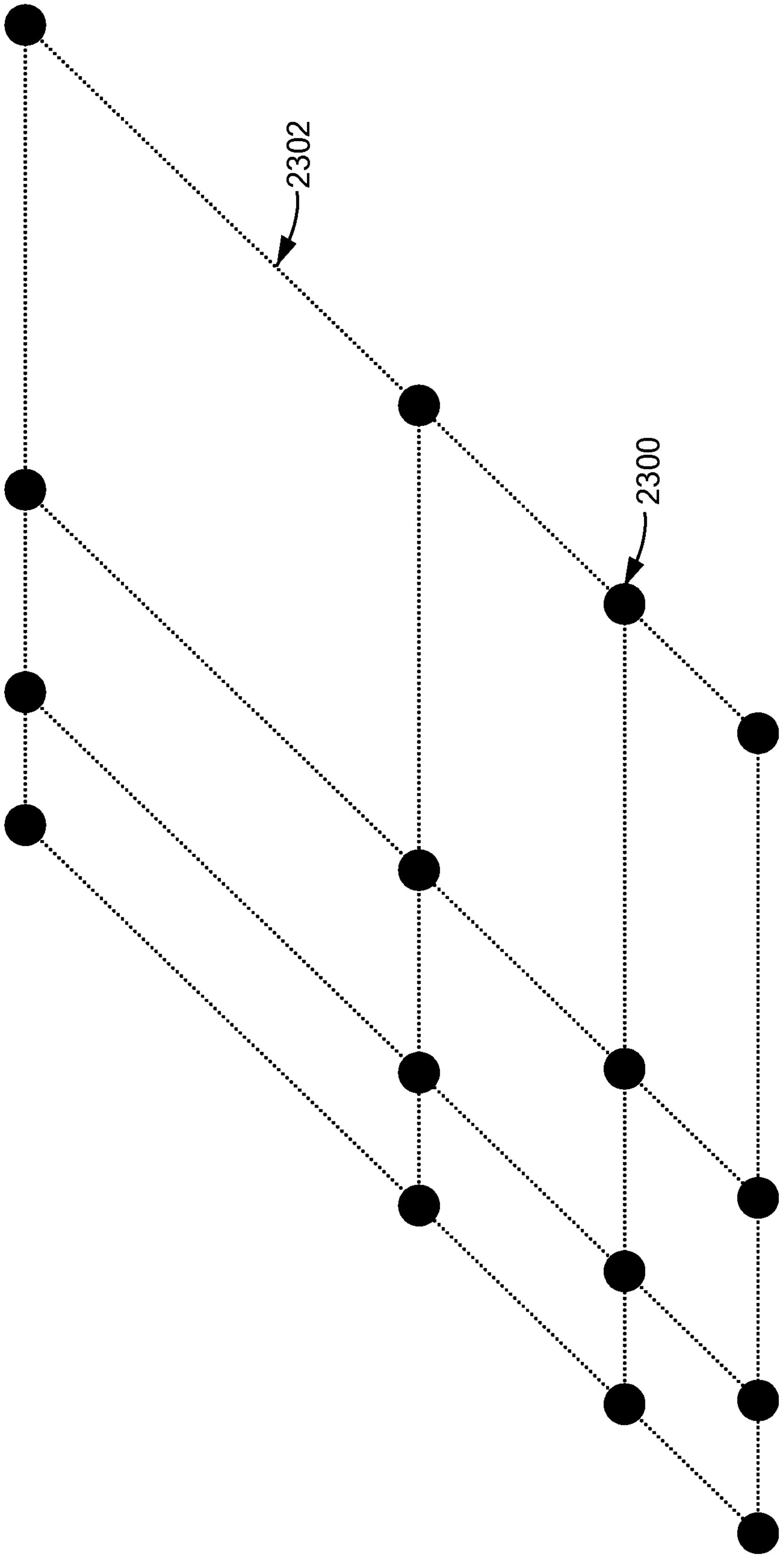
Figure 23F:
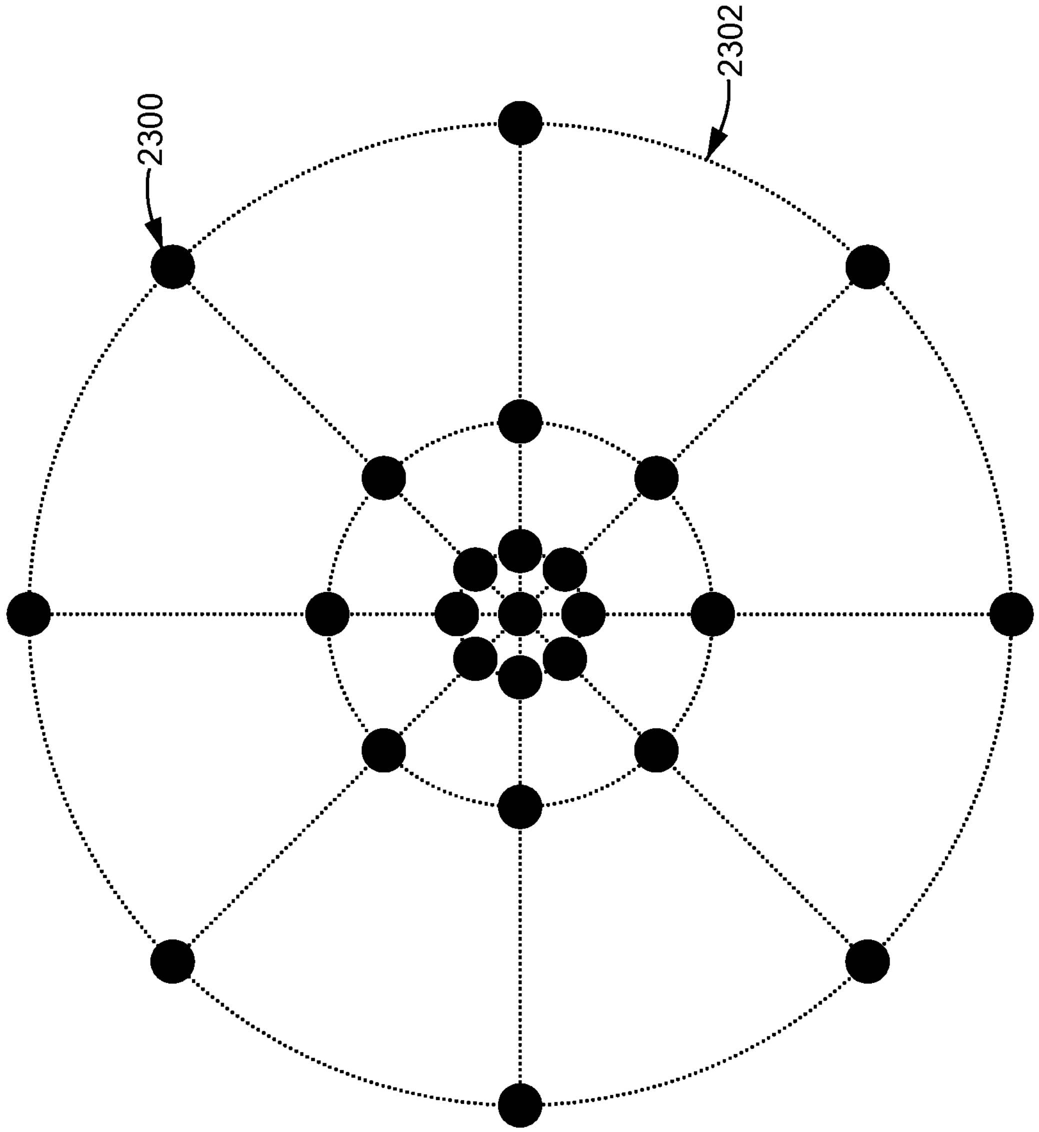

As previously noted herein above, and with reference now to FIGS. 23A, 23B, 23C, 23D, 23E and 23F, the plurality of DRAs disclosed herein are not limited to being spaced apart relative to each other on an x-y grid, but in general are spaced apart relative to each other on a plane (the plane of the illustrated figure for example) or any other surface, and may be spaced apart in a uniform periodic pattern or may be spaced apart in an increasing or decreasing non-periodic pattern. For example: FIG. 23A depicts a plurality of DRAs 2300 spaced apart relative to each other on an x-y grid in a uniform periodic pattern; FIG. 23B depicts a plurality of DRAs spaced apart relative to each other on an oblique grid in a uniform periodic pattern; FIG. 23C depicts a plurality of DRAs spaced apart relative to each other on a radial grid in a uniform periodic pattern; FIG. 23D depicts a plurality of DRAs spaced apart relative to each other on an x-y grid in an increasing or decreasing non-periodic pattern; FIG. 23E depicts a plurality of DRAs spaced apart relative to each other on an oblique grid in an increasing or decreasing non-periodic pattern; and, FIG. 23F depicts a plurality of DRAs spaced apart relative to each other on a radial grid in an increasing or decreasing non-periodic pattern. Alternatively, 23C may be viewed as depicting a plurality of DRAs 2300 spaced apart relative to each other on a non-x-y grid in a uniform periodic pattern; and, FIG. 23F may be viewed as depicting a plurality of DRAs 2300 spaced apart relative to each other on a non-x-y grid in an increasing or decreasing non-periodic pattern. While the foregoing description referencing FIGS. 23A, 23B, 23C, 23D, 23E and 23F, makes reference to a limited number of patterns of spaced apart DRAs 2300, it will be appreciated that the scope of the invention is not so limited, and encompasses any pattern of spaced apart DRAs suitable for a purpose disclosed herein. Additionally, while FIGS. 23A, 23B, 23C, 23D, 23E and 23F depict a certain arrangement of connecting structures 2302 between the spaced apart DRAs 2300, it will be appreciated that the scope of the invention is not so limited, and encompasses any arrangement of connecting structures suitable for a purpose disclosed herein.

The dielectric materials for use in the dielectric volumes or shells (referred to herein after as volumes for convenience) are selected to provide the desired electrical and mechanical properties. The dielectric materials generally comprise a thermoplastic or thermosetting polymer matrix and a filler composition containing a dielectric filler. Each dielectric layer can comprise, based on the volume of the dielectric volume, 30 to 100 volume percent (vol %) of a polymer matrix, and 0 to 70 vol % of a filler composition, specifically 30 to 99 vol % of a polymer matrix and 1 to 70 vol % of a filler composition, more specifically 50 to 95 vol % of a polymeric matrix and 5 to 50 vol % of a filler composition. The polymer matrix and the filler are selected to provide a dielectric volume having a dielectric constant consistent for a purpose disclosed herein and a dissipation factor of less than 0.006, specifically, less than or equal to 0.0035 at 10 gigaHertz (GHz). The dissipation factor can be measured by the IPC-TM-650 X-band strip line method or by the Split Resonator method.

Each dielectric volume comprises a low polarity, low dielectric constant, and low loss polymer. The polymer can comprise 1,2-polybutadiene (PBD), polyisoprene, polybutadiene-polyisoprene copolymers, polyetherimide (PEI), fluoropolymers such as polytetrafluoroethylene (PTFE), polyimide, polyetheretherketone (PEEK), polyamidimide, polyethylene terephthalate (PET), polyethylene naphthalate, polycyclohexylene terephthalate, polyphenylene ethers, those based on allylated polyphenylene ethers, or a combination comprising at least one of the foregoing. Combinations of low polarity polymers with higher polarity polymers can also be used, non-limiting examples including epoxy and poly(phenylene ether), epoxy and poly(etherimide), cyanate ester and poly(phenylene ether), and 1,2-polybutadiene and polyethylene.

Fluoropolymers include fluorinated homopolymers, e.g., PTFE and polychlorotrifluoroethylene (PCTFE), and fluorinated copolymers, e.g. copolymers of tetrafluoroethylene or chlorotrifluoroethylene with a monomer such as hexafluoropropylene or perfluoroalkylvinylethers, vinylidene fluoride, vinyl fluoride, ethylene, or a combination comprising at least one of the foregoing. The fluoropolymer can comprise a combination of different at least one these fluoropolymers.

The polymer matrix can comprise thermosetting polybutadiene or polyisoprene. As used herein, the term "thermosetting polybutadiene or polyisoprene" includes homopolymers and copolymers comprising units derived from butadiene, isoprene, or combinations thereof. Units derived from other copolymerizable monomers can also be present in the polymer, for example, in the form of grafts. Exemplary copolymerizable monomers include, but are not limited to, vinylaromatic monomers, for example substituted and unsubstituted monovinylaromatic monomers such as styrene, 3-methylstyrene, 3,5-diethylstyrene, 4-n-propylstyrene, alpha-methylstyrene, alpha-methyl vinyltoluene, para-hydroxystyrene, para-methoxystyrene, alpha-chlorostyrene, alpha-bromostyrene, dichlorostyrene, dibromostyrene, tetrachlorostyrene, and the like; and substituted and unsubstituted divinylaromatic monomers such as divinylbenzene, divinyltoluene, and the like. Combinations comprising at least one of the foregoing copolymerizable monomers can also be used. Exemplary thermosetting polybutadiene or polyisoprenes include, but are not limited to, butadiene homopolymers, isoprene homopolymers, butadiene-vinylaromatic copolymers such as butadiene-styrene, isoprene-vinylaromatic copolymers such as isoprene-styrene copolymers, and the like.

The thermosetting polybutadiene or polyisoprenes can also be modified. For example, the polymers can be hydroxyl-terminated, methacrylate-terminated, carboxylate-terminated, or the like. Post-reacted polymers can be used, such as epoxy-, maleic anhydride-, or urethane-modified polymers of butadiene or isoprene polymers. The polymers can also be crosslinked, for example by divinylaromatic compounds such as divinyl benzene, e.g., a polybutadiene-styrene crosslinked with divinyl benzene. Exemplary materials are broadly classified as "polybutadienes" by their manufacturers, for example, Nippon Soda Co., Tokyo, Japan, and Cray Valley Hydrocarbon Specialty Chemicals, Exton, Pa. Combinations can also be used, for example, a combination of a polybutadiene homopolymer and a poly (butadiene-isoprene) copolymer. Combinations comprising a syndiotactic polybutadiene can also be useful.

The thermosetting polybutadiene or polyisoprene can be liquid or solid at room temperature. The liquid polymer can have a number average molecular weight (Mn) of greater than or equal to 5,000 g/mol. The liquid polymer can have an Mn of less than 5,000 g/mol, specifically, 1,000 to 3,000 g/mol. Thermosetting polybutadiene or polyisoprenes having at least 90 wt % 1,2 addition, which can exhibit greater crosslink density upon cure due to the large number of pendent vinyl groups available for crosslinking.

The polybutadiene or polyisoprene can be present in the polymer composition in an amount of up to 100 wt %, specifically, up to 75 wt % with respect to the total polymer matrix composition, more specifically, 10 to 70 wt %, even more specifically, 20 to 60 or 70 wt %, based on the total polymer matrix composition.

Other polymers that can co-cure with the thermosetting polybutadiene or polyisoprenes can be added for specific property or processing modifications. For example, in order to improve the stability of the dielectric strength and mechanical properties of the dielectric material over time, a lower molecular weight ethylene-propylene elastomer can be used in the systems. An ethylene-propylene elastomer as used herein is a copolymer, terpolymer, or other polymer comprising primarily ethylene and propylene. Ethylene-propylene elastomers can be further classified as EPM copolymers (i.e., copolymers of ethylene and propylene monomers) or EPDM terpolymers (i.e., terpolymers of ethylene, propylene, and diene monomers). Ethylene-propylene-diene terpolymer rubbers, in particular, have saturated main chains, with unsaturation available off the main chain for facile cross-linking. Liquid ethylene-propylene-diene terpolymer rubbers, in which the diene is dicyclopentadiene, can be used.

The molecular weights of the ethylene-propylene rubbers can be less than 10,000 g/mol viscosity average molecular weight (Mv). The ethylene-propylene rubber can include an ethylene-propylene rubber having an My of 7,200 g/mol, which is available from Lion Copolymer, Baton Rouge, La., under the trade name TRILENE™ CP80; a liquid ethylene-propylene-dicyclopentadiene terpolymer rubbers having an My of 7,000 g/mol, which is available from Lion Copolymer under the trade name of TRILENE™ 65; and a liquid ethylene-propylene-ethylidene norbornene terpolymer having an My of 7,500 g/mol, which is available from Lion Copolymer under the name TRILENE™ 67.

The ethylene-propylene rubber can be present in an amount effective to maintain the stability of the properties of the dielectric material over time, in particular the dielectric strength and mechanical properties. Typically, such amounts are up to 20 wt % with respect to the total weight of the polymer matrix composition, specifically, 4 to 20 wt %, more specifically, 6 to 12 wt %.

Another type of co-curable polymer is an unsaturated polybutadiene- or polyisoprene-containing elastomer. This component can be a random or block copolymer of primarily 1,3-addition butadiene or isoprene with an ethylenically unsaturated monomer, for example, a vinylaromatic compound such as styrene or alpha-methyl styrene, an acrylate or methacrylate such a methyl methacrylate, or acrylonitrile. The elastomer can be a solid, thermoplastic elastomer comprising a linear or graft-type block copolymer having a polybutadiene or polyisoprene block and a thermoplastic block that can be derived from a monovinylaromatic monomer such as styrene or alpha-methyl styrene. Block copolymers of this type include styrene-butadiene-styrene triblock copolymers, for example, those available from Dexco Polymers, Houston, TX under the trade name VECTOR 8508M™, from Enichem Elastomers America, Houston, TX under the trade name SOL-T-6302™, and those from Dynasol Elastomers under the trade name CALPRENE™ 401; and styrene-butadiene diblock copolymers and mixed triblock and diblock copolymers containing styrene and butadiene, for example, those available from Kraton Polymers (Houston, TX) under the trade name KRATON D1118. KRATON D1118 is a mixed diblock/triblock styrene and butadiene containing copolymer that contains 33 wt % styrene.

The optional polybutadiene- or polyisoprene-containing elastomer can further comprise a second block copolymer similar to that described above, except that the polybutadiene or polyisoprene block is hydrogenated, thereby forming a polyethylene block (in the case of polybutadiene) or an ethylene-propylene copolymer block (in the case of polyisoprene). When used in conjunction with the above-described copolymer, materials with greater toughness can be produced. An exemplary second block copolymer of this type is KRATON GX1855 (commercially available from Kraton Polymers, which is believed to be a combination of a styrene-high 1,2-butadiene-styrene block copolymer and a styrene-(ethylene-propylene)-styrene block copolymer.

The unsaturated polybutadiene- or polyisoprene-containing elastomer component can be present in the polymer matrix composition in an amount of 2 to 60 wt % with respect to the total weight of the polymer matrix composition, specifically, 5 to 50 wt %, more specifically, 10 to 40 or 50 wt %.

Still other co-curable polymers that can be added for specific property or processing modifications include, but are not limited to, homopolymers or copolymers of ethylene such as polyethylene and ethylene oxide copolymers; natural rubber; norbornene polymers such as polydicyclopentadiene; hydrogenated styrene-isoprene-styrene copolymers and butadiene-acrylonitrile copolymers; unsaturated polyesters; and the like. Levels of these copolymers are generally less than 50 wt % of the total polymer in the polymer matrix composition.

Free radical-curable monomers can also be added for specific property or processing modifications, for example to increase the crosslink density of the system after cure. Exemplary monomers that can be suitable crosslinking agents include, for example, di, tri-, or higher ethylenically unsaturated monomers such as divinyl benzene, triallyl cyanurate, diallyl phthalate, and multifunctional acrylate monomers (e.g., SARTOMERT™ polymers available from Sartomer USA, Newtown Square, PA), or combinations thereof, all of which are commercially available. The crosslinking agent, when used, can be present in the polymer matrix composition in an amount of up to 20 wt %, specifically, 1 to 15 wt %, based on the total weight of the total polymer in the polymer matrix composition.

A curing agent can be added to the polymer matrix composition to accelerate the curing reaction of polyenes having olefinic reactive sites. Curing agents can comprise organic peroxides, for example, dicumyl peroxide, t-butyl perbenzoate, 2,5-dimethyl-2,5-di(t-butyl peroxy)hexane, α,α-di-bis(t-butyl peroxy)diisopropylbenzene, 2,5-dimethyl-2,5-di(t-butyl peroxy) hexyne-3, or a combination comprising at least one of the foregoing. Carbon-carbon initiators, for example, 2,3-dimethyl-2,3 diphenylbutane can be used. Curing agents or initiators can be used alone or in combination. The amount of curing agent can be 1.5 to 10 wt % based on the total weight of the polymer in the polymer matrix composition.

In some embodiments, the polybutadiene or polyisoprene polymer is carboxy-functionalized. Functionalization can be accomplished using a polyfunctional compound having in the molecule both (i) a carbon-carbon double bond or a carbon-carbon triple bond, and (ii) at least one of a carboxy group, including a carboxylic acid, anhydride, amide, ester, or acid halide. A specific carboxy group is a carboxylic acid or ester. Examples of polyfunctional compounds that can provide a carboxylic acid functional group include maleic acid, maleic anhydride, fumaric acid, and citric acid. In particular, polybutadienes adducted with maleic anhydride can be used in the thermosetting composition. Suitable maleinized polybutadiene polymers are commercially available, for example from Cray Valley under the trade names RICON 130MA8, RICON 130MA13, RICON 130MA20, RICON 131MA5, RICON 131MA10, RICON 131MA17, RICON 131MA20, and RICON 156MA17. Suitable maleinized polybutadiene-styrene copolymers are commercially available, for example, from Sartomer under the trade names RICON 184MA6. RICON 184MA6 is a butadiene-styrene copolymer adducted with maleic anhydride having styrene content of 17 to 27 wt % and Mn of 9,900 g/mol.

The relative amounts of the various polymers in the polymer matrix composition, for example, the polybutadiene or polyisoprene polymer and other polymers, can depend on the particular conductive metal ground plate layer used, the desired properties of the circuit materials, and like considerations. For example, use of a poly(arylene ether) can provide increased bond strength to a conductive metal component, for example, a copper or aluminum component such as a signal feed, ground, or reflector component. Use of a polybutadiene or polyisoprene polymer can increase high temperature resistance of the composites, for example, when these polymers are carboxy-functionalized. Use of an elastomeric block copolymer can function to compatibilize the components of the polymer matrix material. Determination of the appropriate quantities of each component can be done without undue experimentation, depending on the desired properties for a particular application.

At least one dielectric volume can further include a particulate dielectric filler selected to adjust the dielectric constant, dissipation factor, coefficient of thermal expansion, and other properties of the dielectric volume. The dielectric filler can comprise, for example, titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talcs, nanoclays, magnesium hydroxide, or a combination comprising at least one of the foregoing. A single secondary filler, or a combination of secondary fillers, can be used to provide a desired balance of properties.

Optionally, the fillers can be surface treated with a silicon-containing coating, for example, an organofunctional alkoxy silane coupling agent. A zirconate or titanate coupling agent can be used. Such coupling agents can improve the dispersion of the filler in the polymeric matrix and reduce water absorption of the finished DRA. The filler component can comprise 5 to 50 vol % of the microspheres and 70 to 30 vol % of fused amorphous silica as secondary filler based on the weight of the filler.

Each dielectric volume can also optionally contain a flame retardant useful for making the volume resistant to flame. These flame retardant can be halogenated or unhalogenated.

The flame retardant can be present in in the dielectric volume in an amount of 0 to 30 vol % based on the volume of the dielectric volume.

In an embodiment, the flame retardant is inorganic and is present in the form of particles. An exemplary inorganic flame retardant is a metal hydrate, having, for example, a volume average particle diameter of 1 nm to 500 nm, preferably 1 to 200 nm, or 5 to 200 nm, or 10 to 200 nm; alternatively the volume average particle diameter is 500 nm to 15 micrometer, for example 1 to 5 micrometer. The metal hydrate is a hydrate of a metal such as Mg, Ca, Al, Fe, Zn, Ba, Cu, Ni, or a combination comprising at least one of the foregoing. Hydrates of Mg, Al, or Ca are particularly preferred, for example aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Composites of these hydrates can be used, for example a hydrate containing Mg and one or more of Ca, Al, Fe, Zn, Ba, Cu and Ni. A preferred composite metal hydrate has the formula $MgMx.(OH)_y$, wherein M is Ca, Al, Fe, Zn, Ba, Cu, or Ni, x is 0.1 to 10, and y is from 2 to 32. The flame retardant particles can be coated or otherwise treated to improve dispersion and other properties.

Organic flame retardants can be used, alternatively or in addition to the inorganic flame retardants. Examples of inorganic flame retardants include melamine cyanurate, fine particle size melamine polyphosphate, various other phosphorus-containing compounds such as aromatic phosphinates, diphosphinates, phosphonates, and phosphates, certain polysilsesquioxanes, siloxanes, and halogenated compounds such as hexachloroendomethylenetetrahydrophthalic acid (TET acid), tetrabromophthalic acid and dibromoneopentyl glycol A flame retardant (such as a bromine-containing flame retardant) can be present in an amount of 20 phr (parts per hundred parts of resin) to 60 phr, specifically, 30 to 45 phr. Examples of brominated flame retardants include Saytex BT93 W (ethylene bistetrabromophthalimide), Saytex 120 (tetradecabromodiphenoxy benzene), and Saytex 102 (decabromodiphenyl oxide). The flame retardant can be used in combination with a synergist, for example a halogenated flame retardant can be used in combination with a synergists such as antimony trioxide, and a phosphorus-containing flame retardant can be used in combination with a nitrogen-containing compound such as melamine.

Each volume of dielectric material is formed from a dielectric composition comprising the polymer matrix composition and the filler composition. Each volume can be formed by casting a dielectric composition directly onto the ground structure layer, or a dielectric volume can be produced that can be deposited onto the ground structure layer. The method to produce each dielectric volume can be based on the polymer selected. For example, where the polymer comprises a fluoropolymer such as PTFE, the polymer can be mixed with a first carrier liquid. The combination can comprise a dispersion of polymeric particles in the first carrier liquid, e.g., an emulsion of liquid droplets of the polymer or of a monomeric or oligomeric precursor of the polymer in the first carrier liquid, or a solution of the polymer in the first carrier liquid. If the polymer is liquid, then no first carrier liquid may be necessary.

The choice of the first carrier liquid, if present, can be based on the particular polymeric and the form in which the polymeric is to be introduced to the dielectric volume. If it is desired to introduce the polymeric as a solution, a solvent for the particular polymer is chosen as the carrier liquid, e.g., N-methyl pyrrolidone (NMP) would be a suitable carrier liquid for a solution of a polyimide. If it is desired to introduce the polymer as a dispersion, then the carrier liquid can comprise a liquid in which the is not soluble, e.g., water would be a suitable carrier liquid for a dispersion of PTFE particles and would be a suitable carrier liquid for an emulsion of polyamic acid or an emulsion of butadiene monomer.

The dielectric filler component can optionally be dispersed in a second carrier liquid, or mixed with the first carrier liquid (or liquid polymer where no first carrier is used). The second carrier liquid can be the same liquid or can be a liquid other than the first carrier liquid that is miscible with the first carrier liquid. For example, if the first carrier liquid is water, the second carrier liquid can comprise water or an alcohol. The second carrier liquid can comprise water.

The filler dispersion can comprise a surfactant in an amount effective to modify the surface tension of the second carrier liquid to enable the second carrier liquid to wet the borosilicate microspheres. Exemplary surfactant compounds include ionic surfactants and nonionic surfactants. TRITON X-100™, has been found to be an exemplary surfactant for use in aqueous filler dispersions. The filler dispersion can comprise 10 to 70 vol % of filler and 0.1 to 10 vol % of surfactant, with the remainder comprising the second carrier liquid.

The combination of the polymer and first carrier liquid and the filler dispersion in the second carrier liquid can be combined to form a casting mixture. In an embodiment, the casting mixture comprises 10 to 60 vol % of the combined polymer and filler and 40 to 90 vol % combined first and second carrier liquids. The relative amounts of the polymer and the filler component in the casting mixture can be selected to provide the desired amounts in the final composition as described below.

The viscosity of the casting mixture can be adjusted by the addition of a viscosity modifier, selected on the basis of its compatibility in a particular carrier liquid or combination of carrier liquids, to retard separation, i.e. sedimentation or flotation, of the hollow sphere filler from the dielectric composite material and to provide a dielectric composite material having a viscosity compatible with conventional manufacturing equipment. Exemplary viscosity modifiers suitable for use in aqueous casting mixtures include, e.g., polyacrylic acid compounds, vegetable gums, and cellulose based compounds. Specific examples of suitable viscosity modifiers include polyacrylic acid, methyl cellulose, polyethyleneoxide, guar gum, locust bean gum, sodium carboxymethylcellulose, sodium alginate, and gum tragacanth. The viscosity of the viscosity-adjusted casting mixture can be further increased, i.e., beyond the minimum viscosity, on an application by application basis to adapt the dielectric composite material to the selected manufacturing technique. In an embodiment, the viscosity-adjusted casting mixture can exhibit a viscosity of 10 to 100,000 centipoise (cp); specifically, 100 cp and 10,000 cp measured at room temperature value.

Alternatively, the viscosity modifier can be omitted if the viscosity of the carrier liquid is sufficient to provide a casting mixture that does not separate during the time period of interest. Specifically, in the case of extremely small particles, e.g., particles having an equivalent spherical diameter less than 0.1 micrometers, the use of a viscosity modifier may not be necessary.

A layer of the viscosity-adjusted casting mixture can be cast onto the ground structure layer, or can be dip-coated and then shaped. The casting can be achieved by, for example, dip coating, flow coating, reverse roll coating, knife-over-roll, knife-over-plate, metering rod coating, and the like.

The carrier liquid and processing aids, i.e., the surfactant and viscosity modifier, can be removed from the cast volume, for example, by evaporation or by thermal decomposition in order to consolidate a dielectric volume of the polymer and the filler comprising the microspheres.

The volume of the polymeric matrix material and filler component can be further heated to modify the physical properties of the volume, e.g., to sinter a thermoplastic or to cure or post cure a thermosetting composition.

In another method, a PTFE composite dielectric volume can be made by a paste extrusion and calendaring process.

In still another embodiment, the dielectric volume can be cast and then partially cured ("B-staged"). Such B-staged volumes can be stored and used subsequently.

An adhesion layer can be disposed between the conductive ground layer and the dielectric layers. The adhesion layer can comprise a poly(arylene ether); and a carboxy-functionalized polybutadiene or polyisoprene polymer comprising butadiene, isoprene, or butadiene and isoprene units, and zero to less than or equal to 50 wt % of co-curable monomer units; wherein the composition of the adhesive layer is not the same as the composition of the dielectric volume. The adhesive layer can be present in an amount of 2 to 15 grams per square meter. The poly(arylene ether) can comprise a carboxy-functionalized poly(arylene ether). The poly(arylene ether) can be the reaction product of a poly (arylene ether) and a cyclic anhydride or the reaction product of a poly(arylene ether) and maleic anhydride. The carboxy-functionalized polybutadiene or polyisoprene polymer can be a carboxy-functionalized butadiene-styrene copolymer. The carboxy-functionalized polybutadiene or polyisoprene polymer can be the reaction product of a polybutadiene or polyisoprene polymer and a cyclic anhydride. The carboxy-functionalized polybutadiene or polyisoprene polymer can be a maleinized polybutadiene-styrene or maleinized polyisoprene-styrene copolymer.

In an embodiment, a multiple-step process suitable for thermosetting materials such as polybutadiene or polyisoprene can comprise a peroxide cure step at temperatures of 150 to 200° C., and the partially cured (B-staged) stack can then be subjected to a high-energy electron beam irradiation cure (E-beam cure) or a high temperature cure step under an inert atmosphere. Use of a two-stage cure can impart an unusually high degree of cross-linking to the resulting composite. The temperature used in the second stage can be 250 to 300° C., or the decomposition temperature of the polymer. This high temperature cure can be carried out in an oven but can also be performed in a press, namely as a continuation of the initial fabrication and cure step. Particular fabrication temperatures and pressures will depend upon the particular adhesive composition and the dielectric composition, and are readily ascertainable by one of ordinary skill in the art without undue experimentation.

A bonding layer can be disposed between any two or more dielectric layers to adhere the layers. The bonding layer is selected based on the desired properties, and can be, for example, a low melting thermoplastic polymer or other composition for bonding two dielectric layers. In an embodiment the bonding layer comprises a dielectric filler to adjust the dielectric constant thereof. For example, the dielectric constant of the bonding layer can be adjusted to improve or otherwise modify the bandwidth of the DRA.

In some embodiments the DRA, array, or a component thereof, in particular at least one of the dielectric volumes, is formed by molding the dielectric composition to form the dielectric material. In some embodiments, all of the volumes are molded. In other embodiments, all of the volumes except the initial volume V(i) are molded. In still other embodiments, only the outermost volume V(N) is molded. A combination of molding and other manufacturing methods can be used, for example 3D printing or inkjet printing.

Molding allows rapid and efficient manufacture of the dielectric volumes, optionally together with another DRA component(s) as an embedded feature or a surface feature. For example, a metal, ceramic, or other insert can be placed in the mold to provide a component of the DRA, such as a signal feed, ground component, or reflector component as embedded or surface feature. Alternatively, an embedded feature can be 3D printed or inkjet printed onto a volume, followed by further molding; or a surface feature can be 3D printed or inkjet printed onto an outermost surface of the DRA. It is also possible to mold at least one volume directly onto the ground structure, or into the container comprising a material having a dielectric constant between 1 and 3.

The mold can have a mold insert comprising a molded or machined ceramic to provide the package or outermost shell V(N). Use of a ceramic insert can lead to lower loss resulting in higher efficiency; reduced cost due to low direct material cost for molded alumina; ease of manufactured and controlled (constrained) thermal expansion of the polymer. It can also provide a balanced coefficient of thermal expansion (CTE) such that the overall structure matches the CTE of copper or aluminum.

Each volume can be molded in a different mold, and the volumes subsequently assembled. For example a first volume can be molded in a first mold, and a second volume in a second mold, then the volumes assembled. In an embodiment, the first volume is different from the second volume. Separate manufacture allows ready customization of each volume with respect to shape or composition. For example, the polymer of the dielectric material, the type of additives, or the amount of additive can be varied. An adhesive layer can be applied to bond a surface of one volume to a surface of another volume.

In other embodiments, a second volume can be molded into or onto a first molded volume. A postbake or lamination cycle can be used to remove any air from between the volumes. Each volume can also comprise a different type or amount of additive. Where a thermoplastic polymer is used, the first and second volumes can comprise polymers having different melt temperatures or different glass transition temperatures. Where a thermosetting composition is used, the first volume can be partially or fully cured before molding the second volume.

It is also possible to use a thermosetting composition as one volume (e.g., the first volume) and a thermoplastic composition as another volume (e.g., the second volume). In any of these embodiments, the filler can be varied to adjust the dielectric constant or the coefficient of thermal expansion (CTE) of each volume. For example, the CTE or dielectric of each volume can be offset such that the resonant frequency remains constant as temperature varies. In an embodiment, the inner volumes can comprise a low dielectric constant (<3.5) material filled with a combination of silica and microspheres (microballoons) such that a desired dielectric constant is achieved with CTE properties that match the outer volumes.

In some embodiments the molding is injection molding an injectable composition comprising the thermoplastic polymer or thermosetting composition and any other components of the dielectric material to provide at least one volume of the dielectric material. Each volume can be injection molded separately, and then assembled, or a second volume can be molded into or onto a first volume. For example, the method can comprise reaction injection molding a first volume in a first mold having an outer mold form and an inner mold form; removing the inner mold form and replacing it with a second inner mold form defining an inner dimension of a second volume; and injection molding a second volume in the first volume. In an embodiment, the first volume is the outermost shell V(N). Alternatively, the method can comprise injection molding a first volume in a first mold having an outer mold form and an inner mold form; removing the outer mold form and replacing it with a second outer mold form defining an outer dimension of a second volume; and injection molding the second volume onto the first volume. In an embodiment, the first volume is the innermost volume V(1).

The injectable composition can be prepared by first combining the ceramic filler and the silane to form a filler composition and then mixing the filler composition with the thermoplastic polymer or thermosetting composition. For a thermoplastic polymer, the polymer can be melted prior to, after, or during the mixing with one or both of the ceramic filler and the silane. The injectable composition can then be injection molded in a mold. The melt temperature, the injection temperature, and the mold temperature used depend on the melt and glass transition temperature of the thermoplastic polymer, and can be, for example, 150 to 350° C., or 200 to 300° C. The molding can occur at a pressure of 65 to 350 kiloPascal (kPa).

In some embodiments, the dielectric volume can be prepared by reaction injection molding a thermosetting composition. Reaction injection molding is particularly suitable for using a first molded volume to mold a second molded volume, because crosslinking can significantly alter the melt characteristics of the first molded volume. The reaction injection molding can comprise mixing at least two streams to form a thermosetting composition, and injecting the thermosetting composition into the mold, wherein a first stream comprises the catalyst and the second stream optionally comprises an activating agent. One or both of the first stream and the second stream or a third stream can comprise a monomer or a curable composition. One or both of the first stream and the second stream or a third stream can comprise one or both of a dielectric filler and an additive. One or both of the dielectric filler and the additive can be added to the mold prior to injecting the thermosetting composition.

For example, a method of preparing the volume can comprise mixing a first stream comprising the catalyst and a first monomer or curable composition and a second stream comprising the optional activating agent and a second monomer or curable composition. The first and second monomer or curable composition can be the same or different. One or both of the first stream and the second stream can comprise the dielectric filler. The dielectric filler can be added as a third stream, for example, further comprising a third monomer. The dielectric filler can be in the mold prior to injection of the first and second streams. The introducing of one or more of the streams can occur under an inert gas, for example, nitrogen or argon.

The mixing can occur in a head space of an injection molding machine, or in an inline mixer, or during injecting into the mold. The mixing can occur at a temperature of greater than or equal to 0 to 200 degrees Celsius (° C.), specifically, 15 to 130° C., or 0 to 45° C., more specifically, 23 to 45° C.

The mold can be maintained at a temperature of greater than or equal to 0 to 250° C., specifically, 23 to 200° C. or 45 to 250° C., more specifically, 30 to 130° C. or 50 to 70° C. It can take 0.25 to 0.5 minutes to fill a mold, during which time, the mold temperature can drop. After the mold is filled, the temperature of the thermosetting composition can increase, for example, from a first temperature of 0° to 45° C. to a second temperature of 45 to 250° C. The molding can occur at a pressure of 65 to 350 kiloPascal (kPa). The molding can occur for less than or equal to 5 minutes, specifically, less than or equal to 2 minutes, more specifically, 2 to 30 seconds. After the polymerization is complete, the substrate can be removed at the mold temperature or at a decreased mold temperature. For example, the release temperature, $T_r$, can be less than or equal to 10° C. less than the molding temperature, $T_m$ ($T_r \leq T_m - 10°$ C.).

After the volume is removed from the mold, it can be post-cured. Post-curing can occur at a temperature of 100 to 150° C., specifically, 140 to 200° C. for greater than or equal to 5 minutes.

In another embodiment, the dielectric volume can be formed by compression molding to form a volume of a dielectric material, or a volume of a dielectric material with an embedded feature or a surface feature. Each volume can be compression molded separately, and then assembled, or a second volume can be compression molded into or onto a first volume. For example, the method can include compression molding a first volume in a first mold having an outer mold form and an inner mold form; removing the inner mold form and replacing it with a second inner mold form defining an inner dimension of a second volume; and compression molding a second volume in the first volume. In some embodiments the first volume is the outermost shell V(N). Alternatively, the method can include compression molding a first volume in a first mold having an outer mold form and an inner mold form; removing the outer mold form and replacing it with a second outer mold form defining an outer dimension of a second volume; and compression molding the second volume onto the first volume. In this embodiment the first volume can be the innermost volume V(1).

Compression molding can be used with either thermoplastic or thermosetting materials. Conditions for compression molding a thermoplastic material, such as mold temperature, depend on the melt and glass transition temperature of the thermoplastic polymer, and can be, for example, 150 to 350° C., or 200 to 300° C. The molding can occur at a pressure of 65 to 350 kiloPascal (kPa). The molding can occur for less than or equal to 5 minutes, specifically, less than or equal to 2 minutes, more specifically, 2 to 30 seconds. A thermosetting material can be compression molded before B-staging to produce a B-stated material or a fully cured material; or it can be compression molded after it has been B-staged, and fully cured in the mold or after molding.

In still other embodiments, the dielectric volume can be formed by forming a plurality of layers in a preset pattern and fusing the layers, i.e., by 3D printing. As used herein, 3D printing is distinguished from inkjet printing by the formation of a plurality of fused layers (3D printing) versus a single layer (inkjet printing). The total number of layers can vary, for example from 10 to 100,000 layers, or 20 to 50,000 layers, or 30 to 20,000 layers. The plurality of layers in the predetermined pattern is fused to provide the article. As used herein "fused" refers to layers that have been formed and bonded by any 3D printing processes. Any method effective to integrate, bond, or consolidate the plurality of layers during 3D printing can be used. In some embodiments, the fusing occurs during formation of each of the layers. In some embodiments the fusing occurs while subsequent layers are formed, or after all layers are formed. The preset pattern can be determined from a three-dimensional digital representation of the desired article as is known in the art.

3D printing allows rapid and efficient manufacture of the dielectric volumes, optionally together with another DRA component(s) as an embedded feature or a surface feature. For example, a metal, ceramic, or other insert can be placed during printing provide a component of the DRA, such as a signal feed, ground component, or reflector component as embedded or surface feature. Alternatively, an embedded feature can be 3D printed or inkjet printed onto a volume, followed by further printing; or a surface feature can be 3D printed or inkjet printed onto an outermost surface of the DRA. It is also possible to 3D print at least one volume directly onto the ground structure, or into the container comprising a material having a dielectric constant between 1 and 3.

A first volume can be formed separately from a second volume, and the first and second volumes assembled, optionally with an adhesive layer disposed therebetween. Alternatively, or in addition, a second volume can be printed on a first volume. Accordingly, the method can include forming first plurality of layers to provide a first volume; and forming a second plurality of layers on an outer surface of the first volume to provide a second volume on the first volume. The first volume is the innermost volume V(1). Alternatively, the method can include forming first plurality of layers to provide a first volume; and forming a second plurality of layers on an inner surface of the first volume to provide the second volume. In an embodiment, the first volume is the outermost volume V(N).

A wide variety of 3D printing methods can be used, for example fused deposition modeling (FDM), selective laser sintering (SLS), selective laser melting (SLM), electronic beam melting (EBM), Big Area Additive Manufacturing (BAAM), ARBURG plastic free forming technology, laminated object manufacturing (LOM), pumped deposition (also known as controlled paste extrusion, as described, for example, at: http://nscrypt.com/micro-dispensing), or other 3D printing methods. 3D printing can be used in the manufacture of prototypes or as a production process. In some embodiments the volume or the DRA is manufactured only by 3D or inkjet printing, such that the method of forming the dielectric volume or the DRA is free of an extrusion, molding, or lamination process.

Material extrusion techniques are particularly useful with thermoplastics, and can be used to provide intricate features. Material extrusion techniques include techniques such as FDM, pumped deposition, and fused filament fabrication, as well as others as described in ASTM F2792-12a. In fused material extrusion techniques, an article can be produced by heating a thermoplastic material to a flowable state that can be deposited to form a layer. The layer can have a predetermined shape in the x-y axis and a predetermined thickness in the z-axis. The flowable material can be deposited as roads as described above, or through a die to provide a specific profile. The layer cools and solidifies as it is deposited. A subsequent layer of melted thermoplastic material fuses to the previously deposited layer, and solidifies upon a drop in temperature. Extrusion of multiple subsequent layers builds the desired shape. In particular, an article can be formed from a three-dimensional digital representation of the article by depositing the flowable material as one or more roads on a substrate in an x-y plane to form the layer. The position of the dispenser (e.g., a nozzle) relative to the substrate is then incremented along a z-axis (perpendicular to the x-y plane), and the process is then repeated to form an article from the digital representation. The dispensed material is thus also referred to as a "modeling material" as well as a "build material."

In some embodiments the layers are extruded from two or more nozzles, each extruding a different composition. If multiple nozzles are used, the method can produce the product objects faster than methods that use a single nozzle, and can allow increased flexibility in terms of using different polymers or blends of polymers, different colors, or textures, and the like. Accordingly, in an embodiment, a composition or property of a single layer can be varied during deposition using two nozzles, or compositions or a property of two adjacent layers can be varied. For example, one layer can have a high volume percent of dielectric filler, a subsequent layer can have an intermediate volume of dielectric filler, and a layer subsequent to that can have low volume percent of dielectric filler.

Material extrusion techniques can further be used of the deposition of thermosetting compositions. For example, at least two streams can be mixed and deposited to form the layer. A first stream can include catalyst and a second stream can optionally comprise an activating agent. One or both of the first stream and the second stream or a third stream can comprise the monomer or curable composition (e.g., resin). One or both of the first stream and the second stream or a third stream can comprise one or both of a dielectric filler and an additive. One or both of the dielectric filler and the additive can be added to the mold prior to injecting the thermosetting composition.

For example, a method of preparing the volume can comprise mixing a first stream comprising the catalyst and a first monomer or curable composition and a second stream comprising the optional activating agent and a second monomer or curable composition. The first and second monomer or curable composition can be the same or different. One or both of the first stream and the second stream can comprise the dielectric filler. The dielectric filler can be added as a third stream, for example, further comprising a third monomer. The depositing of one or more of the streams can occur under an inert gas, for example, nitrogen or argon. The mixing can occur prior to deposition, in an inline mixer, or during deposition of the layer. Full or partial curing (polymerization or crosslinking) can be initiated prior to deposition, during deposition of the layer, or after deposition. In an embodiment, partial curing is initiated prior to or during deposition of the layer, and full curing is initiated after deposition of the layer or after deposition of the plurality of layers that provides the volume.

In some embodiments a support material as is known in the art can optionally be used to form a support structure. In these embodiments, the build material and the support material can be selectively dispensed during manufacture of the article to provide the article and a support structure. The support material can be present in the form of a support structure, for example a scaffolding that can be mechanically removed or washed away when the layering process is completed to the desired degree.

Stereolithographic techniques can also be used, such as selective laser sintering (SLS), selective laser melting (SLM), electronic beam melting (EBM), and powder bed jetting of binder or solvents to form successive layers in a preset pattern. Stereolithographic techniques are especially useful with thermosetting compositions, as the layer-by-layer buildup can occur by polymerizing or crosslinking each layer.

In still another method for the manufacture of a dielectric resonator antenna or array, or a component thereof, a second volume can be formed by applying a dielectric composition to a surface of the first volume. The applying can be by coating, casting, or spraying, for example by dip-coating, spin casting, spraying, brushing, roll coating, or a combination comprising at least one of the foregoing. In some embodiments a plurality of first volumes is formed on a substrate, a mask is applied, and the dielectric composition to form the second volume is applied. This technique can be useful where the first volume is innermost volume V(1) and the substrate is a ground structure or other substrate used directly in the manufacture of an antenna array.

As described above, the dielectric composition can comprise a thermoplastic polymer or a thermosetting composition. The thermoplastic can be melted, or dissolved in a suitable solvent. The thermosetting composition can be a liquid thermosetting composition, or dissolved in a solvent. The solvent can be removed after applying the dielectric composition by heat, air drying, or other technique. The thermosetting composition can be B-staged, or fully polymerized or cured after applying to form the second volume. Polymerization or cure can be initiated during applying the dielectric composition.

The components of the dielectric composition are selected to provide the desired properties, for example dielectric constant. Generally, a dielectric constant of the first and second dielectric materials differ.

In some embodiments the first volume is the innermost volume V(1), wherein one or more, including all of the subsequent volumes are applied as described above. For example, all of the volumes subsequent to the innermost volume V(1) can be formed by sequentially applying a dielectric composition to an underlying one of the respective volumes V(i), beginning with applying a dielectric composition to the first volume. In other embodiments only one of the plurality of volumes is applied in this manner. For example, the first volume can be volume V(N−1) and the second volume can be the outermost volume V(N).

While certain combinations of features relating to a connected-DRA array have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment. Any and all such combinations of features relating to a connected-DRA array as disclosed herein are contemplated and are considered to be within the scope of the claims.

While the invention has been described with reference to exemplary embodiments, it will be understood by those skilled in the art that various changes may be made and equivalents may be substituted for elements thereof without departing from the scope of the claims. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments and, although specific terms and/or dimensions may have been employed, they are unless otherwise stated used in a generic, exemplary and/or descriptive sense only and not for purposes of limitation, the scope of the claims therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Additionally, the term "comprising" as used herein does not exclude the possible inclusion of one or more additional features.

What is claimed is:

1. A connected dielectric resonator antenna array (connected-DRA array) operational at an operating frequency and associated operating wavelength, the connected-DRA array comprising:

a plurality of dielectric resonator antennas (DRAs), each of the plurality of DRAs comprising at least one volume of non-gaseous dielectric material;

wherein each of the plurality of DRAs has a proximal end at a base of the respective DRA, a distal end at an apex of the respective DRA, and an overall height, H, from the proximal end to the distal end as observed in an elevation view of the connected-DRA array;

wherein each respective base of the plurality of DRAs is disposed on an electrically conductive ground structure, and corresponding ones of the distal end of the respective DRA are disposed at a distance away from the ground structure;

wherein each of the plurality of DRAs is physically connected to at least one other of the plurality of DRAs via a relatively thin connecting structure, each connecting structure being relatively thin as compared to an overall outside dimension of one of the plurality of DRAs, each connecting structure having a cross sectional overall height, h, as observed in the elevation view of the connected-DRA array, that is less than the overall height, H, of a respective connected DRA and being formed of a thin sheet of the at least one of the at least one volume of non-gaseous dielectric material, each connecting structure and the associated volume of the at least one volume of non-gaseous dielectric material forming a single monolithic portion of the connected-DRA array;

wherein the thin sheet extends over a substantial portion of the connected-DRA array, and overlays a substantial portion of the electrically conductive ground structure between adjacent ones of the plurality of DRAs, as observed in a plan view of the connected-DRA array;

wherein the overall height h is viewed in a same direction as the overall height H.

2. The connected-DRA array of claim 1, wherein:

the thin sheet extends over the entire connected-DRA array between interconnected ones of the plurality of DRAs, and entirely overlays the electrically conductive ground structure between adjacent ones of the plurality of DRAs, as observed in the plan view of the connected-DRA array.

3. The connected-DRA array of claim 1, wherein:

the thin sheet has a dielectric constant equal to or less than 10.

4. The connected-DRA array of claim 1, wherein:

the thin sheet comprises a through opening in each region between closest adjacent pairs of the plurality of DRAs.

5. The connected-DRA array of claim 4, wherein:

each through opening is an elongated through opening having a length L disposed and configured to interrupt straight line cross-talk between the associated closest adjacent pairs of the plurality of DRAs.

6. The connected-DRA array of claim 1, wherein each of the plurality of DRAs further comprises:

a plurality of volumes of dielectric materials comprising N volumes, N being an integer equal to or greater than 3, disposed to form successive and sequential layered volumes V(i), i being an integer from 1 to N, wherein volume V(1) forms an innermost volume, wherein a successive volume from at least V(i+1) to at least V(N−1) forms a layered shell disposed over and at least partially embedding volume V(i), wherein volume V(N) at least partially embeds all volumes V(1) to V(N−1).

7. The connected-DRA array of claim 6, wherein the layered shell comprises non-gaseous dielectric material.

8. The connected-DRA array of claim 3, wherein:

the cross sectional overall height, h, of each connecting structure is equal to or less than 50% of the overall height, H, of a respective connected DRA.

9. The connected-DRA array of claim 1, wherein:

the cross sectional overall height, h, of each connecting structure is equal to or less than the operating wavelength of the connected-DRA array.

10. The connected-DRA array of claim 6, wherein:

the plurality of volumes of dielectric materials are arranged according to any one of the following arrangements: an outermost non-gaseous volume of the plurality of volumes of dielectric materials and the relatively thin connecting structures form the single monolithic portion of the connected-DRA array; an innermost non-gaseous volume of the plurality of volumes of dielectric materials and the relatively thin connecting structures form the single monolithic portion of the connected-DRA array; or, a non-gaseous volume, other than an innermost non-gaseous volume and other than an outermost non-gaseous volume, of the plurality of volumes of dielectric materials and the relatively thin connecting structures form the single monolithic portion of the connected-DRA array.

11. The connected-DRA array of claim 1, wherein:

each of the relatively thin connecting structures are disposed according to any of the following arrangements: each of the relatively thin connecting structures are disposed proximate the proximal end of each respective DRA; each of the relatively thin connecting structures are disposed between the proximal end and the distal end of each respective DRA; or, each of the relatively thin connecting structures are disposed proximate the distal end of each respective DRA.

12. The connected-DRA array of claim 6, further comprising:

a signal feed disposed and structured to be electromagnetically coupled to one or more of the respective plurality of volumes of dielectric materials.

13. The connected-DRA array of claim 6, wherein each innermost volume V(1) of each of the plurality of DRAs comprises a gas.

* * * * *